Oct. 31, 1967    H. A. JENSEN ET AL    3,349,540
METHOD AND APPARATUS FOR CONTINUOUSLY FORMING PACKAGES
Filed Nov. 4, 1964    30 Sheets-Sheet 3
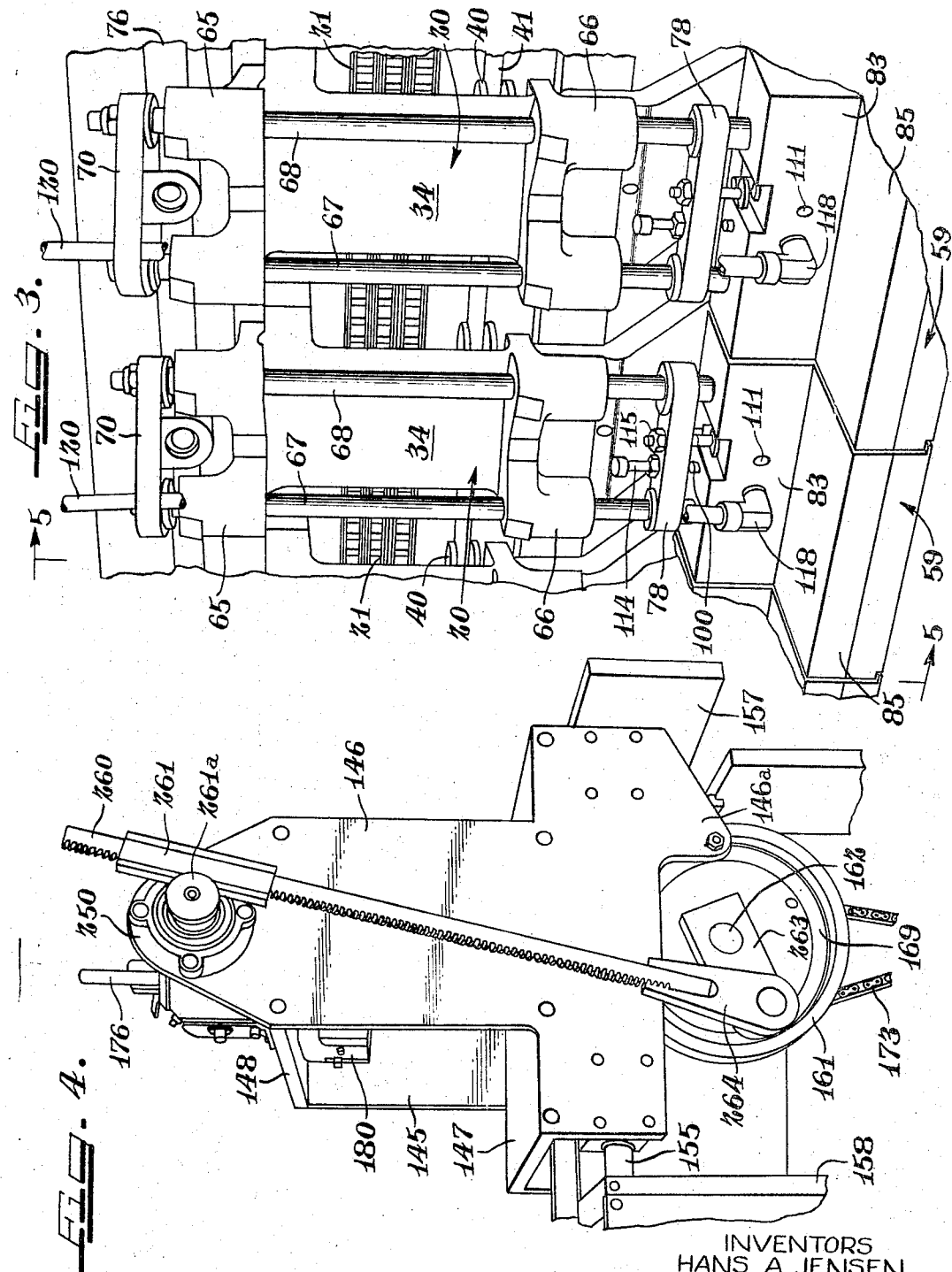
INVENTORS
HANS A. JENSEN
AUGUSTUS H. EBERMAN
BY
Greist, Lockwood, Greenawalt & Dewey
Attys.

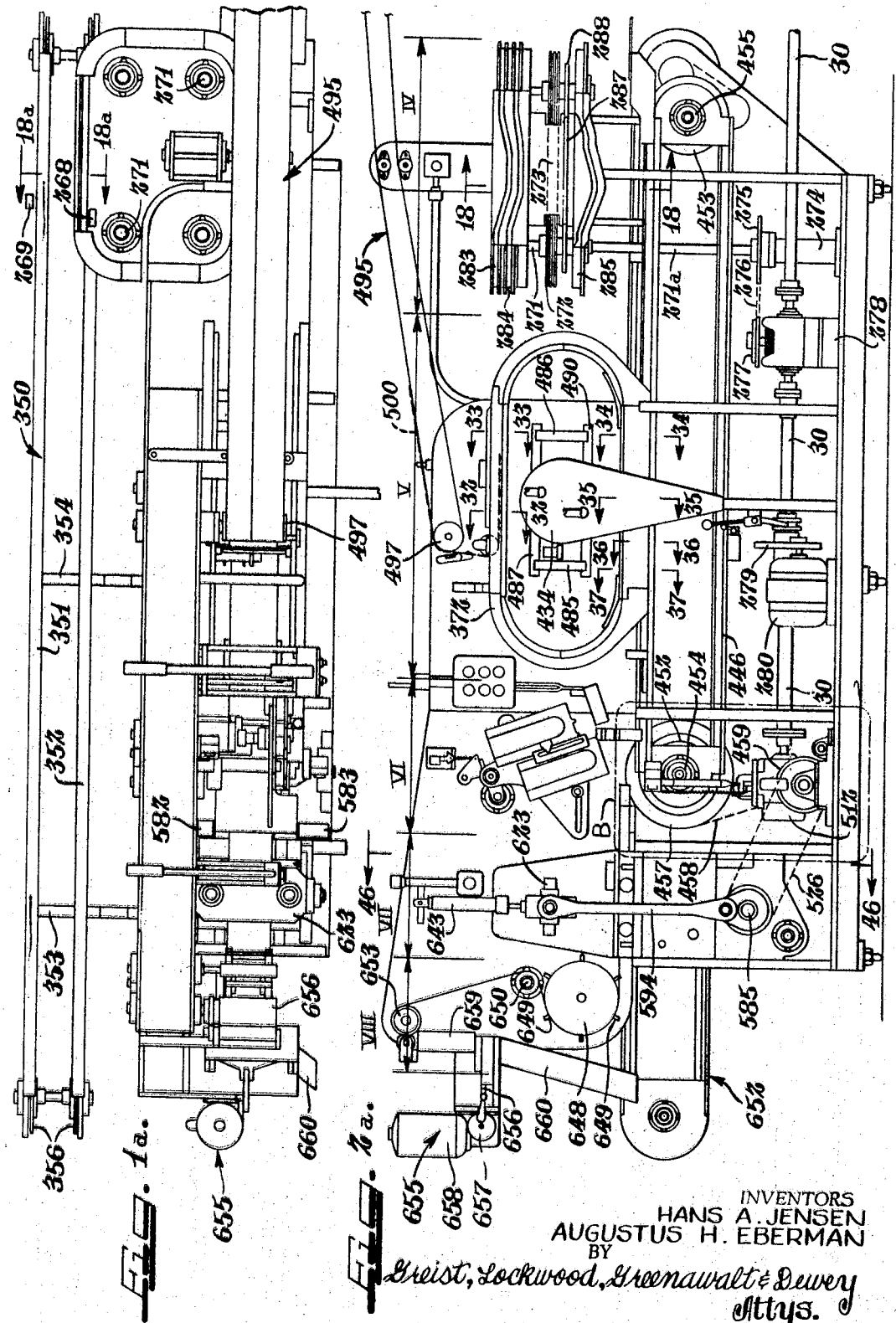

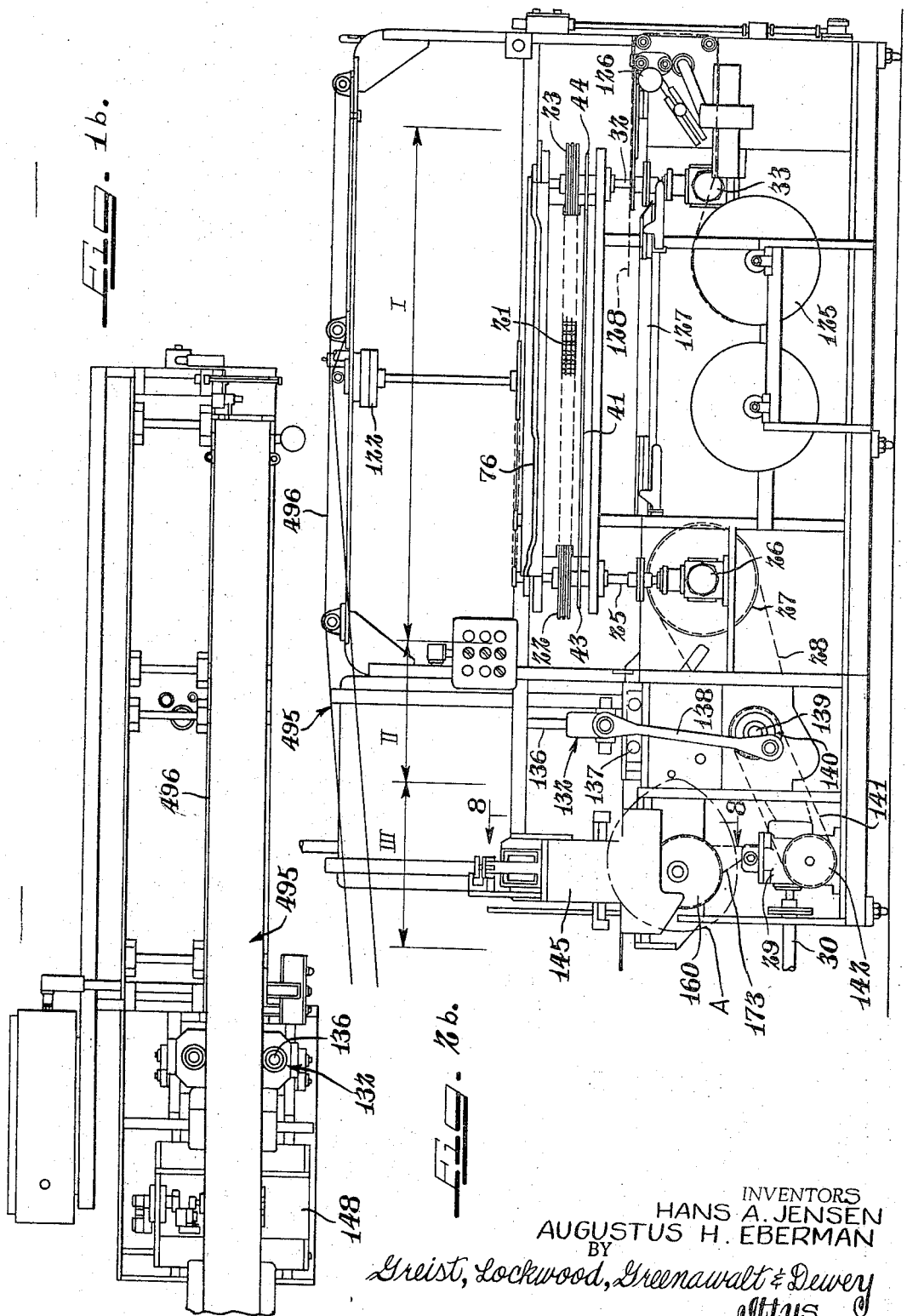

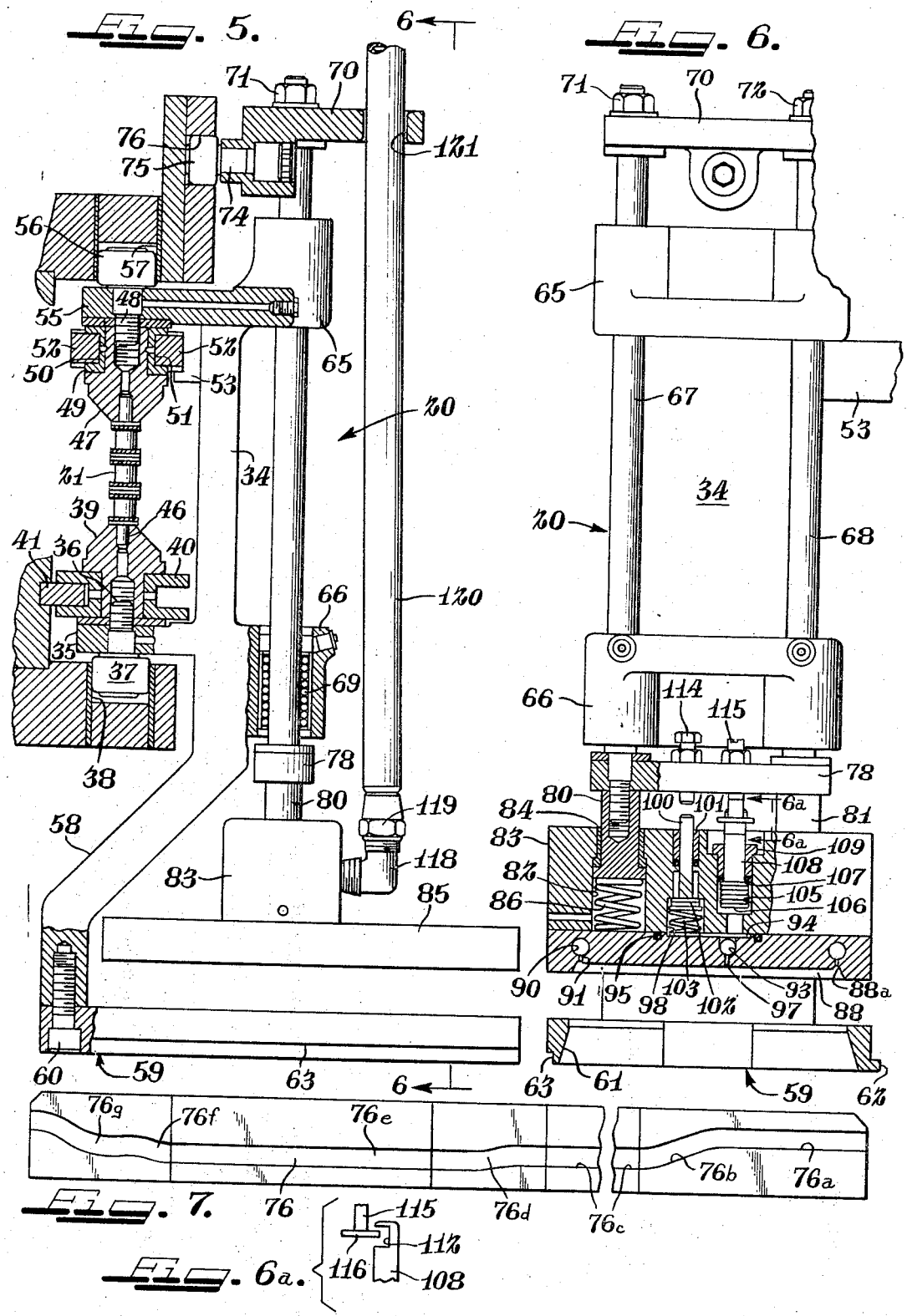

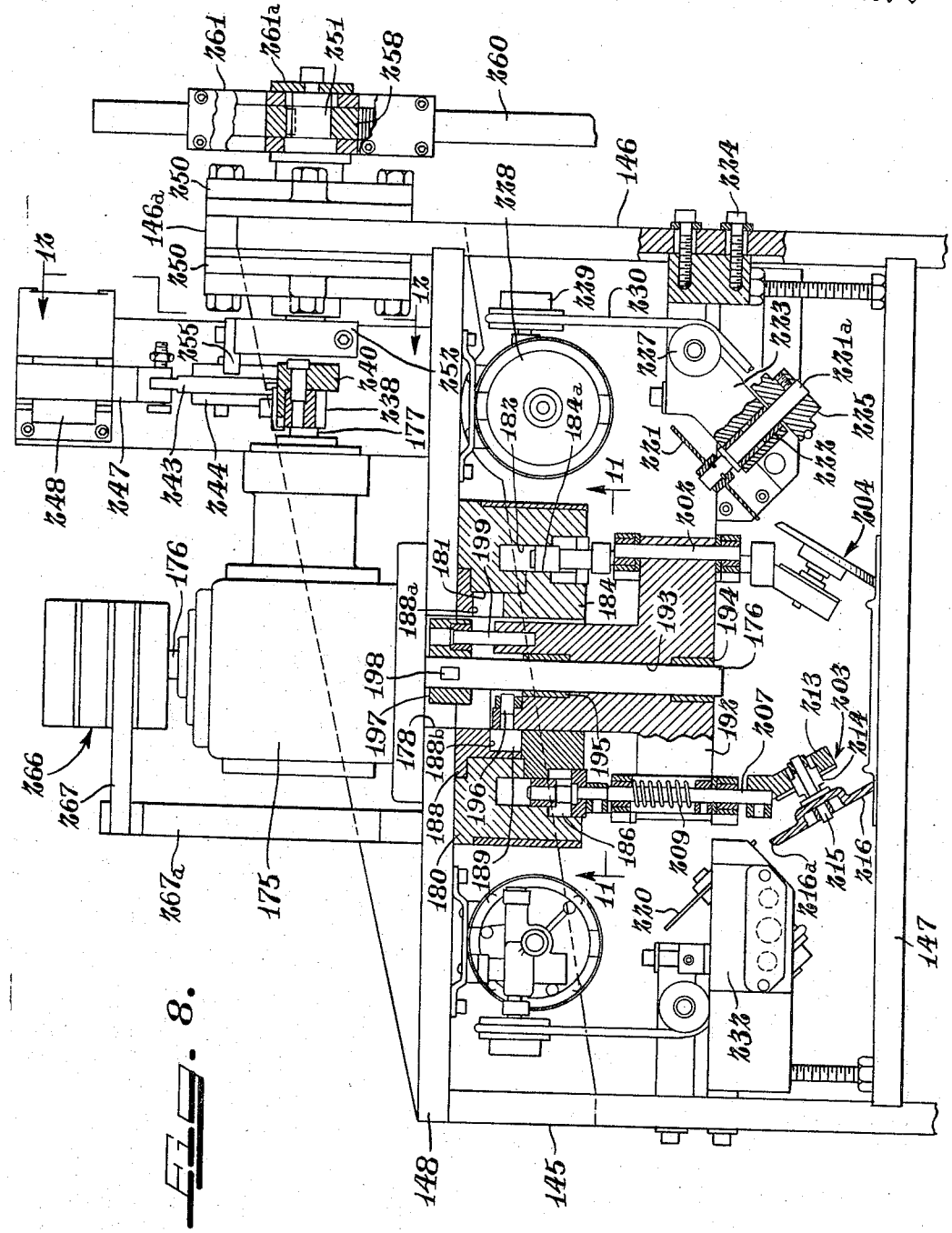

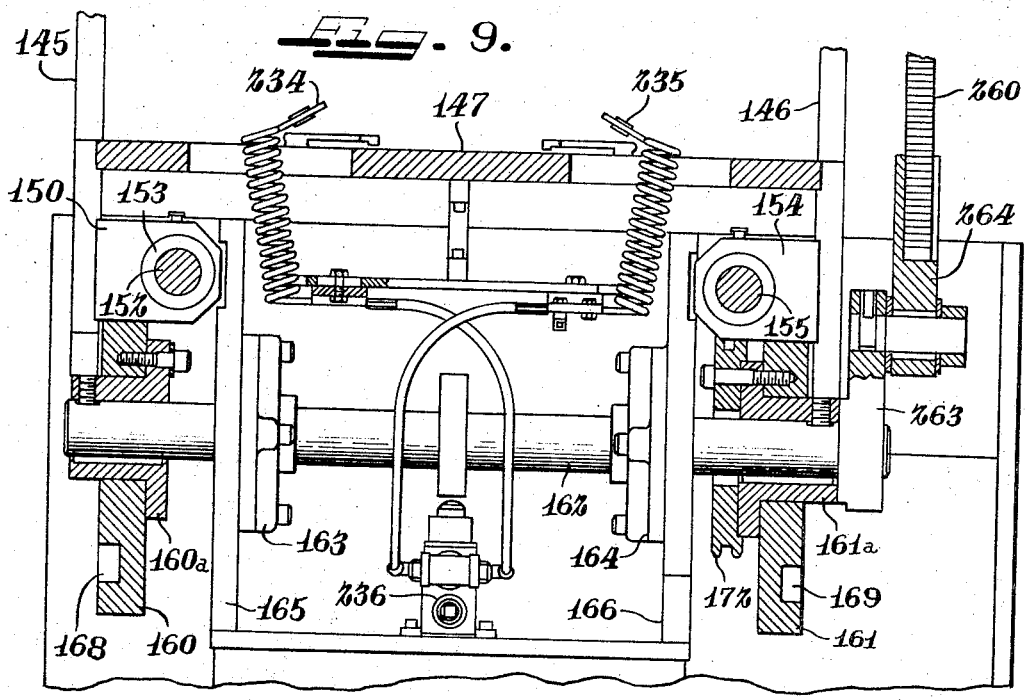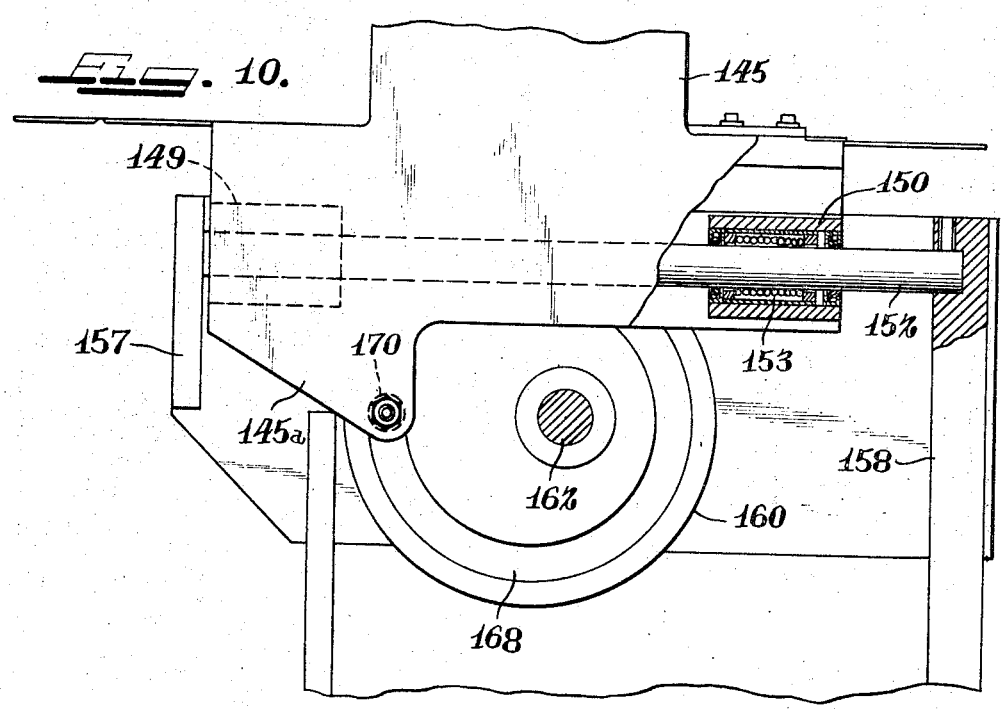

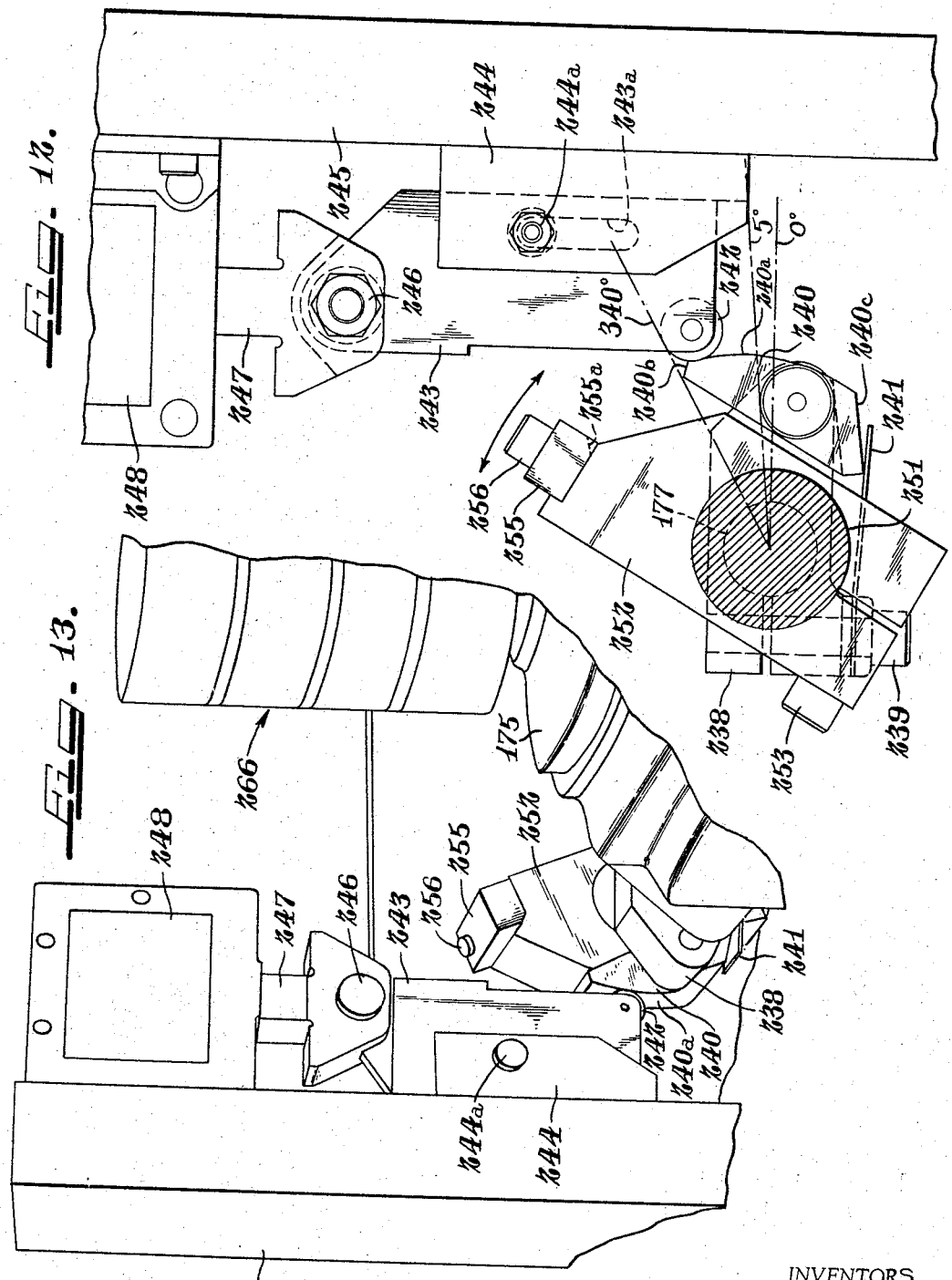

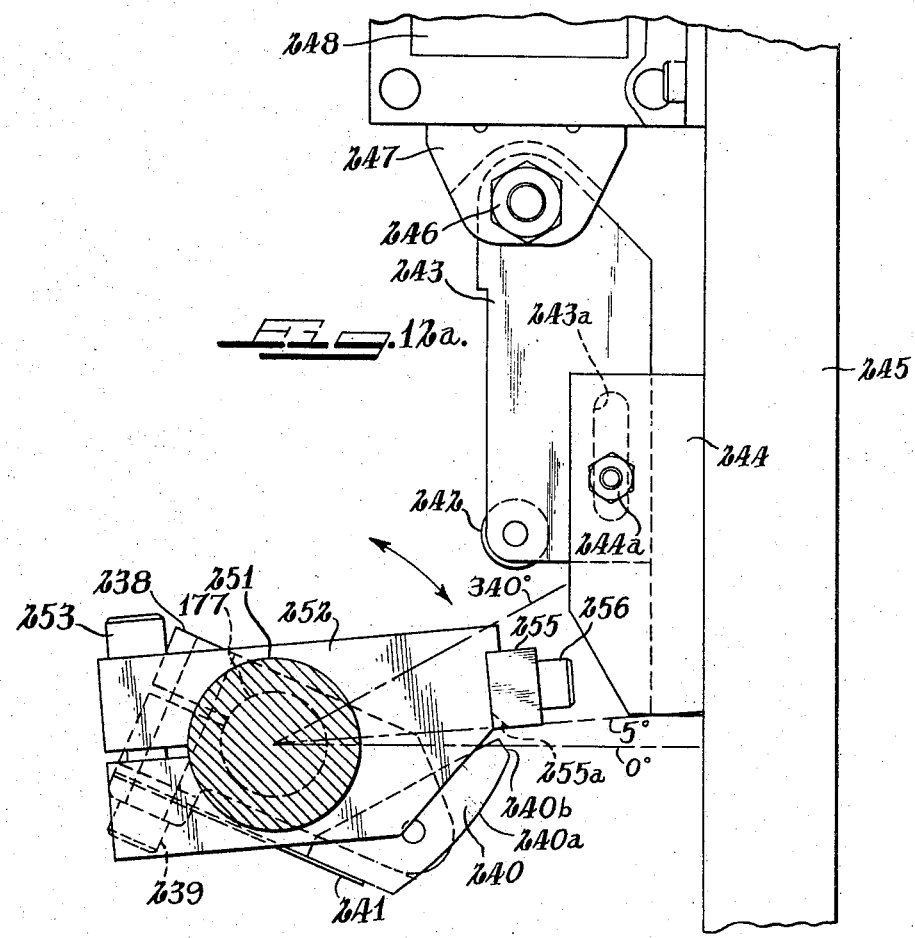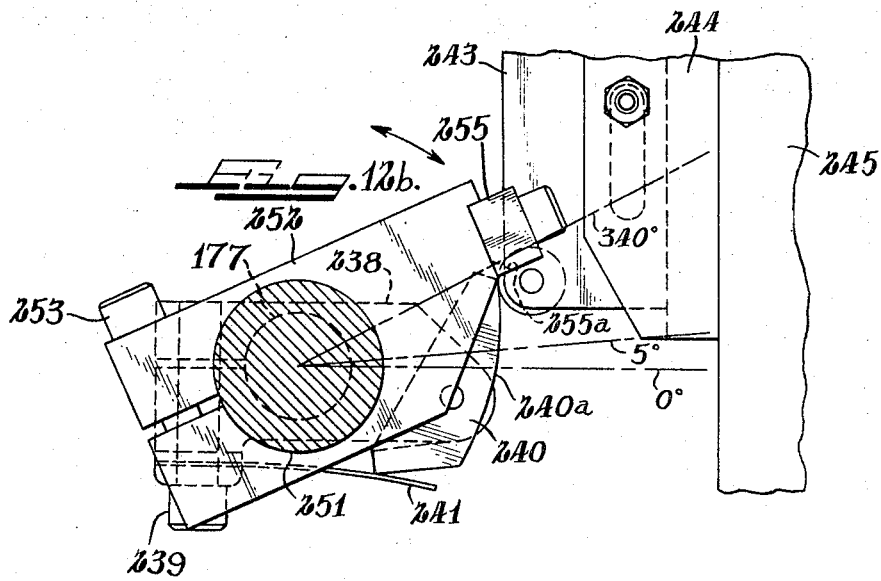

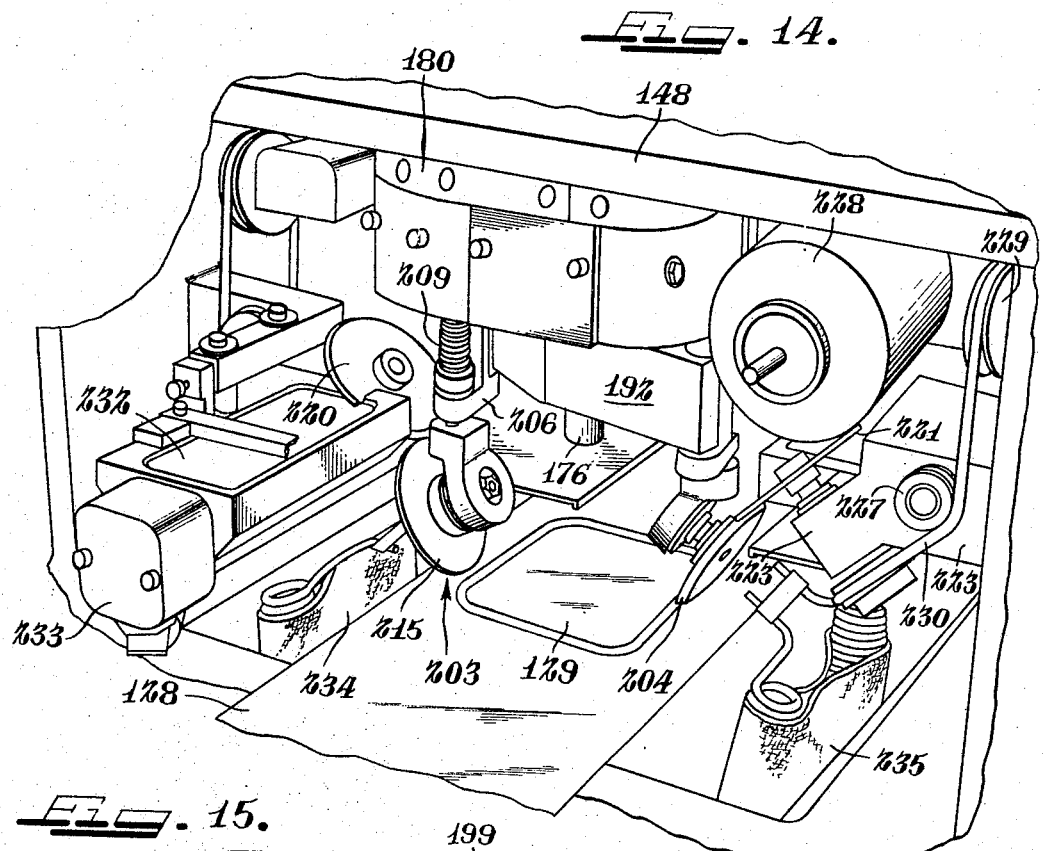

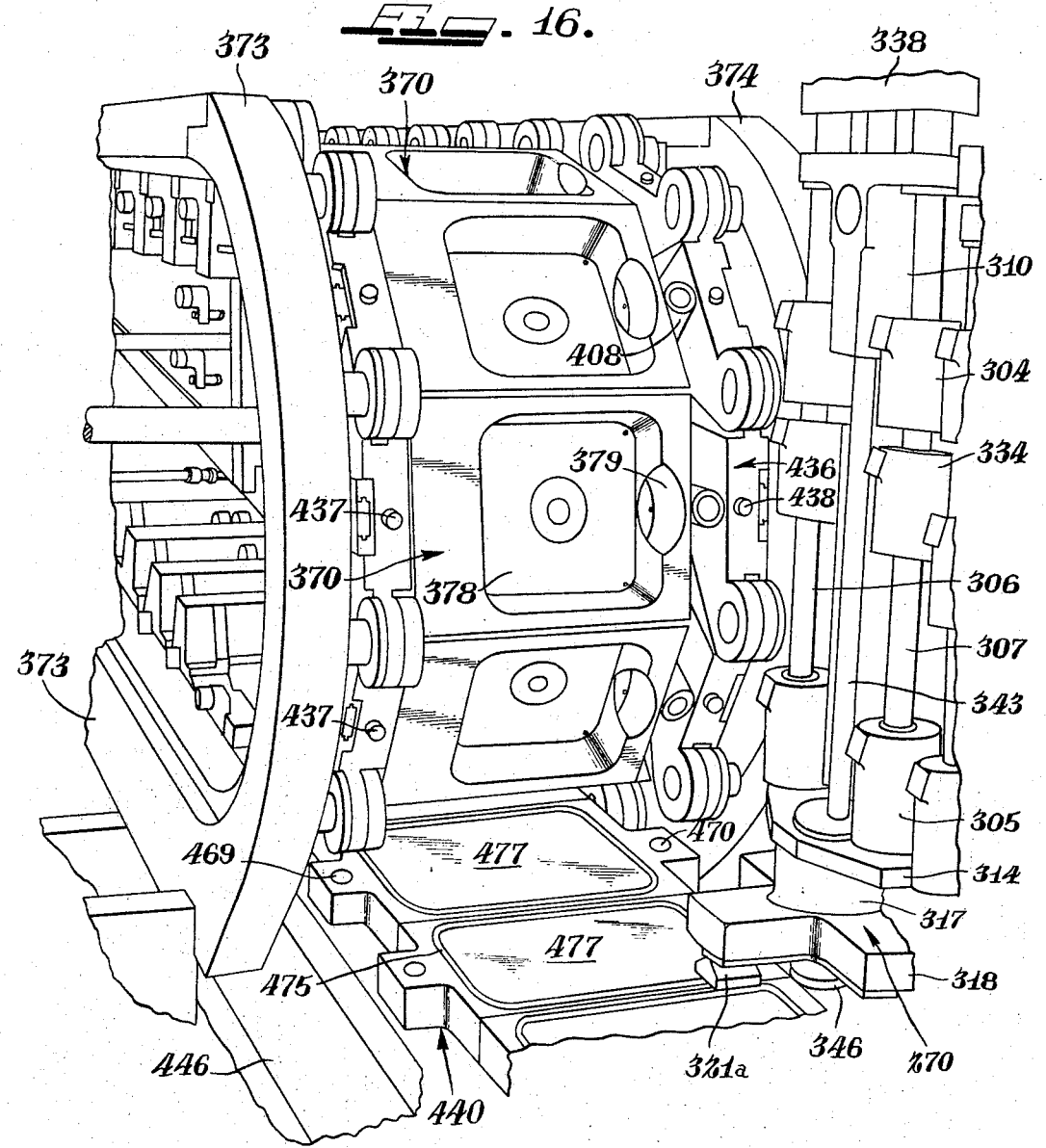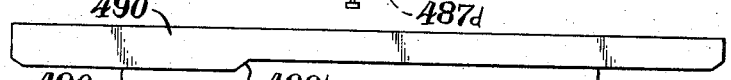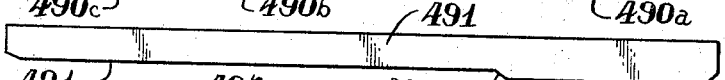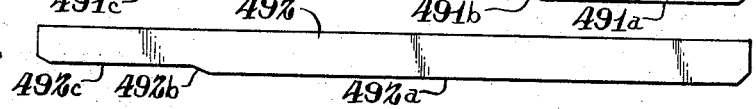

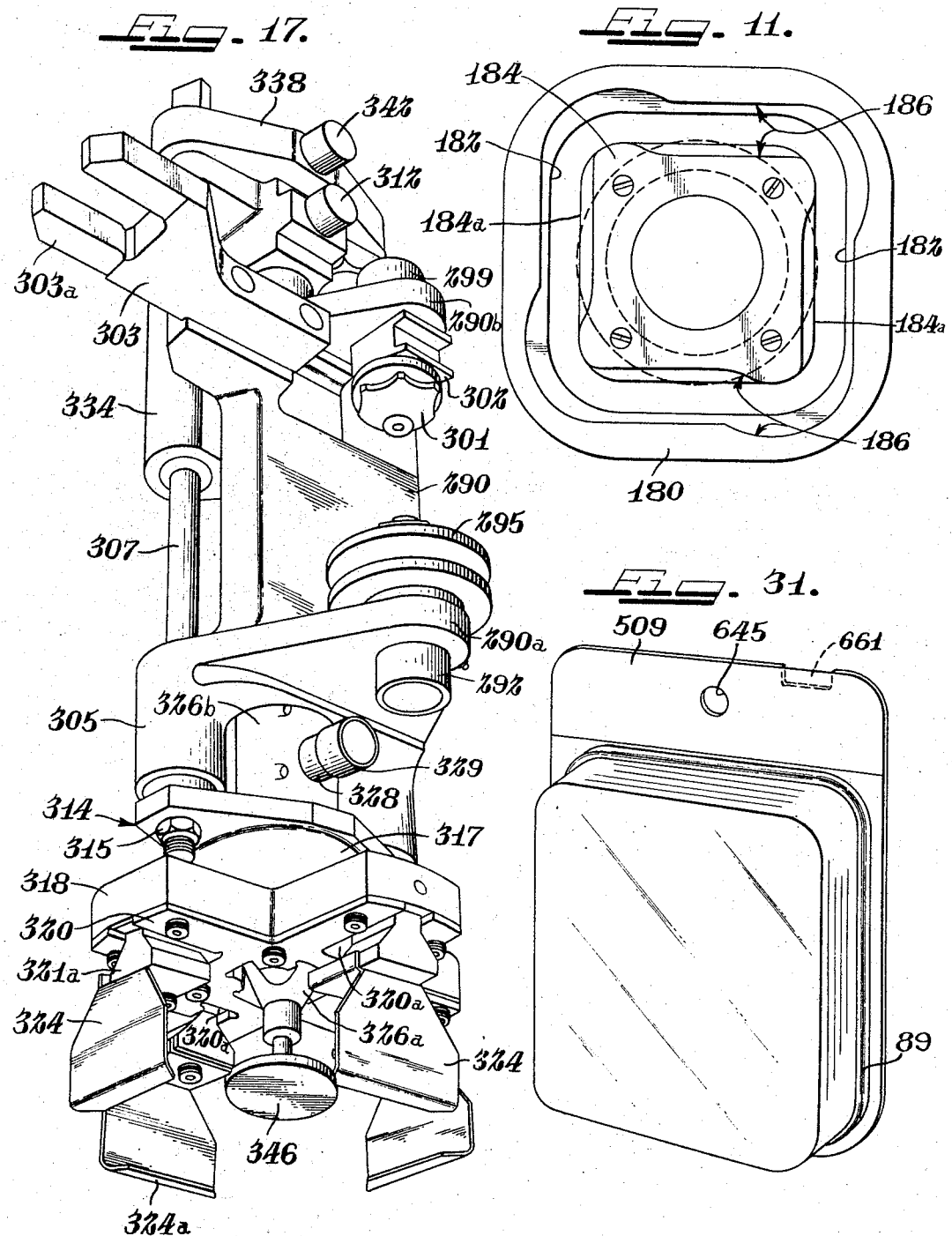

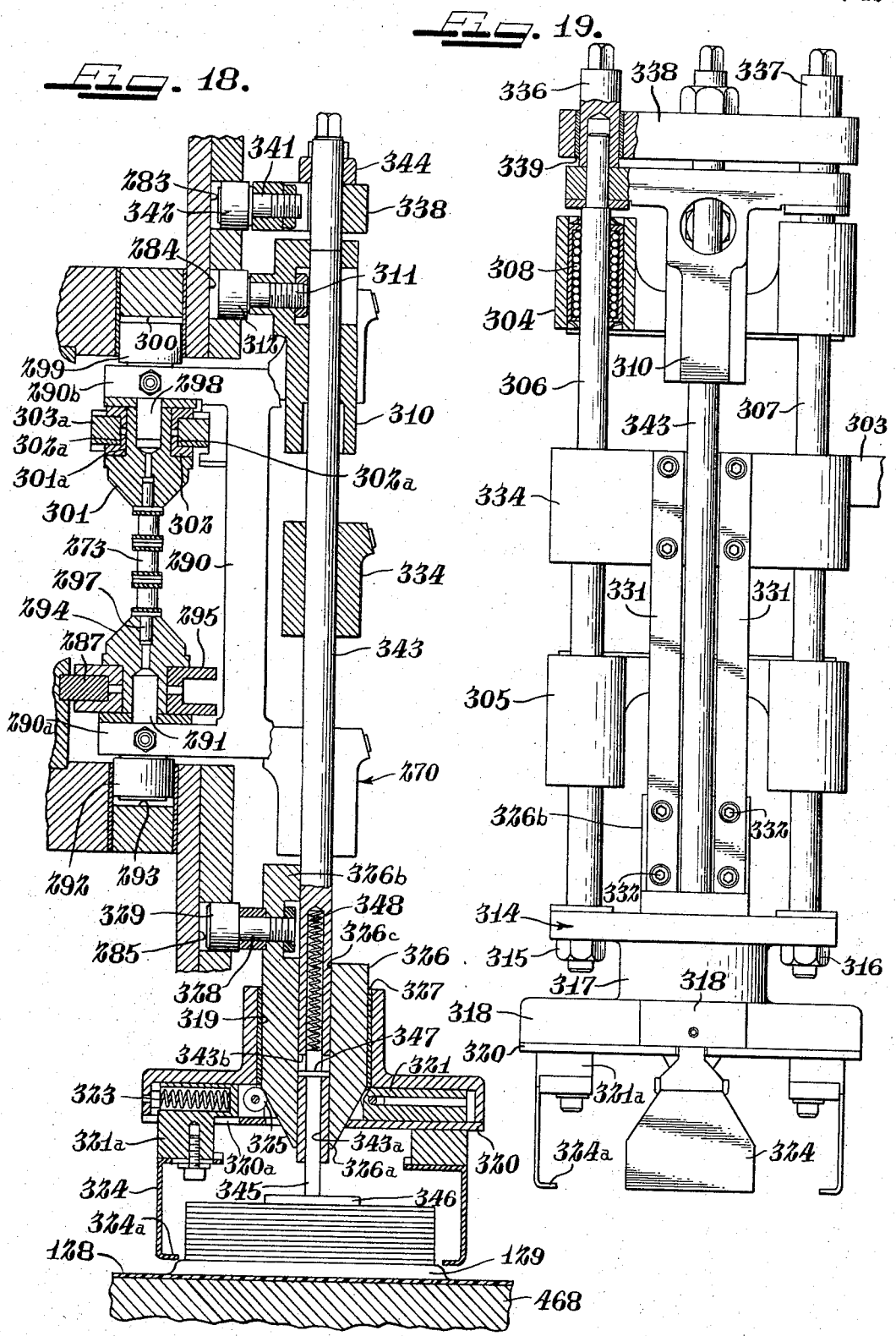

Oct. 31, 1967  H. A. JENSEN ET AL  3,349,540
METHOD AND APPARATUS FOR CONTINUOUSLY FORMING PACKAGES
Filed Nov. 4, 1964  30 Sheets-Sheet 13

INVENTORS
HANS A. JENSEN
AUGUSTUS H. EBERMAN
BY
Greist, Lockwood, Greenawalt & Dewey
Attys.

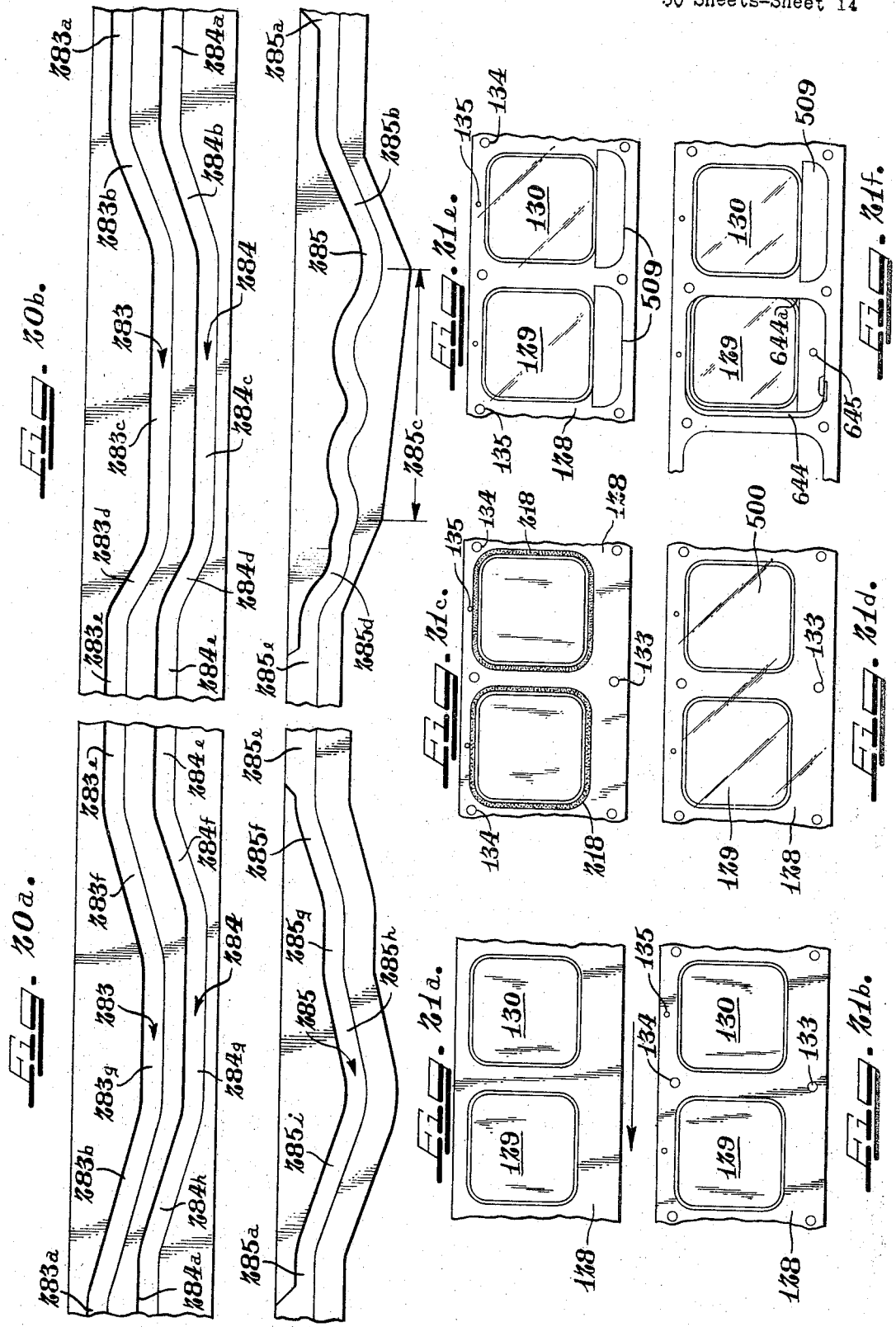

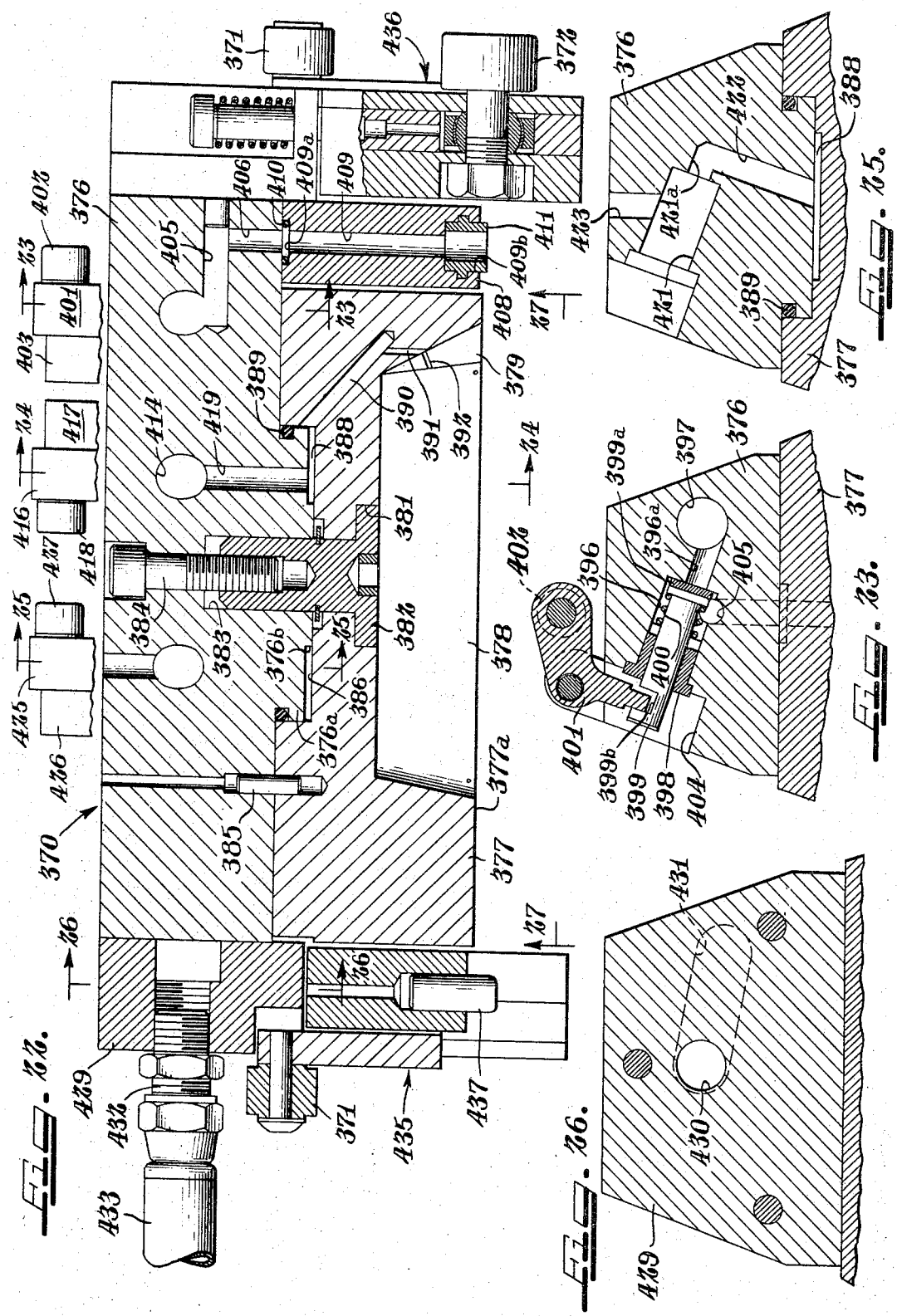

Oct. 31, 1967   H. A. JENSEN ET AL   3,349,540
METHOD AND APPARATUS FOR CONTINUOUSLY FORMING PACKAGES
Filed Nov. 4, 1964   30 Sheets-Sheet 16

INVENTORS
HANS A. JENSEN
AUGUSTUS H. EBERMAN
BY
Greist, Lockwood, Greenawalt & Dewey
Attys.

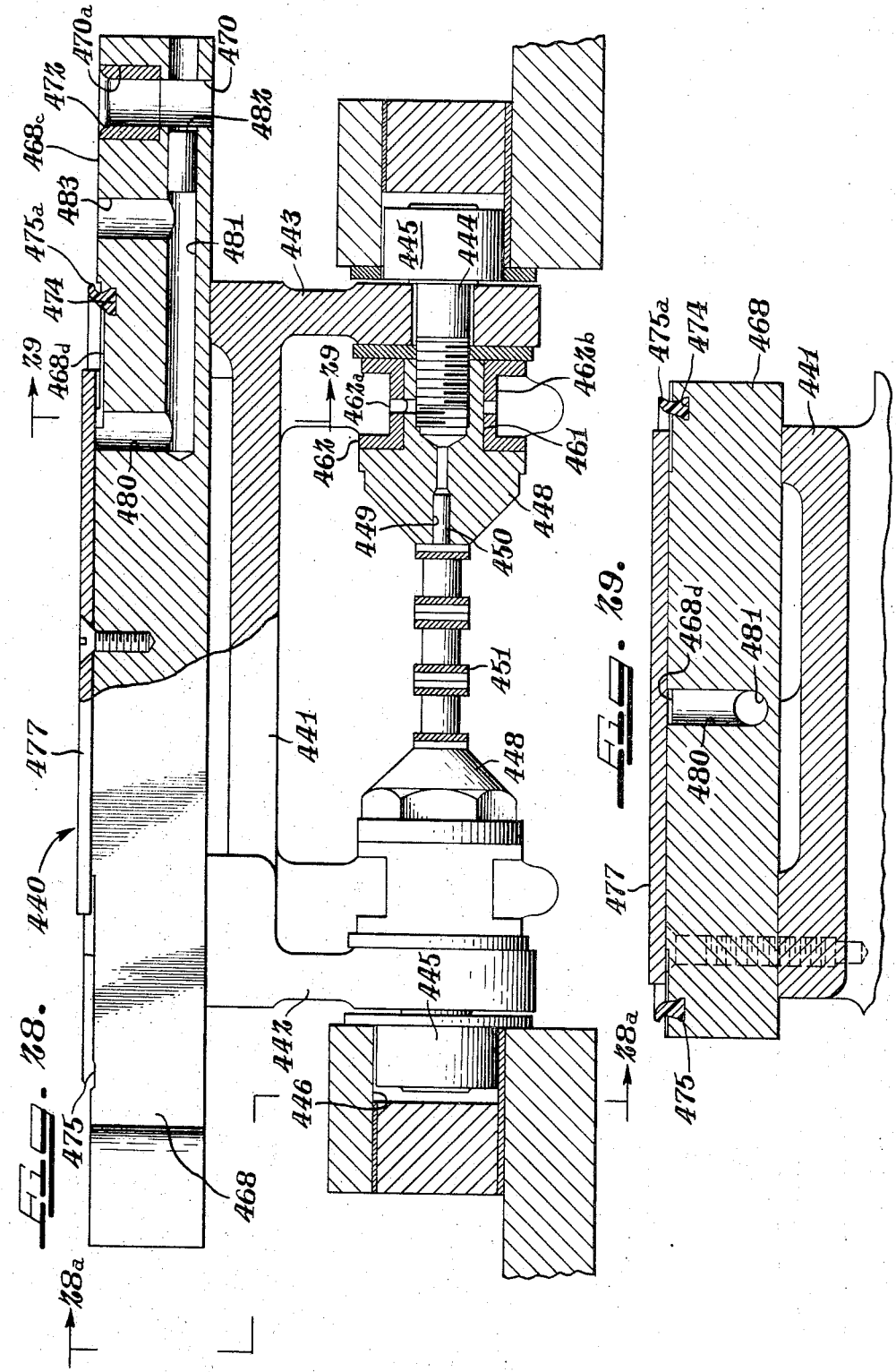

Oct. 31, 1967  H. A. JENSEN ET AL  3,349,540
METHOD AND APPARATUS FOR CONTINUOUSLY FORMING PACKAGES
Filed Nov. 4, 1964  30 Sheets-Sheet 18

INVENTORS
HANS A. JENSEN
AUGUSTUS H. EBERMAN
BY
Greist, Lockwood, Greenawalt & Dewey
Attys.

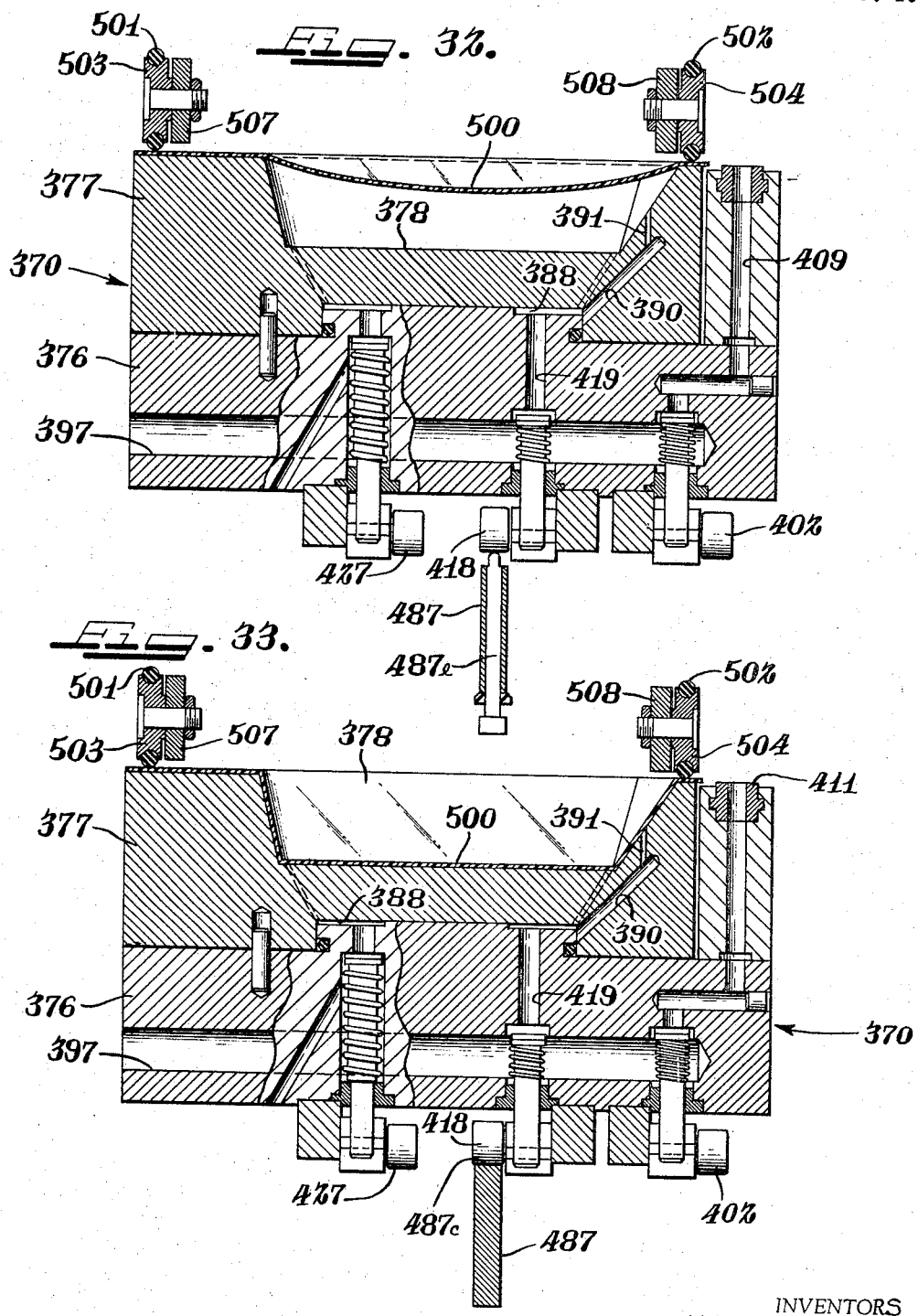

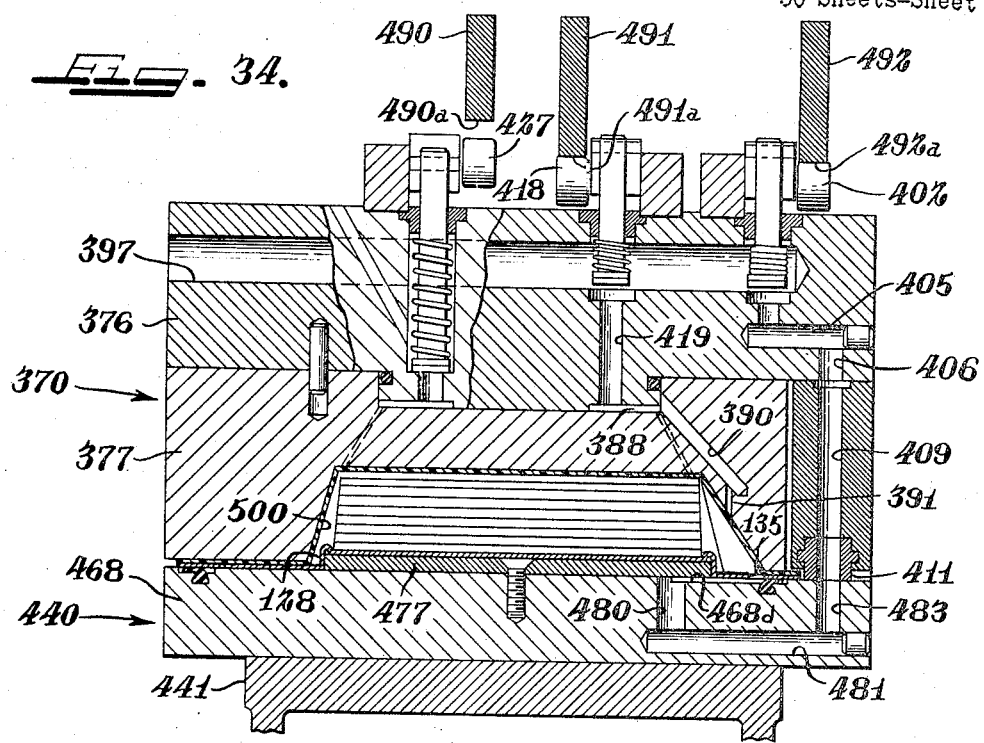
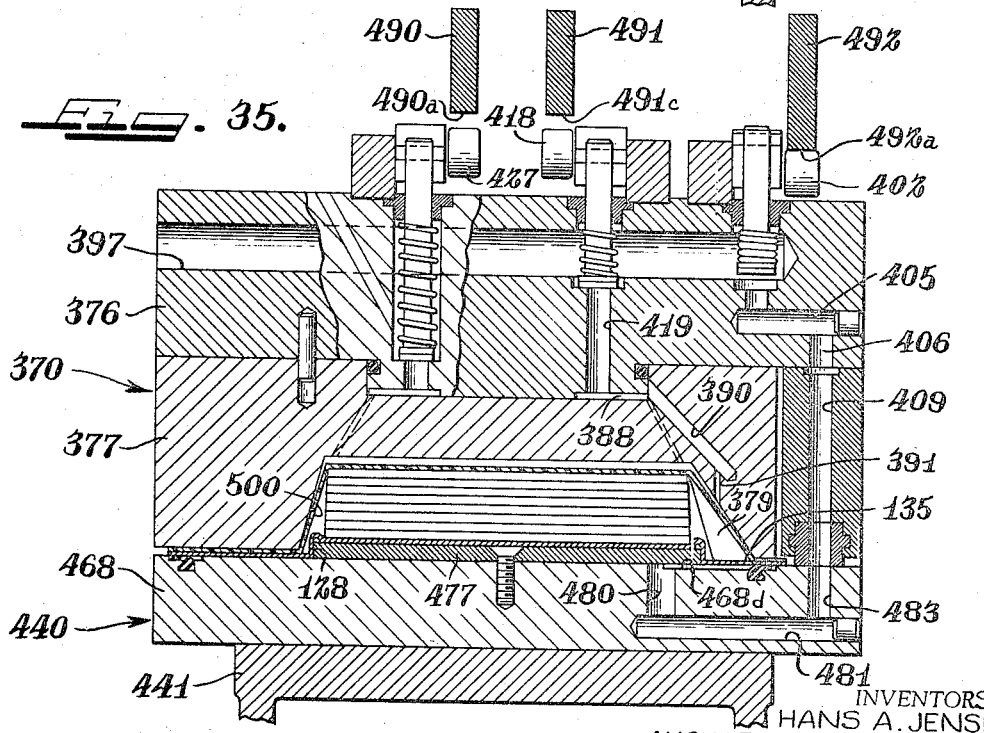

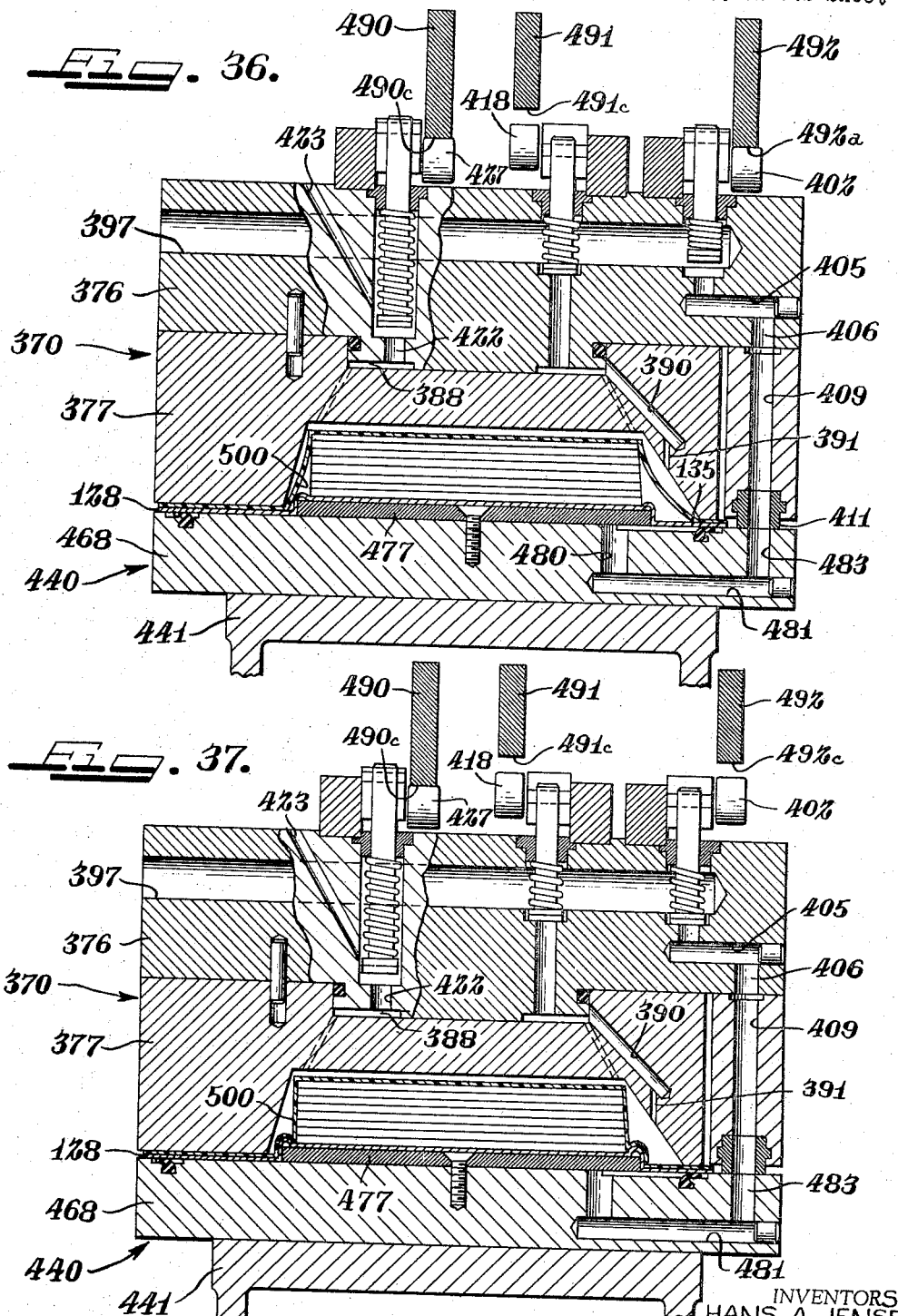

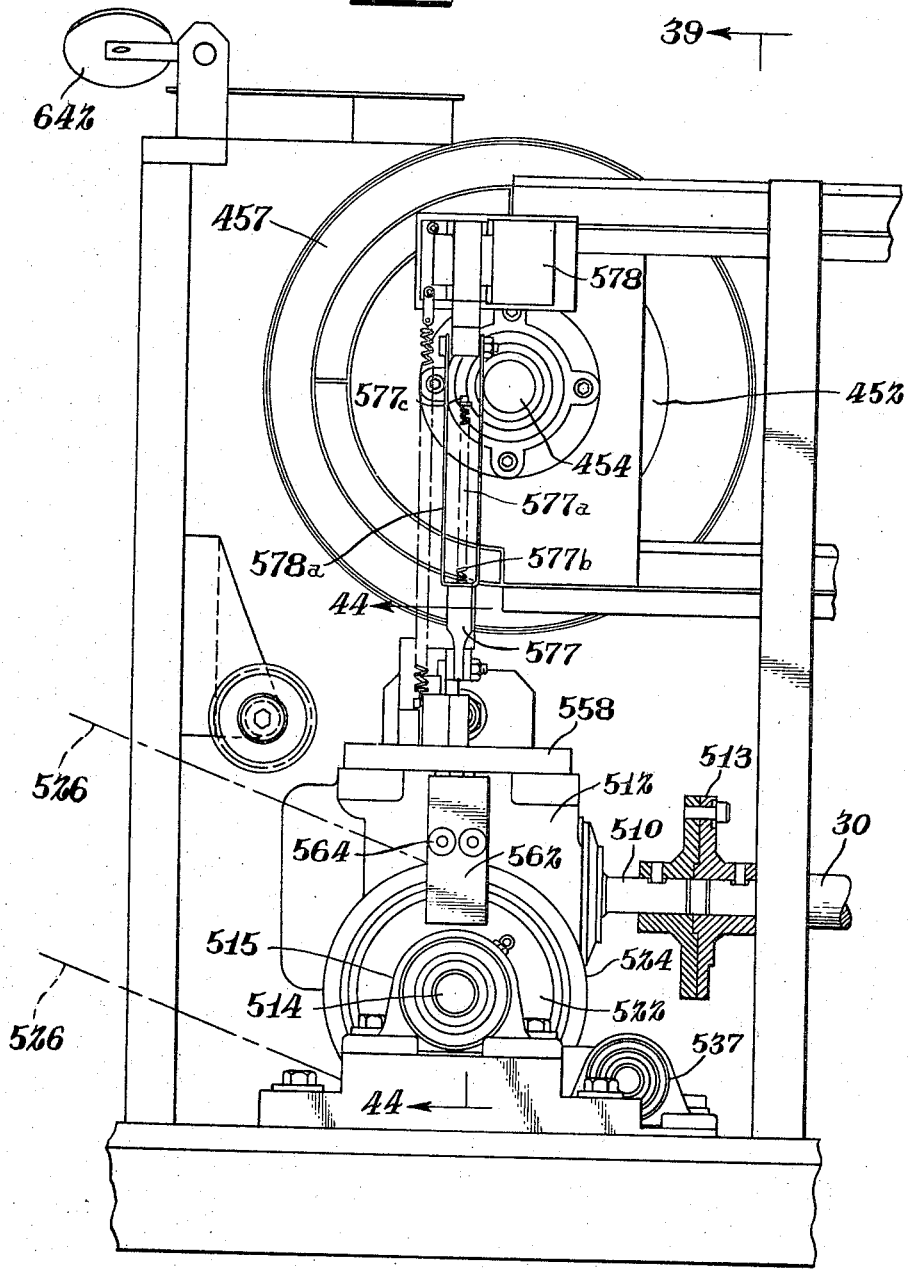

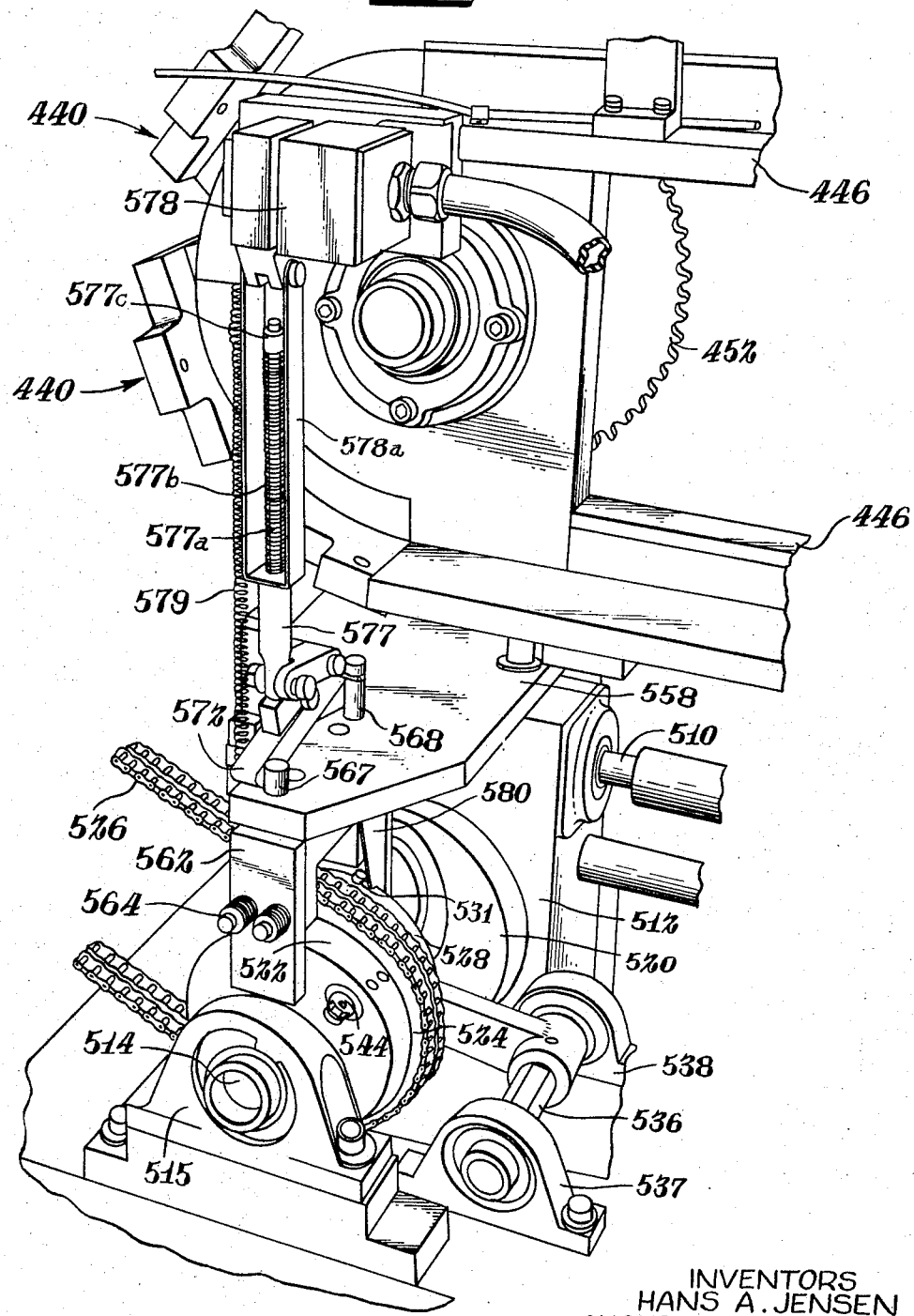

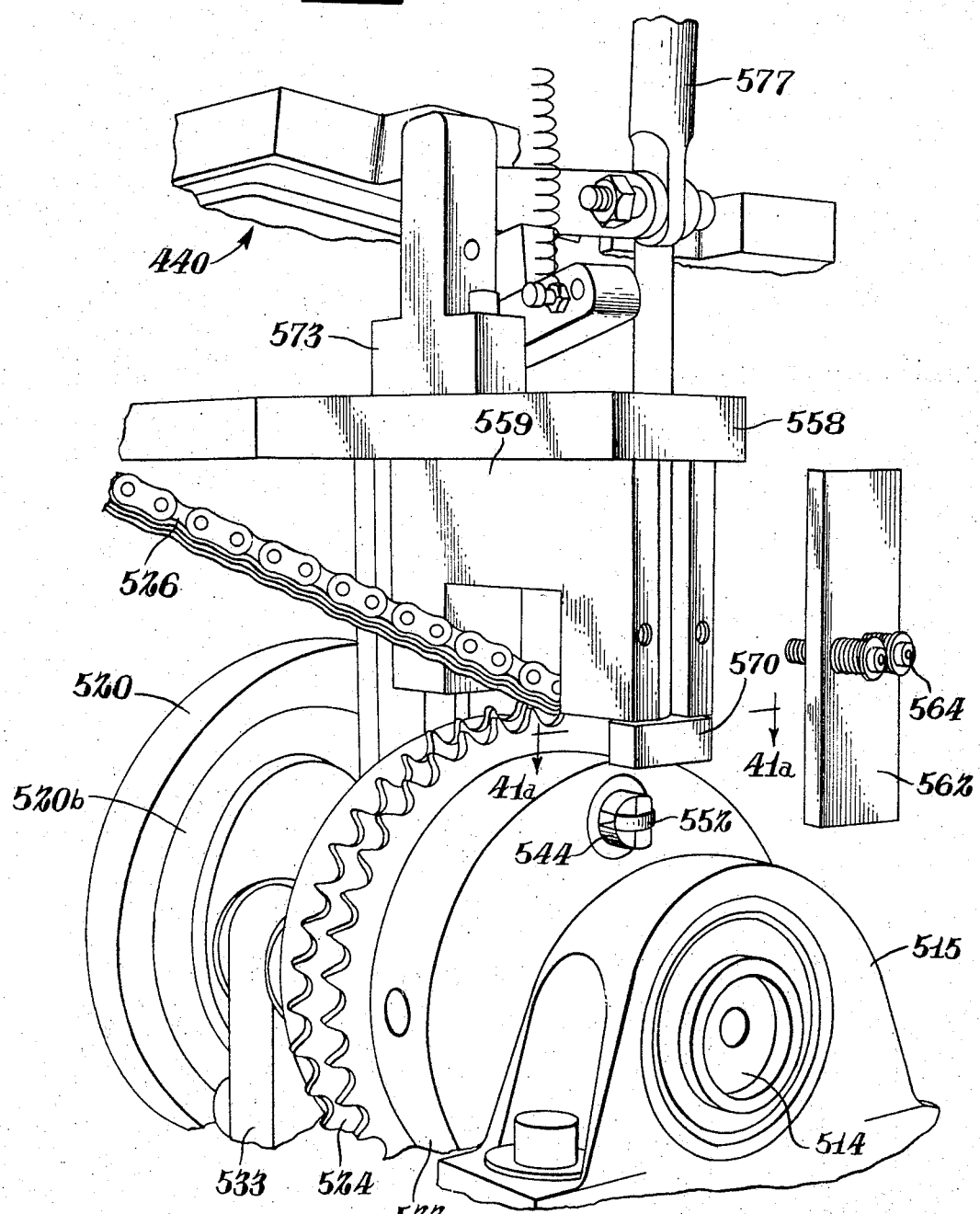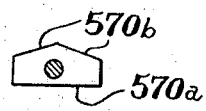

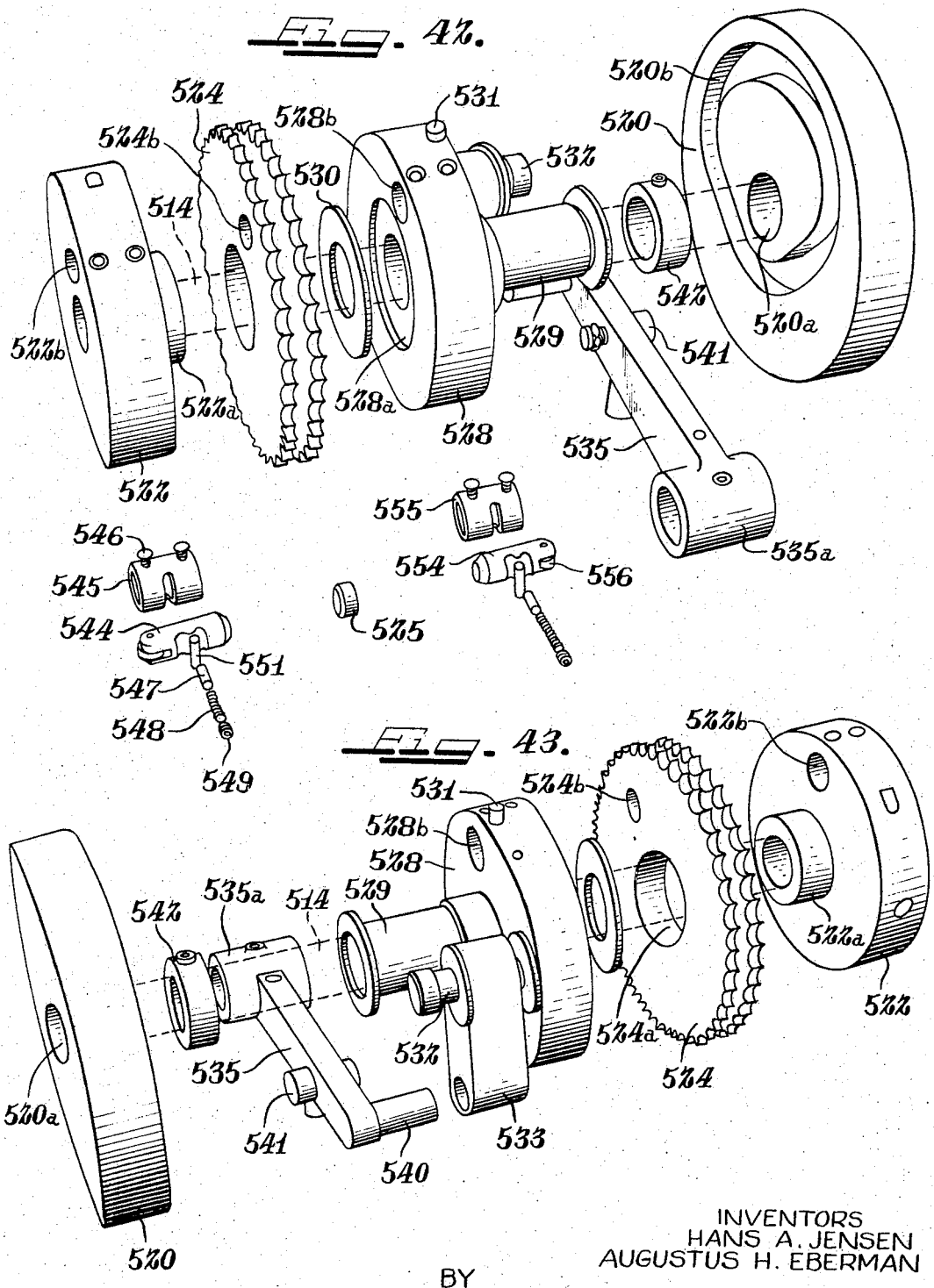

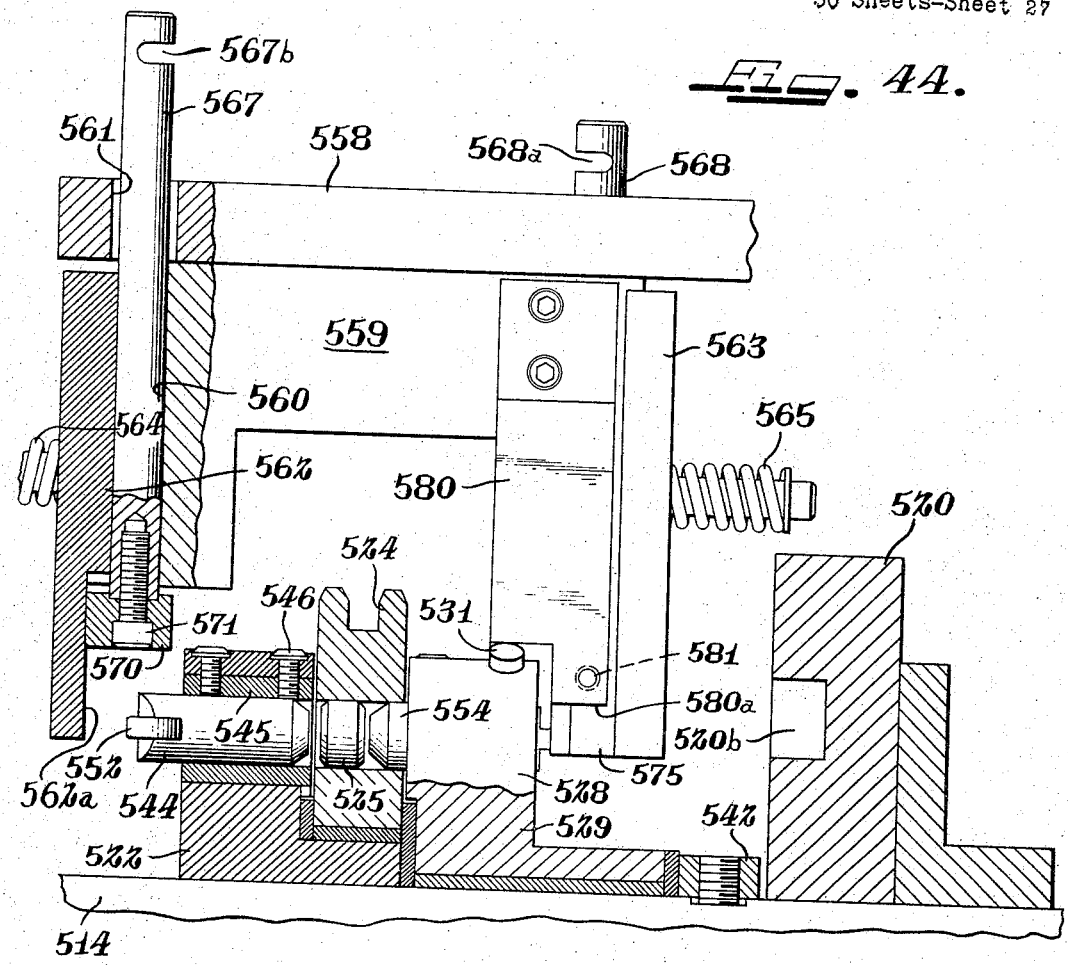
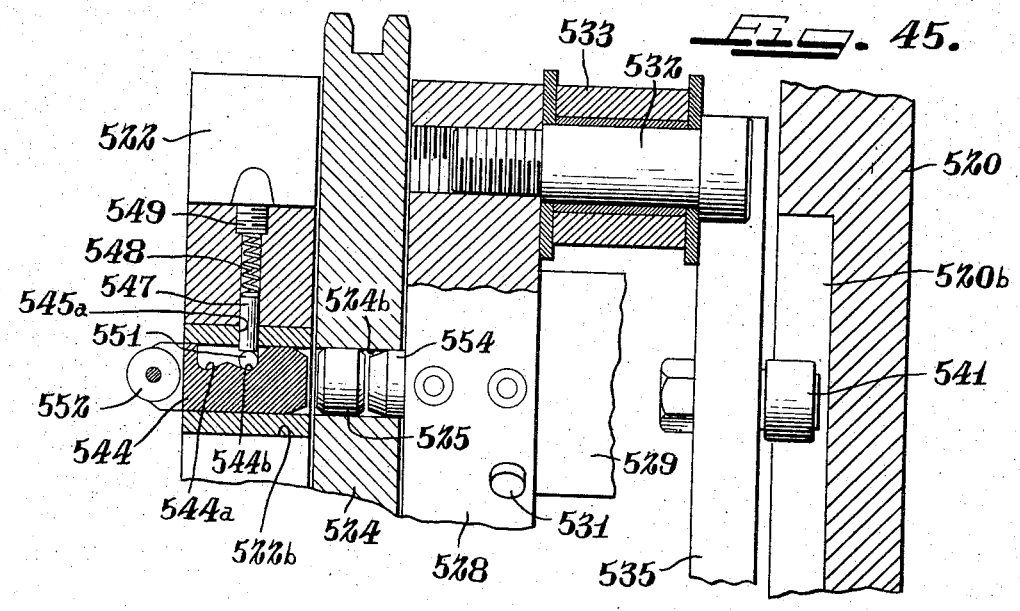

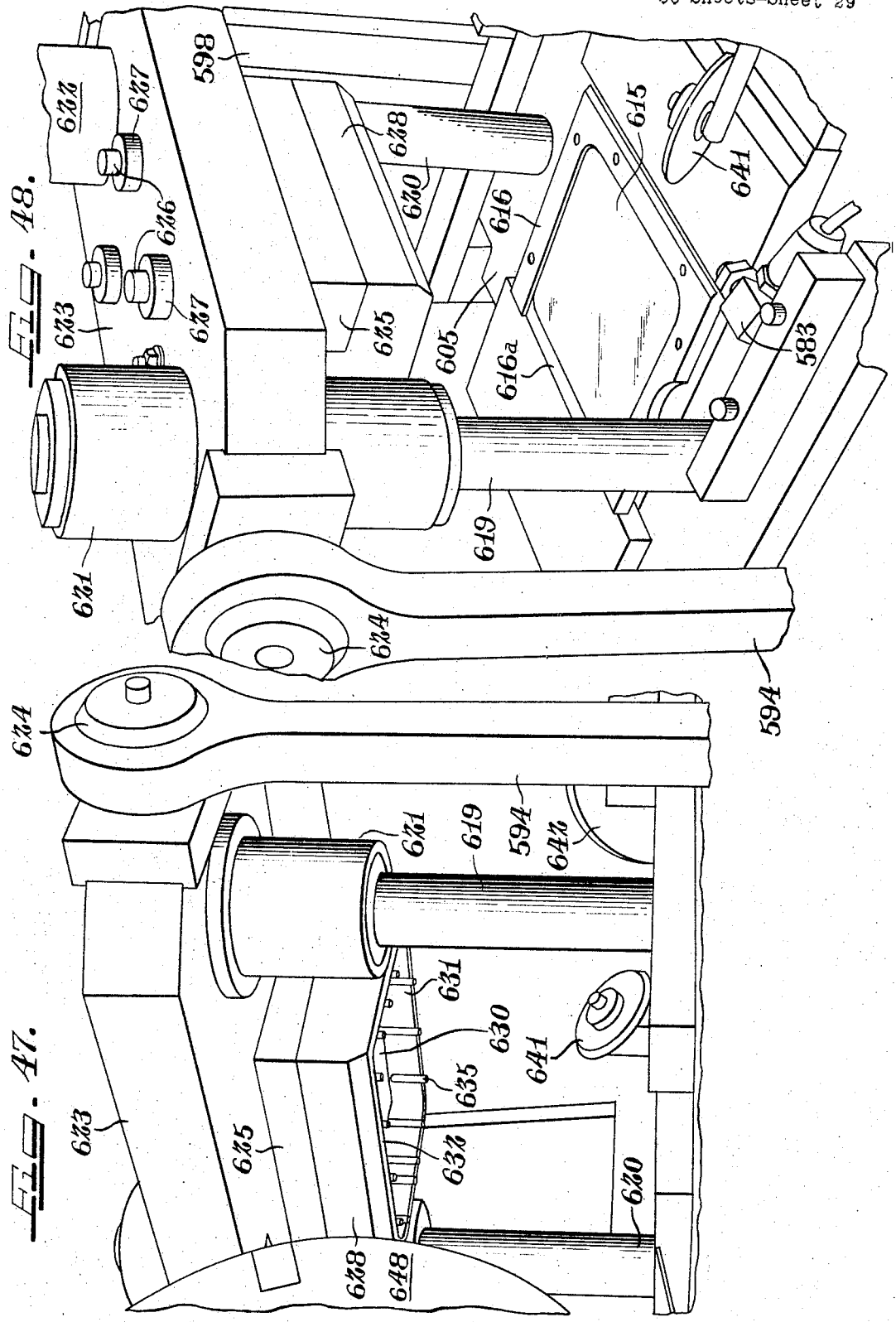

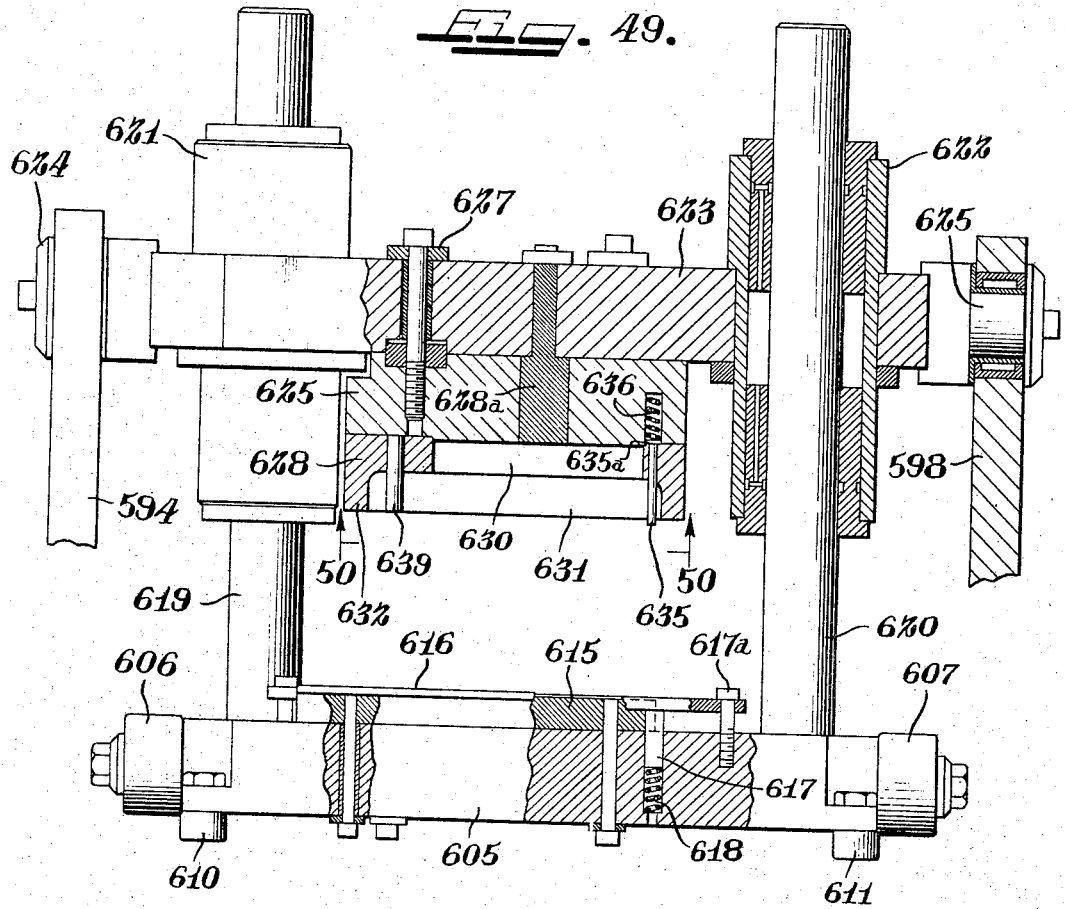
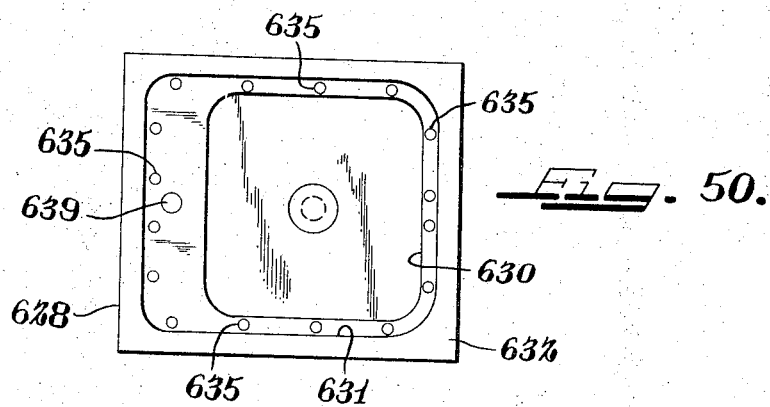

ent Office 3,349,540
Patented Oct. 31, 1967

3,349,540
METHOD AND APPARATUS FOR CONTINUOUSLY FORMING PACKAGES
Hans A. Jensen and Augustus H. Eberman, Madison, Wis., assignors to Oscar Mayer & Co., Inc., Chicago, Ill., a corporation of Illinois
Filed Nov. 4, 1964, Ser. No. 408,842
18 Claims. (Cl. 53—22)

ABSTRACT OF THE DISCLOSURE

Referring to FIGS. 2a and 2b, the package forming apparatus includes in series proceeding downstream, i.e. in the direction of film movement or from right to left as seen in these figures, a Base Forming Zone I, a Punching Zone II, an Adhesive Applying Zone III, a Product Loading Zone IV, a Package Forming Zone V, a Label Applying Zone VI, a Package Trimming Zone VII, and a Windup and Delivery Zone VIII.

In Base Forming Zone I, a thermoplastic sheeting or web is clamped in over and under relation between die platens of an endless series of base forming assemblies and drawn along a horizontal run. As the sheeting is held in clamped relation and advanced by the base forming assemblies, the sheeting is heated in separate areas spaced longitudinally of the sheeting, and these heated areas are then successively vacuum drawn into the upper die platens of the base forming assemblies thereby to form the package bases. The lower web with its formed bases is then advanced through Punching Zone II.

The Punching Zone II includes a suitable punching mechanism for successively punching patterns of holes in the lower web as it is being continuously advanced. Certain of the holes are provided for being received in pegs of a windup roller in Zone VIII. One of the holes in each pattern is located adjacent and just outward of each of the formed bases for serving as an opening for the evacuation of the product enclosing spaces formed in Packaging Zone V between the upper and lower films.

The web is next advanced through Adhesive Applying Zone III wherein a continuous strip of plasticizer or adhesive is applied around the periphery of each of the formed package bases as the latter are advanced. Photoelectric sensing means associated with the product delivery mechanism is provided to deactivate the adhesive applicator to prevent the application of adhesive around a base which may not be provided with a product. The lower web is then advanced to Product Loading Zone IV.

The Product Loading Zone includes an endless series of product loading assemblies each adapted to pick up a stack of a sliced food product, for example, from a feed conveyor and deposit the stack on one of the formed bases as the latter is being continuously advanced. The product loading assemblies include means for "squaring up" or vertically aligning the stacks of food products. The lower web having the products deposited or loaded thereon is then advanced through Package Forming Zone V.

Package Forming Zone V includes endless series of upper and lower die plate assemblies of the type disclosed and claimed in Eberman et al. application, Ser. No. 299,000, filed July 31, 1963, now United States Patent 3,290,858. The lower die plate assemblies advance the lower web with the formed bases and products supported thereon. The upper die plate assemblies bring the upper film into overlying relation with the lower film. The upper die plate assemblies are associated with vacuum means for successively forming depressions in the upper film before it is brought into overlying relation with the lower film, which depressions subsequently receive the products on the lower film. The upper and lower die plate assemblies come into confronting relation sealing the upper and lower films together around the product thereby to form product enclosing spaces between the upper and lower films. The upper and lower die plate assemblies include vacuum means for evacuating the spaces between the upper and lower films and for drawing the upper film into intimate contact with the products and into sealing relation with the lower film.

The complete packages which are formed in longitudinal spaced relation between the sealed together films are then advanced through Label Applying Zone VI. This zone, may include any suitable labeler, such as a package labeler of the type disclosed in Orloff Patent 2,952,376.

The packages are then advanced through Package Trimming Zone VII. This zone includes a package trimmer for severing the packages from the sealed together films or sheets as the latter are being continuously advanced. The Package Trimmer forms an endless cut around the periphery of the package thereby successively forming spaced openings in the sealed together webs leaving them in ladder-like form. The trailing edges of the openings formed in the film engage trailing portions of the severed or separated packages for advancing the latter from Package Trimming Zone VII to Windup and Delivery Zone VIII.

In Windup and Delivery Zone VIII, the ladder-like webs are drawn over a pegged windup wheel and then sent to a chopping apparatus which chops the webs into small pieces as scrap material. Windup and Delivery Zone VIII also includes a chute or the like for collecting the completed packages for being placed in a large box or carton for shipping.

---

This invention relates generally to packaging, and more particularly to a new and improved method and apparatus for forming in an automatic and continuous manner hermetically sealed packages containing food products or other articles.

The method and apparatus of this invention are primarily directed to forming a package including a base film or sheet of thermoplastic material and a thin upper or cover film which is capable of being drawn into intimate contact with a product on the base film and sealed to the latter in product enclosing relation. A package of this type is disclosed and claimed in co-pending Goller et al. application, Ser. No. 298,353, filed July 29, 1963, now United States Patent 3,229,810.

The package disclosed in the aforementioned co-pending application includes a base film or sheet preferably formed from polyvinyl chloride sheeting having a thickness of at least 0.011 inch. Such material in its flat condition is quite flexible and ordinarily is not considered to have sufficient rigidity to form the base of a package of the type described; however, this material has the capability of being readily shaped by the application of heat and pressure. Such sheeting is readily heat shaped in the form of a base member having a peripherally continuous rim or ridge which rigidifies the material to such an extent that the base is quite capable of supporting a product. This rim or ridge also serves to cooperate with the thin upper film to provide a highly efficient seal.

A product, such as a stack of sliced food products, is deposited on the formed base and the thin upper film is drawn into intimate contact with the product and sealed to the base around the continuous rim or ridge formed on the latter. The upper film includes at least an inner laminate of polyvinylidene chloride which is applied to the product and base in its amorphous supercooled condition. This thin upper film is capable of being fully and intimately collapsed or drawn over the exposed surfaces of the product in tight conforming relation therewith by a package-forming evacuation technique whereby a vacuum is formed within the package to draw the film into tight adherence with the product and with the base member of the package. When supercooled polyvinylidene chloride film, or other adequately formable and stretchable amorphous film in a heated condition, is drawn tightly over the product and collapsed against the rim or ridge of the base member, such film smoothly acquires the configuration of the product and rim and tightly and intimately adheres thereto.

Supercooled polyvinylidene chloride film is capable of establishing sufficient adherence with the polyvinyl chloride base of film or sheet to create a hermetic seal without the necessity of relying on heat sealing. In this respect a package can be formed by these materials in a cold condition without the application of heat, thereby readily adapting such a package for use in packaging of heat-sensitive materials and permitting use of heat-sensitive forming materials. However, in order to improve upon the seal established between the upper film and base film, the upper surface of the base film preferably includes a marginally continuous, thin coating of suitable sealant, such as a plasticizer or pressure-sensitive adhesive.

It is believed that the above description of the Goller et al. package is sufficient for aiding in understanding the apparatus of this invention and its operation. For a more detailed disclosure of this package, reference should be had to the above referred to application.

A primary object of the present invention is the provision of a new and improved method for continuously forming a package of the type described.

Another primary object of the present invention is the provision of a new and improved apparatus for continuously and automatically forming packages of the type described.

Another object of the present invention is the provision of a method of making a package of the type described which includes the steps of, forming raised bases in a base web of thermoplastic material, forming a small hole in the base web adjacent each of the bases, applying an upper film to the base web in product enclosing relation, evacuating the product-enclosing spaces between the upper and lower films by drawing a vacuum through the small openings, and then vacuum-drawing the upper film into conformity with the product and base web thereby closing the small openings and sealing the packages.

Still another object of the present invention is the provision of an apparatus for continuously forming products of the type described, which apparatus includes in combination, means for successively forming raised bases on a continuous base web of thermoplastic film, means for depositing products on the bases, and means for drawing an upper film over the product and in sealed package forming relation with the bases.

Another object of the present invention is the provision of an apparatus for continuously forming packages of the type described, which apparatus includes in combination, means for advancing a continuous lower film of package forming material, means for successively forming small openings in the lower film in spaced relation longitudinally of the latter, means for depositing a product on the lower film adjacent each of the small openings formed therein, means for bringing an upper film in product enclosing relation with the lower film, means for evacuating the product enclosing spaces between the upper and lower films by drawing a vacuum through the small openings in the latter, and means for drawing the upper film into conformity with the products and into sealing relation with the lower film.

Still another object of the present invention is to provide in a machine of the type described, new and improved means for successively forming raised bases in a continuous sheet of thermoplastic material as the latter is continuously advanced.

Still another object of the present invention is to provide in a machine of the type described, new and improved means for successively applying endless strips of adhesive on a web of package forming material as the latter is continuously advanced.

Another object of the present invention is to provide in a machine of the type described a new and improved adhesive applying mechanism, and means for automatically deactivating the latter upon the occurrence of a predetermined condition.

These and other objects and advantages of the invention will become apparent from the following specification disclosing a preferred embodiment of the invention which is illustrated in the accompanying drawings.

In the drawings:

FIG. 1a is a top plan view of a downstream portion of the apparatus of this invention;

FIG. 1b is a continuation of FIG. 1a showing the remaining or upstream portion of the apparatus;

FIG. 2a is a side elevation view of the portion of the machine illustrated in FIG. 1a;

FIG. 2b is a continuation of FIG. 2a showing a side elevation of the upstream portion of the apparatus shown in FIG. 1b;

(The side of the machine illustrated in FIGS. 2a and 2b will be termed herein as the near side, and the opposite side of the machine will be termed herein as the far side.)

Figure 18A:
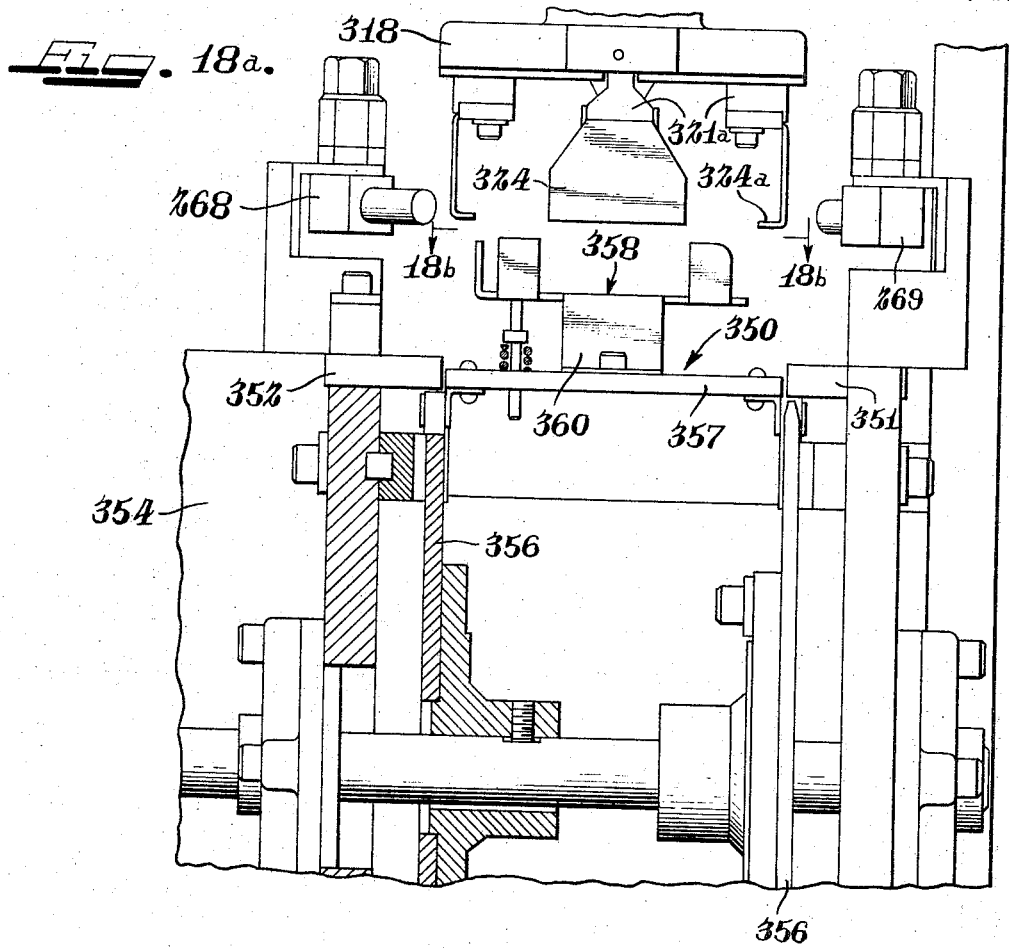
Figure 18B:
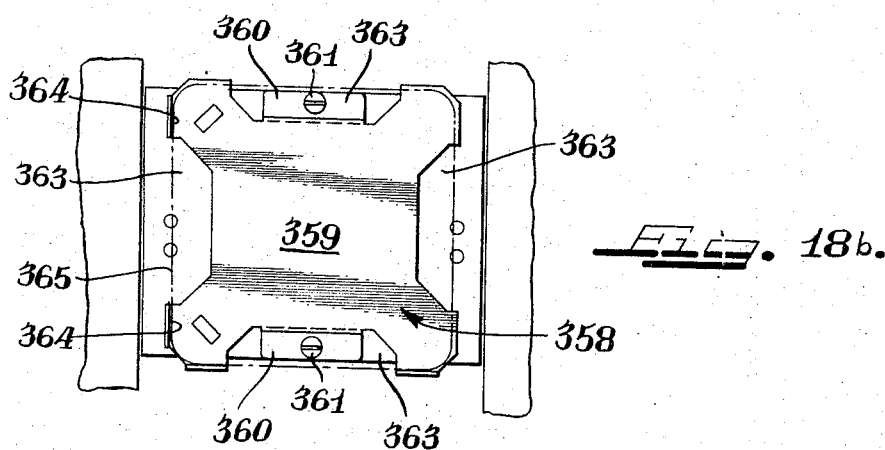
Figure 24:
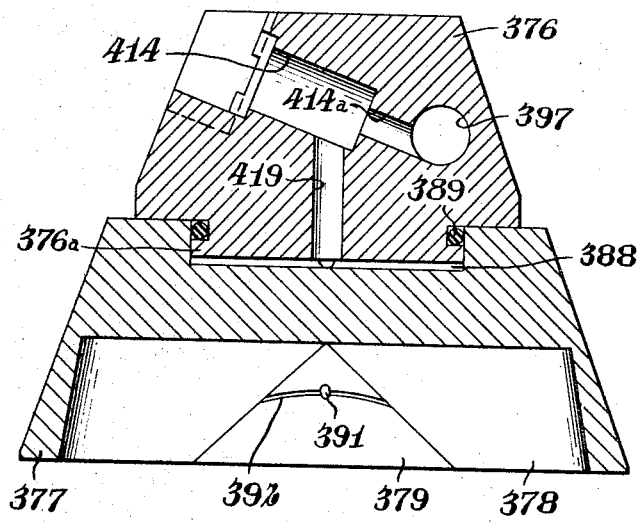
Figure 27:
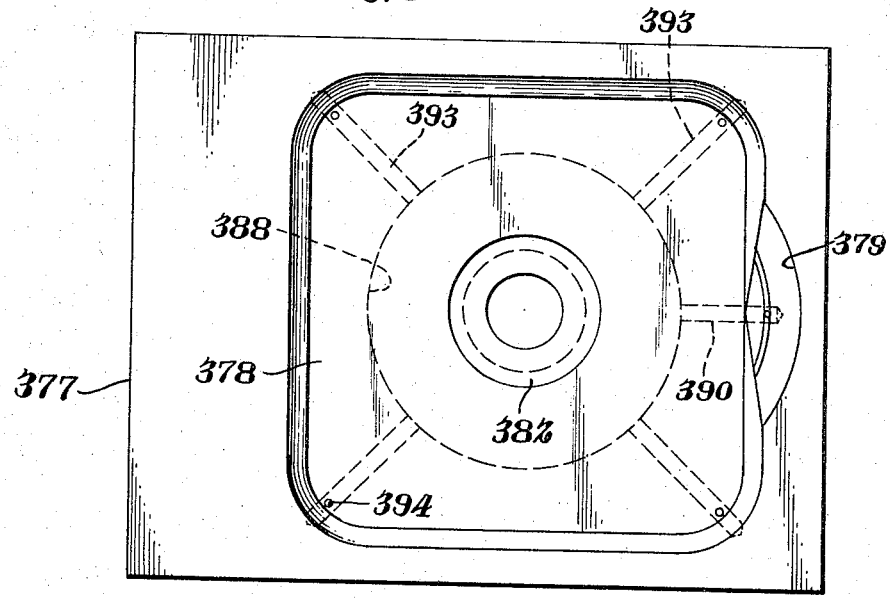
Figure 30:
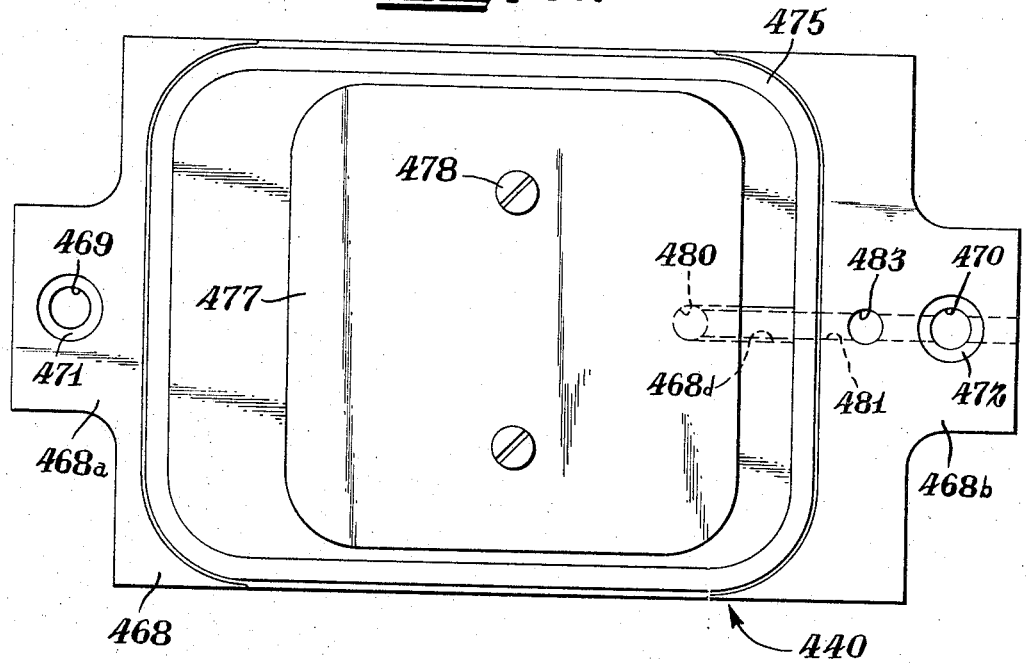
Figure 28A:
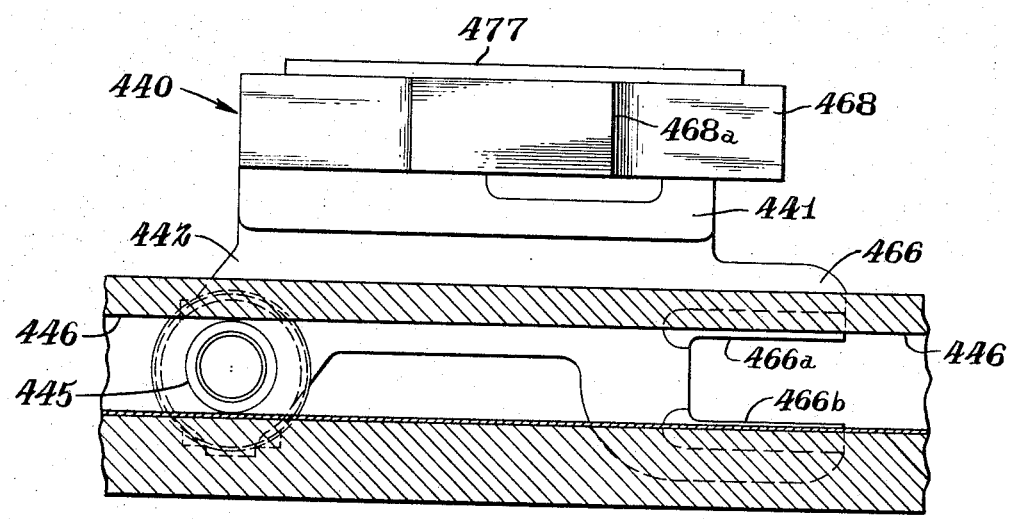
Figure 39:
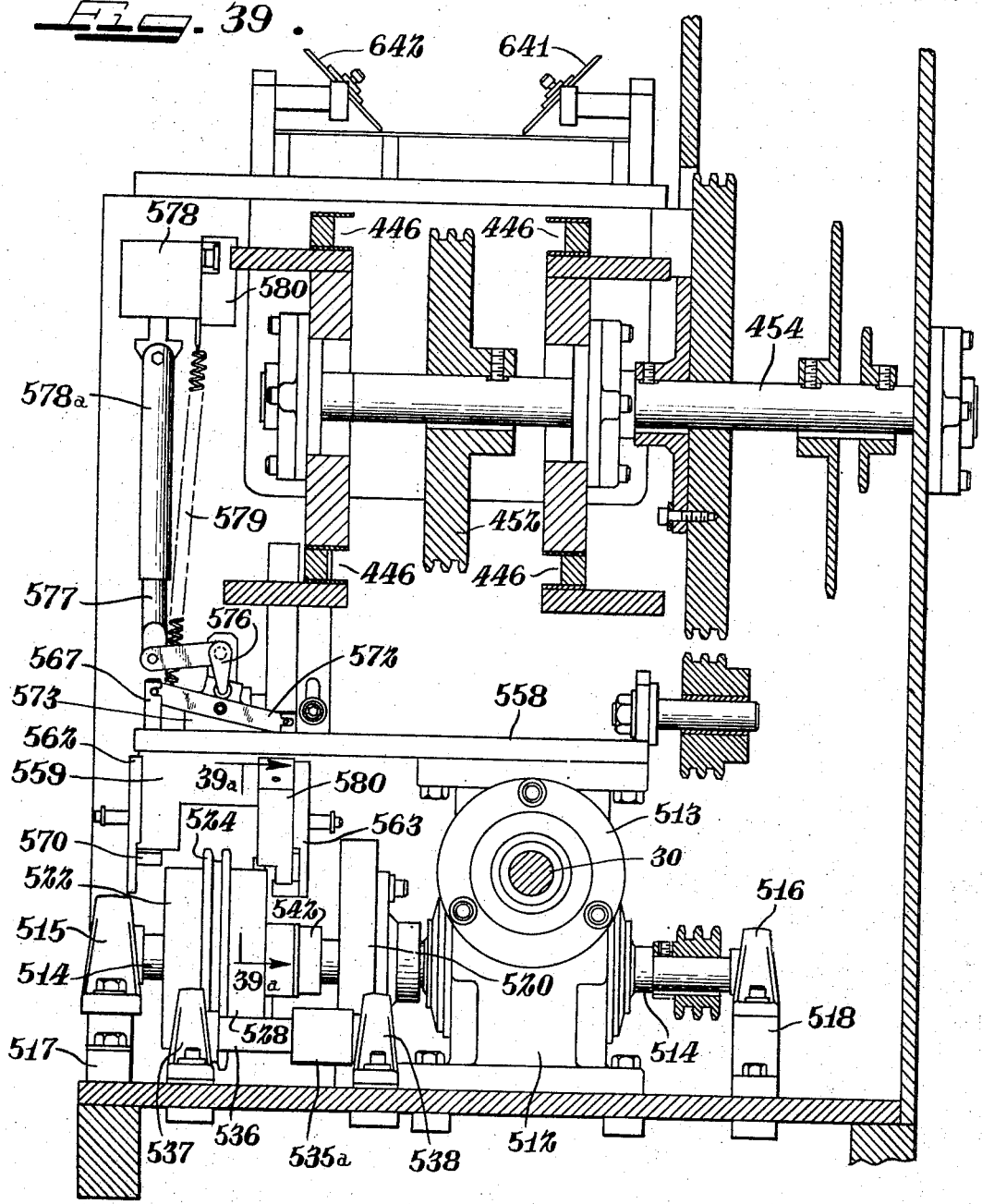
Figure 39A:
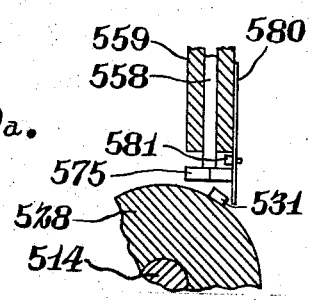
Figure 46:
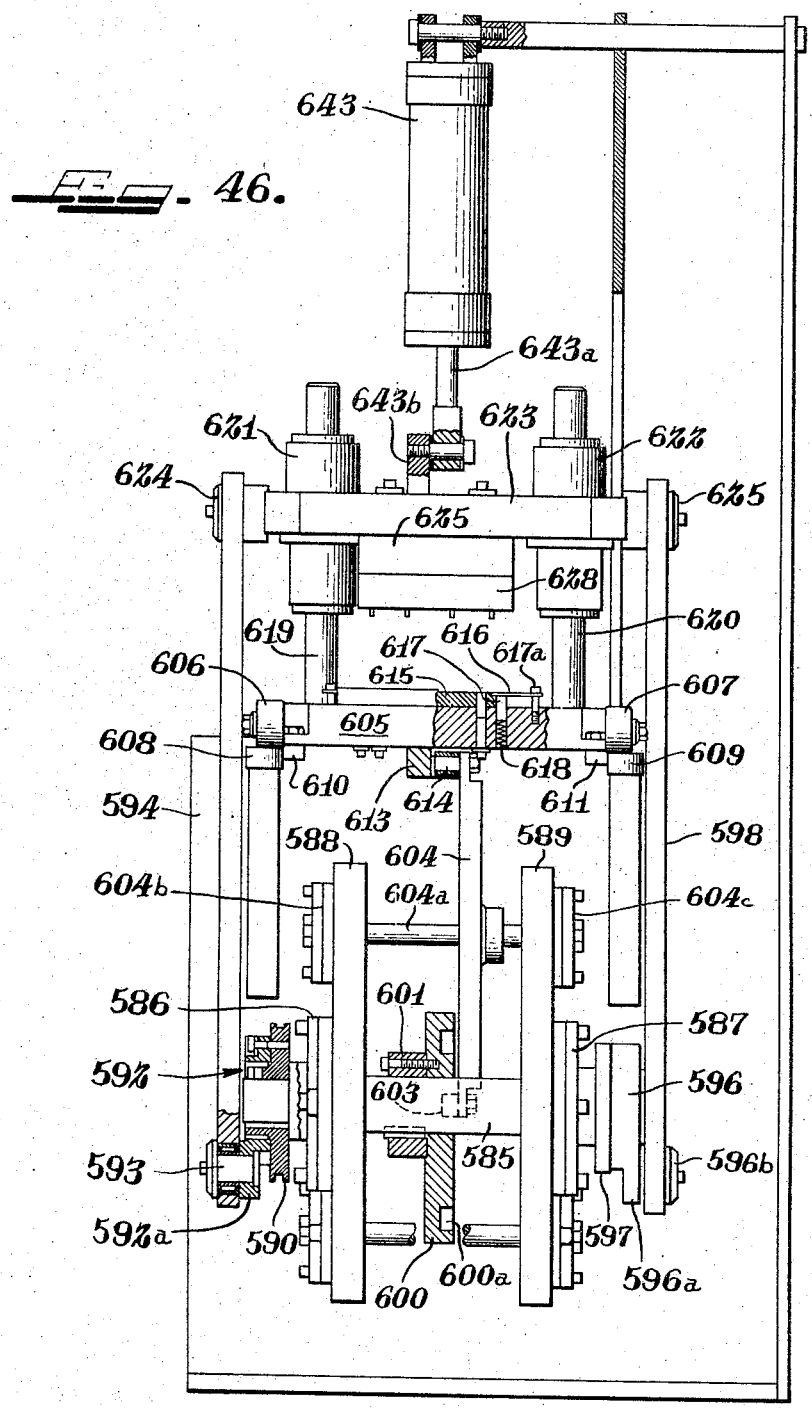

FIG. 3 is an enlarged fragmentary perspective view as seen from the near side of the apparatus showing two of the base forming assemblies for successively forming the package bases in the lower web or sheet of package forming material;

FIG. 4 is a fragmentary perspective view as seen from the far side of the apparatus primarily showing a portion of the drive mechanism for the adhesive applicator;

FIG. 5 is an enlarged view taken along the line 5—5 of FIG. 3 with certain parts being broken away and shown in section;

FIG. 6 is a view taken along line 6—6 of FIG. 5 with certain parts being broken away and shown in section;

FIG. 6a is a section taken along line 6a—6a of FIG. 6;

FIG. 7 is a diagrammatic view of a cam track associated with the endless series of base forming assemblies for actuating the latter;

FIGS. 8 and 9 are, respectively, upper and lower portions of a view taken along line 8—8 of FIG. 2b showing the adhesive applying mechanism, with certain parts being broken away and shown in section and with the scale in FIG. 8 being slightly larger than the scale of FIG. 9;

FIG. 10 is an enlarged view of the portion of the adhesive applicator enclosed within the circle designated A in FIG. 2b;

FIG. 11 (adjacent FIG. 17) is a view taken along the line 11—11 of FIG. 8 with certain parts not being shown for purposes of better illustration;

FIGS. 12, 12a and 12b are enlarged sections taken along line 12—12 of FIG. 8 and showing certain parts of the adhesive drive mechanism in various stages of operation;

FIG. 13 is an enlarged perspective view of the mechanism illustrated in FIG. 12 as seen from the near side of the apparatus;

FIG. 14 is an enlarged perspective view of the adhesive applicator as seen looking upstream from the near side of the apparatus;

FIG. 15 is an enlarged perspective view of the adhesive applying roller assembly shown removed from its overhead mounting member;

FIG. 16 is an enlarged perspective view as seen from the near side of the apparatus looking downstream, and fragmentarily showing one of the endless series of product loading assemblies and also showing the packaging zone which includes an endless series of upper die plate assemblies adapted to bring the upper film into overlying relation with the lower sheet or film;

FIGS. 16a, 16b, 16c and 16d are diagrammatic views of cam tracks forming a part of the package forming zone;

FIG. 17 is a perspective view of one of the product loading assemblies;

FIG. 18 is an enlarged partial vertical section and partial elevation taken generally along line 18—18 of FIG. 2a;

FIG. 18a is an enlarged partial vertical section and partial elevation taken along line 18a—18a of FIG. 1a;

FIG. 18b is a view taken along line 18b—18b of FIG. 18a;

FIG. 19 is an elevational view of one of the product loading assemblies with a portion thereof being broken away and shown in section;

FIG. 20a is a diagrammatic view of cam tracks on the near side of the product loading apparatus, which cam tracks operate certain components of the product loading assemblies;

FIG. 20b is a diagrammatic view of cam tracks on the far side of the product loading apparatus, which cam tracks are a continuation of the cam tracks shown in FIG. 20a;

FIGS. 21a through 21f are diagrammatic plan views sequentially showing the formation of packages by the apparatus of this invention;

FIG. 22 is an enlarged vertical section taken through one of the upper die plate assemblies transverse to its direction of movement and showing the die assembly in its package forming position;

FIG. 23 is a section taken along the line 23—23 of FIG. 22;

FIG. 24 is a section taken along line 24—24 of FIG. 22 with certain parts being omitted for convenience of illustration;

FIG. 25 is a section taken along line 25—25 of FIG. 22 with certain parts being omitted for convenience of illustration;

FIG. 26 is a section taken along line 26—26 of FIG. 22;

FIG. 27 is a view taken along line 27—27 of FIG. 22;

FIG. 28 is an enlarged partial elevation and a partial vertical section taken through one of the lower die plates transverse to its direction of movement;

FIG. 28a is a section taken along line 28a—28a of FIG. 28 with certain parts being broken away for purposes of better illustration;

FIG. 29 is a section taken along line 29—29 of FIG. 28;

FIG. 30 is a top plan view of one of the lower die plates;

FIG. 31 (adjacent FIG. 1) is a perspective view of a completed package formed by the package forming apparatus of this invention;

FIGS. 32 through 37 are enlarged sections, largely diagrammatic, taken along the corresponding numbered lines of FIG. 2a and sequentially showing the various stages of operation of the upper and lower die plate assemblies in the package forming zone of the apparatus;

FIG. 38 is an enlarged side elevational view of the portion of the machine within the phantom line designated B in FIG. 2a primarily showing a portion of the support for the lower die plates and showing a clutch and drive for the package trimmer;

FIG. 39 is a section taken along the line 39—39 of FIG. 38 primarily showing the clutch;

FIG. 39a is a section taken along line 39a—39a of FIG. 39;

FIG. 40 is an enlarged perspective view looking downstream as seen from the near side of the apparatus showing the portion thereof illustrated in FIG. 38;

FIG. 41 is an enlarged fragmentary, perspective view of the clutch as seen looking upstream and from the near side of the apparatus;

FIG. 41a is a section taken along line 41a—41a of FIG. 41;

FIG. 42 is an enlarged, exploded, perspective view of certain components of the clutch as seen looking generally downstream of the apparatus;

FIG. 43 is an exploded perspective view of certain components of the clutch as seen looking generally upstream of the apparatus;

FIG. 44 is an enlarged fragmentary section taken generally along line 44—44 of FIG. 38;

FIG. 45 is a view as seen looking down in FIG. 42 with the various parts in their assembled condition;

FIG. 46 is an enlarged section taken along line 46—46 of FIG. 2a and showing the package trimmer of the apparatus of this invention;

FIG. 47 is an enlarged perspective view showing the upper die assembly of the trimmer as seen looking from the near side of the apparatus and generally upstream;

FIG. 48 is a prespective view of the package trimmer as seen looking from the near side and generally downstream of the apparatus;

FIG. 49 is an enlarged view of the upper portion of the trimming mechanism illustrated in FIG. 46; and FIG. 50 is a view taken along line 50—50 of FIG. 49.

*Base forming zone I*

Referring now to FIGS. 2b, 3 and 5 through 7, the base forming zone of the package forming apparatus of this invention will be seen to include endless series of base forming assemblies, generally designated 20 (FIG. 3). The base forming assemblies are movably supported on guide tracks and are each secured to a chain 21 for movement in an endless horizontal path. Chain 21 is trained around two horizontally disposed sprocket wheels 22 and 23 (FIG. 2b—the mechanism forming base forming zone I is not illustrated in FIG. 1b). Sprocket wheel 22 is mounted on a suitably supported vertical shaft 25 which has the lower end thereof operatively associated with a gear box 26 including a sprocket wheel 27. A chain 28 engages sprocket wheel 27 and another sprocket wheel (not shown) associated with a gear box 29, which gear box is driven from main drive shaft 30 of the continuous package forming apparatus. The drive for drive shaft 30 will be referred to hereinbelow. Sprocket wheel 23 is mounted on a suitably supported shaft 32 which has the lower end thereof associated with a gear box 33. Gear box 33 may be used to drive other or auxiliary components of the package forming apparatus.

It will be understood that all of the base forming assemblies 20 are of identical construction. Referring now to FIGS. 3, 5 and 6, assembly 20 will be seen to include a casting 34 having an integral, rearwardly extending lug 35 with a vertical bore supporting a pin 36. The lower end of the pin supports a roller 37 which is received in an endless guide track 38. It will be understood that guide track 38 is of "race-track" form and disposed in a horizontal plane beneath endless chain 21 in alignment therewith. The upper end of pin 36 is rotatably received in a bore in a bushing 39 which supports a flanged roller 40. Roller 40 rides along a guide track 41 which runs in a straight line along the near side of the base forming mechanism (FIG. 2b). Vertical shafts 25 and 32 support respective disks 43 and 44 which are coplanar with guide track 41 and form guide track continuations in tangential relation with opposite ends of the latter. It will be understood that another linear guide track (not shown) identical in form and mounting with guide track 41 is provided on the far side of the machine thereby to provide an endless guide track for rollers 40 of the base forming assemblies.

Referring back to FIG. 5, the central bore of bushing 39 receives one end of a pin 46 forming a part of endless chain 21. The upper end of pin 46 is received in the central bore of another bushing 47, which bushing has the upper end of its central bore receiving the lower end of a pin 48. Bushing 47 includes a reduced-in-diameter central portion received within the bore of a block member 49, which block member includes oppositely facing recesses 50 and 51. These recesses receive the tines 52 of a bifurcated member 53 (FIG. 6) which is secured to the casting of the adjacent base forming assembly. This engagement between member 53 of one base forming assembly and block 49 of an adjacent base forming assembly prevents the base forming assemblies from pivoting about a vertical axis defined by pin 46 as the base forming assemblies move along the linear portions of their endless path.

Pin 48, which is supported in a bore in a lug portion 55 integral with casting 54, supports a roller 56 which is received within a guide track 57. It will be understood that guide track 57 is of "race-track" form directly overlying guideway 38. It will be apparent that rollers 37, 40 and 56 mount the base forming assemblies for movement in an endless path, and that chain 21 serves as a means for imparting simultaneous movement for all the base forming assemblies.

Casting 34 includes an integral, lower inclined portion 58 beneath the supporting elements of the casting. A horizontally disposed, generally rectangular, lower die platen 59 has one marginal portion secured to inclined casting portion 58 by a plurality of fasteners 60. Die platen 59 includes a generally rectangular opening 61, which opening corresponds generally in peripheral shape to the peripheral shape of one of the bases to be formed in the lower web or sheet of package forming material. It will be noted that die platen 59 includes an integral flange 62 extending along the lower portion of one side thereof, which flange is adapted to be received beneath a corresponding shaped recess extending along the adjacent side of the adjacent base forming assembly. The recess on the base assembly illustrated is designated 63 and is shown in both FIGS. 5 and 6.

The casting 34 includes integral portions 65 and 66 each including a pair of vertical bores receiving a pair of rods 67 and 68. A ball bearing assembly is provided in each of these bores in the casting to provide free sliding movement of the rods relative to the casting. One such bearing assembly is illustrated in FIG. 5 and designated 69. Rods 67 and 68 are threaded at their upper ends and are secured to a plate 70 by suitable washers and nuts 71, 72. Plate 70 includes a horizontally extending bore receiving a pin 74, which pin mounts a roller 75 received in a cam track 76 when the base forming assemblies move along the near side of the package forming apparatus. Cam track 76 is illustrated in FIG. 7 and will be referred to again hereinbelow.

The lower ends of rods 67 and 68 extend through suitable bores in a bar 78. Rods 67 include reduced-in-diameter threaded portions at their lower ends threadingly engaged in bores in respective cylindrical members 80 and 81 of identical construction. Cylindrical member 80 is illustrated in section in FIG. 6 and will be seen to be received in a bore 82 in block 83. Cylindrical member 80 includes an annular flange at its lower end slidably engaging the walls of bore 82. Upward movement of cylindrical member 80 relative to block 83 is limited by a sleeve 84 secured in the bore and adapted to abut the upper face of the annular flange at the lower end of cylindrical member 80.

A horizontally disposed, generally rectangular upper die platen 85 is suitably secured to the undersurface of block 83. The upper surface of die platen 85 closes the lower end of bores 82 and acts to house the coil springs 86 in these bores, which springs engage the bases of cylindrical members 80 and 81 thereby urging block 83 and upper die platen 85 downwardly with respect to rods 67 and 68 in the position illustrated in FIGS. 5 and 6.

It will be understood that cylindrical member 81 is mounted in block 83 in the same manner as cylindrical member 80. It should be apparent that lowering of rods 67 and 68 causes corresponding lowering of block 83 and die platen 85 until the latter contacts the upper face of lower die platen 59. Further lowering of rods 67 and 68 causes compressing of springs 86 and thereby relative movement of bar 78 with respect to block 83.

Upper die platen 85 includes a cavity 88 in its undersurface, which cavity corresponds in shape to the shape of the upper surface of a base to be formed in the base forming assembly. This shape is illustrated and described in the aforementioned Goller et al. application. Cavity 88 includes a peripherally continuous recess 88a which forms the peripherally continuous upstanding rim 89 (FIG. 31) of the base member. Die platen 85 is suitably bored and plugged to form a continuous passageway 90 overlying recess 88a. A plurality of small diameter bores 91 communicate continuous passageway 90 with continuous recess 88a. An upper platen 85 includes a passageway 93 communicating passageway 90 with a disk-like chamber 94 formed by the undersurface of block 83 and a cylindrical recess in the upper surface of die platen 85 at a central portion thereof. An O-ring 95 received in a recess in die platen 85 forms a seal around chamber 94. A small bore 97 communicates passageway 93 with the central portion of cavity 88.

Block 83 includes a vertically extending, stepped bore 98 communicating at its lower end with chamber 94 and opening at its upper end at the top surface of block 83. A valve stem 100 is slidably supported within a bushing 101 which closes the upper end of bore 98. Valve stem 100 includes a valve head 102 which in its upper position sealingly engages an annular shoulder formed in bore 98. A coil spring 103 engages the base of chamber 94 and the undersurface of the valve head thereby yieldably holding the latter in sealing engagement with the annular shoulder within bore 98.

Block 83 includes another vertically extending, stepped bore 105 communicating at its lower end with chamber 94 and opening at its other end at the top surface of block 83. A valve head 106 is adapted to engage a shoulder formed within bore 105 for closing the latter. A coil spring 107 encircles a valve stem 108 which has its lower end secured to valve head 106. The lower end of spring 107 abuts valve head 106 and the upper end of the spring is engaged by the lower end of the bushing 109 which is suitably secured within bore 105 thereby closing the latter and slidably supporting the valve stem 108. In other words, spring 107 acts yieldably to hold valve head 106 in its lower position for closing bore 105. A port 111 (FIG. 3) opens to atmosphere and communicates with bore 105 above the annular shoulder therein which is contacted by valve head 106 when the latter is in its lower or closed position. In other words, lifting of the valve head against the force of spring 107 communicates chamber 94, and accordingly cavity 88, to atmosphere through port 111. As noted in FIG. 6a, valve stem 108 is provided with a notch 112.

Bar 78 includes a vertical threaded bore adjustably supporting a set screw 114, the lower end of which set screw is adapted to engage the upper end of valve stem 100. Bar 78 includes another vertical threaded bore adjustably supporting a threaded shank 115, which shank has a washer 116 secured to the lower end thereof (FIG. 6a).

Block 83 includes a horizontally extending passageway (not shown) which opens at the front face of block 83, i.e., the outer face of block 83 as the latter travels along the near side of the package forming apparatus, in the form of a threaded bore which threadingly receives one end of an elbow fitting 118. The other end of this passageway, which is not illustrated, communicates with bore 98 above the shoulder in the latter which is closed by valve head 102. Accordingly, when the valve head 102 is not seated, i.e. opened, chamber 94 is placed in communication with elbow fitting 118. Fitting 118 is threadingly engaged at its other end with a fitting 119 on the end of a vacuum hose 120 which passes upwardly of the base forming assembly, through an opening 121 in plate 70, and then to a suitable rotary vacuum manifold, indicated at 122 in FIG. 2b. It will be understood that vacuum manifold 122 is of the type adapted to communicate a source of vacuum with the vacuum hoses 20 of all of the base forming assemblies as the latter travel in their endless path.

Cam track 76 itself is best illustrated in FIG. 7, and its relationship with the base forming assembly mounting structure is shown in FIG. 2b. Cam track 76 will be seen to include a first horizontal portion 76a, a first descending portion 76b, a second horizontal portion 76c, a second descending portion 76d, a third horizontal portion 76e, a first ascending portion 76f joining with a further ascending portion 76g.

The operation of the base forming mechanism of the apparatus of this invention is as follows:

A web or sheet of base material is drawn from a supply roll 125 (FIG. 2b) suitably mounted on the supporting structure of the apparatus, and is then drawn around a pair of vertically spaced supporting rollers 126. The web is then passed between the confronting faces of the upper and lower die platens as they move along their linear path of travel on the near side of the apparatus. As the base assemblies are moved around shaft 32 and commence their travel downstream on the near side of the apparatus, cam rollers 75 of base forming assemblies 20 are successively received in cam tract portion 76a. As cam roller 75 enters cam track portion 76b, plate 70 and the various parts secured thereto, viz. rods 67, 68, block 83 and upper die platen 85, etc., are cammed downwardly relative to casting 34 in the parts secured thereto, viz. the lower die platen 59. As the roller 75 of a base assembly reaches cam track portion 76c, the die platens of the base forming assembly are brought into clamping relation with the base web of the package forming material. Accordingly, the movement of the base forming assemblies acts to draw the web of base material longitudinally or downstream of the continuous package forming machine.

Radiant heating means 127 (diagrammatically illustrated in FIG. 2b) of any suitable type are disposed beneath the portion of the path of travel of the base forming assemblies represented by cam track portion 76c. Accordingly, as the base assemblies draw the web of base material along this portion of the path of travel of the base assemblies, the portions of the web of base material exposed by openings 61 in the lower die platens are heated and thereby softened by radiant heating means 127. As flanges 62 on the lower die platens interfit with recesses 63 of adjacent lower die platens, only the portions of the web base material exposed by openings 61 are heated. This construction of the lower die platens prevents the base material from being heated entirely across its width and subsequently stretched along its length which would prevent proper registry of the formed bases with other downstream components of the package forming apparatus.

The downward movement of the vertically reciprocal parts of each base forming assembly, which is brought about by the associated roller 75 entering cam track portion 76c, is slightly greater than the initial spacing between the confronting faces of the upper and lower die plates. This additional downward travel is taken by coil springs 86 which in effect permit rods 67 and 68 to move relative to block 83 in the upper die plate 85. As the base assemblies move along a portion of the path represented by cam track portion 76c, the bases of adjustable set screws 114 are almost brought into contact with the upper ends of the respective valve stem 100. During this portion of the path of movement of the base forming assemblies, valve heads 106 close bores 105 and valve stems 108 are associated with corresponding washers 116 of the relationship illustrated in FIG. 6a.

As cam rollers 75 are successively cammed downwardly as they enter cam track portion 76d, plate 70, rods 67, 68 and bar 78 of each base forming assembly is lowered relative to block 83 and the clamped together die platens thereby bringing the lower end of set screw 114 into contact with the upper end of the associated valve stem 100 for unseating valve head 102 and thereby opening cavity 88 with the source of vacuum through the fitting 118, hose 120, etc. Valve head 106 is not effected by this lowering of bar 78 relative to block 83, as during this movement washer 116 merely moves toward the base of notch 112 in the associated valve stem.

The heated portions of the web of base material are sucessively vacuum drawn into conformity with the shape of cavities 88 and held in the cavities as the base assemblies travel on the portion of their path of movement represented by cam track portion 76e. The formed bases are allowed to cool from the time they are vacuum drawn into the cavities in the upper die platens. In other words, the radiant heating means 127 extends only beneath the base assemblies 20 as they move along the portion of their path of travel represented by cam track portion 76c.

As cam rollers 75 successively enter cam track portions 76f thereby lifting plate 70, rods 67, 68 and bar 78 of each base forming assembly, valve 102 of each base forming assembly is allowed to close thereby shutting off cavity 88 from the source of vacuum. Shortly thereafter cam rollers 75 successively enter cam track portion 76g bringing about a further lifting of bar 78 relative to block 83 of each base forming assembly thereby bringing washer 116 into engagement with the upper surface of notch 112 of associated valve stem 108 and thereby opening cavity 88 to atmosphere through port 111. As cam rollers 75 successively enter cam track portion 76h the upper die platens are lifted from the lower die platens thereby exposing or uncovering the formed bases on the advancing lower web of package forming material.

It should be mentioned that as cam rollers 75 successively enter cam track portion 76b for caming the upper and lower die platens together, washers 116 are lowered in the associated valve stem notches 112 thereby allowing springs 107 to close bores 105 prior to placing cavities 88 in communication with the source of vacuum.

It should be apparent in view of the above that the base forming assemblies 20 clamp and draw the base web of package forming material through the Base Forming Zone I and successively form bases in the latter in a continuous manner. After the base web of package forming material, designated 128, leaves the package forming zone it has the configuration illustrated in FIG. 21a. Two formed bases are indicated in this figure by numerals 129 and 130.

*Punching zone II*

After the web with the formed bases thereon leaves Base Forming Zone I, it is advanced through Punching Zone II. The Punching Zone includes a suitable, vertically reciprocable, punching head also mounted for horizontal reciprocable movement so that it moves in one horizontal direction with a velocity equal to the velocity of the advancing web. During each stroke of movement of the punching head, designated 132 in FIG. 2b, a pattern of three holes is punched in the web of base material. These holes are designated 133, 134 and 135 in FIG. 21b. Holes 133, 134 are of the same diameter and are uniformly spaced transversely of the web. These two holes receive prongs forming a part of a windup drum in Zone VIII of the apparatus. This windup drum will be referred to below. Opening 135 is smaller in diameter than openings 133, 134 and is punched adjacent the margin of each formed base just outwardly of the formed base rim. As will be explained below, this opening 135 serves to permit the evacuation of air in the product enclosing space defined by the upper and lower films of packaging material.

The various parts for mounting and reciprocating punch head 132 will not be described as they are identical with the means mounting and reciprocating the package trimmer comprising Zone VII which will be referred to in detail hereinbelow. It will be sufficient to say that punch head 132 is vertically reciprocable on standards 136 which are supported from a horizontally reciprocable base 137. The punch head 132 is connected with arms (one arm is shown in FIG. 2b and designated 138), which arms are associated with respective crank arms driven from a common cross shaft 139 which is in turn driven from a wheel 140 in driven relation with a chain or belt 141. Chain or belt 141 is driven from another wheel 142 associated with gear box 29 and thereby driven from the main drive shaft 30. Punching head 132 may be of any suitable construction mounting three punches for successively forming the patterns of openings 133–135 in the web of base material as the latter is being continuously advanced.

*Adhesive applying zone III*

Referring now to FIGS. 4 and 8 through 15, the adhesive applicator will be seen to include two vertically extending side plates 145 and 146 disposed one on each side of the advancing web. The side plates are secured together in spaced apart relation by a base plate 147 and an upper plate 148. A pair of supporting blocks 149 and 150 (FIGS. 9 and 10) aligned longitudinally of the package forming apparatus are secured to the inside surface of side plate 145. Blocks 149 and 150 include aligned through bores supporting bearing assemblies which slidably engage a support rod 152. The bearing assembly in block 150 is illustrated in FIG. 10 and designated 153. Side plate 146 includes a pair of mounting blocks 154 identical with mounting blocks 149 and 150, which mounting blocks include bearing assemblies slidably engaging another support rod 155. Support rods 152 and 155 are suitably mounted from members 157 and 158 (FIGS. 4 and 10) forming a part of the supporting structure of the package forming apparatus. It should be apparent that plates 145 through 148, which form the frame of the adhesive applicator, are mounted for reciprocable movement longitudinally of the direction of web movement.

Reciprocable movement is imparted to the frame of the adhesive applicator by means of a pair of eccentric cam disks 160 and 161, which disks are mounted on respective hubs 160a, 161a keyed to a cross shaft 162 (FIG. 9) journaled in hubs 163 and 164 which are mounted to respective plates 165, 166 forming a part of the supporting structure of the package forming machine. Cam disks 160 and 161, which are of identical construction, include respective annular cam tracks 168 and 169 which are eccentric with respect to the center of rotation of the disks. As noted in FIG. 10, side plate 145 includes a depending portion 145a supporting a cam roller 170 adjacent its inner side, which roller is received in annular cam track 168. In like manner, plate 146 includes a depending portion 146a (FIG. 4) supporting adjacent its inner surface a cam roller (not shown) which is received in annular cam track 169. It will be apparent that upon rotation of cam disks 160 and 161, reciprocable movement will be imparted to the frame of the adhesive applicator by virtue of the engagement of the cam rollers in the eccentric cam tracks. The angular velocity of the disks is such that as the adhesive applicator frame is reciprocated, it moves in its downstream direction with a velocity equal to the velocity of the advancing web.

A sprocket wheel 172 is secured to hub 161a. A chain 173 (FIG. 4) is trained around this sprocket wheel and around a drive sprocket (not shown) associated with gear box 29 which is driven from main drive shaft 30 (FIG. 2b) of the package forming apparatus. In other words, shaft 162 is driven from the main drive of the machine and is rotated at a uniform velocity during operation of the machine.

Upper plate 148 of the frame of the adhesive applicator mounts a right angle drive gear box 175, which gear box mounts a vertically extending shaft 176 (FIG. 8) and a horizontally extending shaft 177 and includes suitable gearing so that rotation of shaft 177 brings about rotation of shaft 176. Shaft 176 extends beneath the gear box through an opening 178 in plate 148.

A guide track block 180 is secured to the underside of plate 148 around opening 178. Block 180 includes a stepped, through, central opening 181 and a continuous guide track 182. As noted in FIG. 11, guide track 182 is generally rectangular with the corners thereof being rounded. A generally annular member 184 is suitably secured within opening 181 in block 180, which member includes a continuous surface 184a forming a continuation of the inner continuous surface of guide track 182. Block 180 and member 184 include respective, continuous, confronting surfaces defining another guide track 186. As noted in FIG. 11, guide track 186 is generally rectangular, except that its corners are offset and rounded for a purpose to be explained hereinbelow.

As noted in FIGS. 8 and 15, member 184 includes an upwardly facing, continuous, cam track 184b which includes a single rise or lobe 184c. A second insert member 188 (FIG. 8) is fitted within the upper end of opening 181 in block 180 and includes a downwardly facing, continuous, cam track 188a, which cam track includes a single rise or lobe 188b. Cam surfaces 184b and 188a are identical, opposite hand and together define a continuous cam track which receives a cam roller 189.

A member 192, generally in the form of an inverted T and hereinafter referred to as the T-member, includes a central cylindrical portion which is partly received within the cylindrical opening in member 184. T-member 192 includes a central bore 193 which has enlarged portions mounting sleeve 194 and 195 which slidably receive shaft 176. Member 192 includes an upper bifurcated portion having a transverse bore mounting a pin 196 (FIGS. 8 and 15) which rotatably supports roller 189. A drive member 197 (FIG. 8) includes a bore receiving shaft 176. The drive member is secured to the shaft by means of a fastener or key represented by numeral 198. The drive member includes an eccentric portion having a vertically extending bore in which the upper end of a drive pin 199 is mounted. Drive pin 199 is slidably received in a bore opening at the upper bifurcated end of T-member 192. It should be apparent that rotation of shaft 176 brings about corresponding rotation of T-member 192. Because of the engagement of cam roller 189 in the cam track defined by cam surfaces 184b and 188a, T-member 192 is vertically reciprocated through one complete stroke for each complete revolution of the T-member. The T-member is of course free for vertical reciprocable movement by reason of its sliding engagement with shaft 176 and drive pin 199.

As best noted in FIGS. 8, 14 and 15, the lower end of T-member 192 supports vertically extending pins 201, 202 which in turn pivotally support respective adhesive applying roller assemblies 203, 204. As both adhesive applying roller assemblies are of identical construction, only one assembly, namely assembly 203, will be described in detail.

Adhesive applying roller assembly 203 includes an H-member 206 pivotally engaging the opposite ends of pin 201 which extend above and below the surfaces of the associated projecting portion of T-member 192. H-member 206 includes aligned vertical bores rotatably supporting a rod 207. A hub 208 is fixed to rod 207 and is adapted to rest on the upper surface of flange 206a of the H-member for limiting downward movement of the rod 207. A coil spring 209 encircles rod 207 with its lower end engaging the upper surface of hub 208 and its upper end engaging the undersurface of flange 206b of the H-member. This spring yieldably holds rod 207 in its lowermost position with the hub thereof in engagement with flange 206a.

A guide roller 210 is rotatably secured to the upper end of rod 207. A member 211 is fixed to rod 207 just below guide roller 210, which member rotatably supports another guide roller 212. As noted in FIG. 8, guide rollers 210 are received within guide track 182 and guide rollers 212 are received within guide track 186.

A roller mounting member 213 is suitably fastened to the lower end of rod 207. Member 213 includes an integral, inclined portion which is centrally bored supporting a sleeve 214 (FIG. 8) which in turn supports a shaft 215. Adhesive applying roller 216 is mounted on shaft 215. Roller 216 is mounted about its center either by rotating about shaft 215 or by rotatably mounting the latter in sleeve 214. It will be noted that the marginal portion 216a of the roller is frusto-conical in shape so that a lowermost element of the same lies in a horizontal plane.

As will be referred to again hereinbelow the marginal portions of the rollers of adhesive applying assemblies 203 and 204 engage the upper surface of the lower web around the perimeters of the formed bases for applying a continuous strip of adhesive to the same. As there are two adhesive applying rollers, it will be apparent that a continuous pattern or strip will be established upon rotation of T-member 192 through one-half revolution when the rollers are in contact with the web. In actual practice, member 192 rotates through slightly more than 180° when the rollers are in contact with the web to provide an overlapping effect thereby to insure the formation of a continuous strip of adhesive. As guide rollers 210 and 212 of the adhesive applying roller assemblies travel in respective guideways 182 and 186, which are generally rectangular in shape, it will be apparent that the adhesive strip is applied in a correspondingly shaped rectangular pattern on the base web of package forming material. As guideway 186 has its corners offset and rounded in the manner illustrated in FIG. 11, guide rollers 212 in following these offset rounded corners act to rotate shafts 207 about their vertical central axes as the roller assemblies corner in their path of travel. This causes the strip of adhesive, indicated at 218 in FIG. 21c, to have rounded corners as illustrated rather than square corners which would result if the adhesive applying roller assemblies did not pivot as they corner in passing along their path of travel.

The adhesive applicator includes unique means for applying adhesive to the peripheries of the adhesive applying rollers. Such means include a pair of adhesive transfer rollers designated 220 and 221 and illustrated in FIGS. 8 and 14. The mounting and drive of both transfer rollers are identical; accordingly, only the drive and mounting for one transfer roller, viz. roller 221, will be described in detail.

Roller 21 is fixed on a shaft 221a which is journaled in a suitable bearing 222 supported in a bore in a mounting block 223 (FIG. 8) fastened, as by fasteners 224, to side plate 146 of the adhesive applicator frame. A roller 225 is fixed to the end of shaft 221a opposite the end thereof supporting transfer roller 221. Mounting block 223 also supports a pair of oppositely facing pulleys 227. A small electric motor 228 is suitably mounted to the underside of frame plate 148, which motor includes suitable gearing for driving a roller 229. A belt 230 is trained over roller 229, pulleys 227 and roller 225. It will be apparent that energizing of motor 228 serves to drive or rotate transfer roller 221.

The transfer rollers are mounted so that each has marginal portions disposed in a small tank of adhesive. Referring to FIG. 14, transfer roller 220 is disposed within a slot in the wall of an adhesive tank 232. The clearances between the transfer roller and the bases of the slot in the tank are such that the transfer roller upon rotating picks up a supply of adhesive but does not permit the latter to drip or run from the slot in the tank. Preferably, suitable electric heating means, including electrical box 233 as shown in FIG. 14, are provided for maintaining the adhesive in tank 232 at a temperature such that the adhesive does not gum up or become too viscous for being readily transferred to the periphery of the associated transfer roller.

The mounting of the adhesive applying rollers is such that, during movement of the latter along their endless path, the adhesive applying rollers are momentarily brought to rest in positions wherein the peripheries of the latter are spaced above the web and are in contact, or at least in extremely close proximity, with the margins of the respective adhesive transfer rollers. The adhesive transfer rollers, driven by their respective electric motors, momentarily rotate the adhesive applying rollers, as the latter are suspended in vertical spaced relation above the advancing web, thereby to apply adhesive to the peripheral portions of the adhesive applying rollers.

Heating means may be provided for maintaining the adhesive on the adhesive applying rollers at a temperature such that the adhesive does not tend to become so viscous that it would not readily transfer from the adhesive applying rollers to the web. Such heating means may be in the form of heated, coiled tubular, heating members 234 and 235, (FIGS. 9 and 14) associated with hot air means 236 and mounted for directing hot air on the adhesive applying rollers when the latter are in their positions for receiving adhesive from the transfer rollers. Means 236 may be intermittently operated by suitable automatic means for directing warm air on the adhesive applying rollers only when the latter are in their positions for receiving adhesive.

The adhesive applicator is driven through a disengageable latch mechanism which will now be described and which is illustrated in FIGS. 8, 12 and 13. As best noted in FIG. 12, a bored, split arm 238 is clamped to shaft 177. It will be understood that arm 238 is clamped to shaft 177, as by a fastener 239, so that rotation of arm 238 brings about corresponding rotation of shaft 177. Arm 238 pivotally mounts a pawl 240 which has a tapered end 240a including a planar surface 240b. The opposite end of the pawl includes another planar face 240c. A spring arm 241 secured to arm 238 by fastener 239 has the free end thereof biased against planar surface 240c thereby to urge pawl 240 in a clockwise direction (FIG. 12) about its supporting axis until planar surface 240c is in parallel relation with spring 241.

At this time it should be pointed out that when the adhesive applying roller assemblies are in their at rest or starting position, i.e. when they are raised above the base web of package forming material, not in contact with the transfer rollers and not moving relative to the adhesive applying frame, arm 238 is in the position illustrated in FIG. 12. When arm 238 is in this position, pawl 240 is held in the position illustrated by means of a roller 242 mounted on a slide plate 243 which is slidably mounted for vertical reciprocal movement from another plate 244 which is in turn mounted on an upright plate 245 secured to frame plate 148. Plate 243 is slidably mounted on plate 244 by means of an elongated slot 243a in plate 243, which slot receives a pin 244a secured to plate 244. Plate 243 is bolted, as by means of a bolt and nut arrangement 246, to the end of an actuating member 247 associated with a solenoid mechanism 248 which is mounted to plate 245. When the solenoid 248 is actuated, by means to be explained below, plate 243 is lifted thereby allowing pawl 240 to swing in a clockwise direction under the influence of spring 241.

As noted in FIG. 8, side plate 146 includes an upper extension portion 146a supporting a pair of hubs 250 which in turn journal a shaft 251. Plate portion 146a is, of course, bored to receive freely shaft 251. An arm 252 (FIG. 12) is bored, split and clamped to shaft 251 as by means of a fastener 253. It will be understood that rotation of arm 252 in a vertical plane brings about rotation of shaft 251. A finger 255 is mounted to one end of arm 252, as by a fastener 256, which finger extends inwardly of arm 252 and includes an inclined face 255a adapted upon movement in a circular path about the axis of shaft 251 to engage face 240b on the tapered end of pawl 240 when the latter has been released upon lifting of roller 242.

A gear 258 (FIG. 8) is keyed to the end of shaft 251 opposite the end thereof supporting arm 252. The teeth of gear 258 are in meshing engagement with the teeth of a rack 260 (FIGS. 4, 8 and 9). As best seen in FIGS. 4 and 8, the upper end of rack 260 is slidably supported in a housing 261 which includes a gear housing portion 261a suitably swingably mounted to hub 250. In other words, housing 261 is mounted for oscillating upon oscillation of rack 260 and holds the teeth of the latter in engagement with the teeth of gear 258.

Reciprocal or oscillating movement is imparted to rack 260 by means of a crank arm 263 best seen in FIGS. 4 and 9. Crank arm 263 has one end thereof keyed to one end of cross shaft 162. The other end of crank arm 263 pivotally supports a socket member 264 in which the lower end of rack 260 is secured. It should be apparent that upon rotation of cross shaft 162, rack 260 is reciprocated or oscillated for imparting oscillating movement to shaft 177.

As best seen in FIG. 8, a cylindrical brake mechanism 266 encircles the upper end of vertical shaft 176. The brake is mounted from a horizontally disposed plate 267, which plate has one end attached to a vertical plate 267a mounted on the upper surface of frame plate 148. Brake 266 is of the type including interleaved circular plates slidably engageable with each other at their adjacent faces. One or more of the plates are carried by shaft 176 and one or more alternate plates are attached to support plate 267. Brake 266 prevents shaft 176 and the components of the adhesive applicator attached thereto from coasting after the driving mechanism has been unlatched as will be explained below.

Photoelectric sensing means (illustrated diagrammatically in FIG. 1a and shown in FIG. 18a) designated 268 and 269, are operatively associated with solenoid 248 which actuates roller 242. It will be recalled that this roller controls the position of pawl 240 on the end of arm 238. The photoelectric sensing means includes a light source 268 and a photoelectric cell 269 mounted for projecting and sensing a beam of light passing between the claws of a product loading or depositing assembly to be referred to in detail below in the description of Product Loading Zone IV. When the beam of light is not broken by products in the claws, the beam of light energizes photoelectric cell 296 which actuates solenoid 248 for lowering roller 242 to the position illustrated in FIG. 12, i.e. to a position where it engages the tapered end of pawl 240 thereby serving to rotate the latter to a position where it will be cleared by finger 255 on arm 252.

The photoelectric sensing means includes a time delay switch (not shown) to prevent the photoelectric cell from being energized when it is struck by the beam of light as it passes between the claws of adjacent product loading assemblies. As will be explained in the following description of the operation of the adhesive applicator, when the photoelectric sensing means is activated for actuating the solenoid, the drive means for the adhesive applying roller assemblies is unlatched so that the adhesive applying rollers are not driven for applying a pattern or strip of adhesive to the web. The timing between the adhesive applicator and the product loading apparatus and the arrangement of the sensing means are such that a strip or pattern of adhesive is not applied around the formed base which will pass beneath the product delivering assembly which does not contain a product, which assembly activated the photoelectric cell.

The operation of the adhesive applicator is as follows:

Cross shaft 162 (FIG. 9) is rotated at a constant velocity by the main drive shaft of the package forming apparatus as explained above. Shaft 162 rotates cam disks 160 and 161, thereby serving to reciprocate the adhesive applicator frame by virtue of the engagement of the cam rollers and annular, eccentric cam tracks 168 and 169. As mentioned above, this reciprocation is such that the adhesive applicator frame moves downstream at a velocity equal to the velocity of the advancing base web of package forming material. Shaft 162 also rotates crank arm 263 (FIG. 4) which oscillates rack 260. Rack 260 oscillates shaft 251 (FIG. 8) by reason of the engagement of the teeth of the rack with the teeth of gear 258 keyed to shaft 251. These various parts are arranged and adapted so that shaft 251 rotates slightly more than 360°, e.g. 365°, in one direction during a full stroke of rack 260 in one direction. Accordingly, as crank arm 263 constantly rotates at a uniform velocity, shaft 251 is oscillated in one direction through slightly more than 360°, and then is rotated in the opposite direction through the same arc which is slightly more than 360°.

Oscillation of shaft 251 in the manner described brings about corresponding oscillation of arm 252, which oscillation is indicated by the arrows in FIGS. 12, 12a and 12b. It will be understood that as long as products are being delivered in an uninterrupted manner for deposit on the formed bases, photoelectric cell 269 will not be activated and roller 242 will be held in its upper position (FIG. 12a) by solenoid 248. Accordingly, pawl 240 is allowed to be sprung outwardly where face 240b of the same is engaged by finger face 255a as the latter moves in a clockwise direction as seen in FIGS. 12 and 12a.

Referring to FIG. 12a, arm 252 rotates in a counterclockwise direction from a position wherein finger face 255a is generally disposed along the line designated as the 0° line, through approximately 365° until the face 255a is generally disposed along the line indicated as the 5° line. Arm 252 then reverses in direction for rotating finger 255 in a clockwise direction through 365° from the 5° line completely around and again stopping at the 0° line. As long as products are being delivered in an uninterrupted manner, i.e. as long as the sensing means is not activated, pawl 240 will be free of roller 242 and thereby extended or swung in a clockwise direction (relative to arm 238 as indicated in FIG. 12a) for having its surface 240b engaged by face 255a of the finger at the 0° line. Therefore, as arm 252 rotates through its clockwise cycle as indicated in FIG. 12a, it imparts corresponding rotation to arm 238. Accordingly, arm 238 is rotated through 360° from a starting position wherein pawl surface 240b is generally disposed along the 0° line.

When arm 252 reverses its direction and travels in a counterclockwise direction as seen in FIGS. 12 and 12a, finger face 255a of course separates from pawl surface 240b leaving the latter along the 0° line. As the finger approaches the 0° line in traveling in its counterclockwise direction and continues in a counterclockwise direction to the 5° line, finger face 255a rides the tapered surface 240a of the pawl thereby camming the same against spring 241 until the finger passes the pawl at which time the latter snaps back under the influence of spring 241. Therefore, when finger 255a upon its return reaches the 0° line in traveling in its clockwise direction, face 255a comes into contact with the pawl face 240b thereby to carry arm 238 in a clockwise direction along with arm 252. It should be apparent that during uninterrupted delivery of products, oscillation of arm 252 in the manner described brings about intermittent rotation of arm 238 through 360° clockwise cycles as in FIG. 12a.

Rotation of arm 238 in the manner just described brings about corresponding rotation of shaft 177 (FIG. 8). One complete revolution of shaft 177 causes a complete revolution of shaft 176. This movement of shaft 176 causes the adhesive applying roller assemblies 203 and 204 to move through a full cycle of movement. As the T-member 192 which supports the adhesive applying roller assemblies rotates through 360°, it is cammed downwardly as it travels through slightly more than 270° in its cycle of rotation. This camming movement is brought about by cam roller 189 traveling in the cam track defined by cam surfaces 184b and 188a. This cam track is arranged so that cam roller 189 travels in a horizontal plane through slightly more than 270° of its travel and is cammed upwardly during the remaining portion of each of its cycles by raised cam portion 184c (FIGS. 8 and 15). This vertical reciprocation of adhesive applying roller assemblies 203 and 204, which is brought about by the action of cam roller 189, occurs in timed relation with reciprocation of the adhesive applicator frame so that the adhesive applying rollers are brought into contact with the base web around a formed base thereon as the frame is moving in its downstream stroke at a velocity equal to the velocity of the web. During the return or upstream stroke of the adhesive applicator frame, cam roller 189 rides up lobe 184c for lifting the rollers of the adhesive applicator assemblies from the surface of the base web.

When arm 238 is in a position wherein pawl surface 240b is disposed generally along the 0° line in FIG. 12, cam roller 189 is in its uppermost position on cam surface 184c. When cam roller 189 is in this position, the aadhesive applying rollers are in their positions adjacent the respective adhesive transfer rollers for picking up a supply of adhesive. Therefore, it will be realized that during the time arm 252 moves in a counterclockwise direction as seen in FIGS. 12 and 12a, i.e. when arm 238 is momentarily at rest, the adhesive applying rollers are positoined for picking up a supply of adhesive. As mentioned above, the mounting arrangement for the adhesive applying rollers provides for the peripheries of the latter to be in contact with the base web for a length of time such that each roller travels slightly more than one-half way around the periphery of a formed base. This provides a slight overlapping of the strip of adhesive to insure that a continuous seal will be formed around each formed base.

When photoelectric cell 269 is activated by the absence of a product on one of the product loading assemblies, solenoid 248 is actuated thereby lowering roller 242 to the position illustrated in FIGS. 12 and 12b; this lowering of roller 242 occurs in advance of arms 238 and 252 traveling together in a clockwise direction as seen in these figures. As tapered end 240a of the pawl is engaged by the roller, the pawl is cammed out of engagement with the finger. As soon as the pawl is separated from the finger, which occurs along a 340° line as shown in FIG. 12b, brake 266 takes effect to stop rotation of shaft 176, and accordingly shaft 177 which mounts arm 238. When this occurs, arm 238 and pawl 240 are in their positions illustrated in FIG. 12b. Arm 252, of course, continues to rotate in a clockwise direction until it reaches the 0° lines, at which time it reverses direction and commences its counterclockwise cycle. When arm 238 is in the position illustrated in FIG. 12b, the rollers of adhesive applying roller assemblies 203 and 204 are in their raised position and are spaced from the respective adhesive transfer rollers so as not to pick up adhesive at this time.

As mentioned above, solenoid 248 is actuated in timed relation with the advancing bases and advancing product loading assemblies so a strip of adhesive is not applied around the base which will pass beneath the empty product loading assembly that activated the photoelectric cell. Arm 238 and pawl 240 will remain in the position illustrated in FIG. 12b until the photoelectric cell 269 is deactivated by the presence of a product on a successive product loading assembly. When this occurs, solenoid 248 is actuated thereby lifting roller 242 and allowing pawl 240 to spring to its position where it will be engaged by finger 255 as the latter travels in a clockwise direction as viewed in FIG. 12. It will be understood that when roller 242 is lifted for resuming the application of adhesive to the formed bases, pawl surface 240b will be engaged by finger face 255a as the finger is approaching the end of its clockwise cycle. Accordingly, pawl surface 240b will be first moved from the 340° line (FIG. 12b) to the 0° line (FIG. 12a) at which time the finger will reverse its direction of rotation. While the pawl is in the position where its surface 240b is disposed on the 0° line waiting to be contacted by finger face 255a just after the latter commences movement in a clockwise direction, the adhesive applying rollers are disposed adjacent the respective transfer rollers for picking up a supply of adhesive. After finger face 255a engages pawl surface 240b for rotating arm 238 along with arm 252, the adhesive applicator acts again to provide endless patterns of adhesive around the formed bases until the sensing means is again activated.

*Product loading zone IV*

Now referring to FIGS. 1a, 2a, 16, 17, 18, 18a, 18b, 19, 20a and 20b, the product loading mechanism will be seen to include an endless series of product loading assemblies each generally designated 270. This product loading mechanism is disclosed and claimed in copending Jensen et al. application, Ser. No. 651,070, filed Mar. 27, 1967, a division of the present application. The product loading assemblies themselves are not illustrated in FIGS. 1a and 2a; only the mounting structure for the product loading assemblies 270 is illustrated in these two figures. This supporting structure includes means supporting four vertical shaft 271, each of which shafts supports a horizontally disposed sprocket wheel 272. These sprocket wheels support a drive chain 273 for movement in an endless horizontal path. One of the shafts 271 includes a depending extension 271a (FIG. 2a) journaled at its lower end in a sleeve 274. A sprocket wheel 275 is mounted on shaft extension 271a, which sprocket wheel is driven by a belt or chain 276 trained around a drive wheel 277 associated with a gear box 278. Main drive shaft 30 extends through gear box 278 and is suitably connected with wheel 277 so that the latter is rotated upon rotation of the main drive shaft. It will be apparent that rotation of drive shaft 30, which is suitably driven from a belt or chain 279 in turn driven by a main drive motor 280, causes movement of chain 273 about its various supporting sprockets. (The chain is actually supported between the sprockets by the attachment of the chain with the various loading assemblies.)

The supporting structure for the product loading assembly includes suitable means defining endless cam tracks 283, 284 and 285. The supporting structure for the product loading assemblies also includes four horizontally extending bars (one bar is illustrated in FIG. 2a and designated 287) having their opposite ends joining tangentially with guide wheels 288 mounted on respective vertical shafts 271.

It will be understood that an endless series of product loading assemblies 270 are driven by chain 273 for movement in an endless path. As all the product loading assemblies are identical, only one assembly will be described in detail.

Now referring to FIGS. 17 through 19, the product loading assembly 270 will be seen to include a casting 290 having an integral lug 290a provided with a vertical bore receiving a pin 291 which rotatably supports a guide roller 292. Guide roller 292 is received in a guideway 293 which is formed by the supporting structure of the product loading assemblies. It will be understood that guideway 293 is continuous, and generally rectangular in form with rounded corners. The shape of this guideway follows the shape of the supporting structure of the product carrying assemblies illustrated in plan view in FIG. 1a. Pin 291 rotatably supports a bushing which has an annular groove receiving a flanged roller 295, which roller receives guide bar 287 and guide wheels 288 when the associated product loading assembly corners in moving along its endless path. Bushing 294 is centrally bored for receiving the lower end of a pin 297 forming a part of a drive chain 273.

Casting 290 includes an upper integral lug 290b provided with a vertical bore supporting a pin 298 which rotatably supports a guide roller 299. Guide roller 299 is received in an endless guideway 300, which guideway is the same shape as guideway 293 and in overlying confronting relation with the latter. Pin 298 rotatably supports a bushing 301, which bushing includes a reduced-in-diameter portion 301a received in a bore in a block 302. Block 302 has oppositely facing recesses 302a receiving the bifurcated portion 303a of a guide member 303 which is mounted on the adjacent product loading assembly. Guide member 303 on the product carrying assembly illustrated is shown in FIG. 17. This guide member serves to prevent the product carrying assemblies from pivoting about an axis defined by the pins 291, 298 when the product carrying assemblies travel along their linear path portions. Bushing 301 includes a central bore receiving the upper end of pin 297 which forms a part of chain 273.

It will be apparent that castings 290 are mounted by rollers 292, 295 and 299 for movement in an endless horizontal path, and that movement of chain 273 brings about corresponding movement of the castings.

Casting 290 includes integral upper and lower journal portions 304 and 305, respectively, each being provided with a pair of vertically extending bores for slidably supporting a pair of rods 306 and 307. Preferably, each journal portion of the casting includes a bearing assembly in its vertical bore for slidably supporting the associated rod. One such bearing assembly is illustrated in FIG. 19 and designated 308.

Rods 306 and 307 have reduced-in-diameter upper end portions suitably fastened in bores in oppositely extending portions of a T-member 310. T-member 310 includes a horizontally extending bore mounting a pin 311, which pin rotatably supports a cam roller 312. Roller 312 is received in cam track 284.

The lower ends of rods 306, 307 include reduced-in-diameter threaded portions secured in bores in an upper portion of a claw housing 314 and secured to the housing by means of nuts 315 and 316. Housing 314 includes a central hub portion 317 having four, equally spaced, radially extending portions 318. As noted in FIG. 18, housing portions 318 are hollow and open at their inner ends into a bore 319 in hub 317. A plate 320, generally in the form of a cross (FIG. 17), is secured to the underside of housing 314 thereby forming bottoms for the housing portions 318. Each housing portion 318 in the associated leg of plate 320 forms a generally rectangular in cross section, radially extending slideway slidably supporting a block 321, which block has a depending portion 321a extending through a suitable slot 320a formed in plate 320. Each block 321 includes a blind bore receiving a coil spring 323, which spring engages the closed end of the associated housing portion 318 for urging the block radially inwardly of housing 314.

Each block 321 supports a claw 324 which has a vertically extending planar portion with an integral, radially inwardly extending finger portion 324a. Each block 321 also rotatably supports roller 325 adapted to be engaged by the frusto-conical surface 326a of a generally cylindrical camming member 326 which is mounted for vertical reciprocable movement in a sleeve 327 secured in bore 319 of housing 314. It will be understood that housing 314 includes four claws, all of identical construction and mounting, and spring biased radially inwardly with their respective rollers in engagement with frusto-conical cam portion 326a.

It should be understood at this time that T-member 310, rods 306, 307, housing 314 and the components associated therewith with the exception of cam member 326, constitute a sub-assembly supported from casting 290 for vertical reciprocable movement relative to the latter. Vertical reciprocable movement of this sub-assembly is controlled by cam roller 312 in cam tract 284.

As noted in FIG. 18, cam member 326 includes an integral upstanding portion 326b having a horizontally extending bore mounting a pin 328, which pin rotatably mounts a cam roller 329. Cam roller 329 is received in cam track 285. As noted in FIG. 19, a pair of parallel, vertically extending bars 331 are secured to cam member portion 326b by suitable fasteners 332. The upper ends of bars 331 are secured to a cross slide 334, which cross slide member includes a pair of vertical bores at its respective opposite ends slidably receiving rods 306 and 307. It should be apparent that cam member 326, bars 331, and cross slide member 334 are adapted to move together as a unit for vertical sliding movement relative to rods 306, 307, housing 314 and the claws of the latter. Movement of cam member 326 and the members secured thereto, which serve as a guide, is controlled by cam roller 329 riding in came track 285. It will be apparent from FIG. 18 that when cam roller 329 is urged downwardly for moving cam 326 downwardly relative to the sub-assembly including housing 314, all four claws 324 will be simultaneously cammed radially outwardly and that upon upward movement of cam 326 relative to housing 314, all four claws will be simultaneously urged inwardly by their associated springs 323.

The reduced-in-diameter threaded upper ends of rods 306 and 307 are threadingly engaged in a pair of sleeves 336 and 337 respectively. Sleeves 336, 337 act to secure the upper ends of rods 306 and 307 to T-member 310, and these sleeves serve as slidable supports for mounting a bar 338. Bar 338 includes vertical bores at its respective opposite ends, which bores support suitable sleeve-like inserts slidably engaging sleeves 336 and 337. One insert is illustrated in FIG. 19 and designated 339. Bar 338 has a rearwardly extending portion which is bored for mounting a pin 341. This pin rotatably supports a cam roller 342, which cam roller is received in cam track 283.

A rod 343 extends through a bore in bar 338, which rod has the upper end thereof suitably secured to the bar as by means of fastening means 344. It will be understood that bar 338 and rod 343 are secured together for movement as a unit. Rod 343 extends vertically downwardly between bars 331 and through a bore 326c extending through cam member 326 centrally of the same. Rod 343 includes a blind bore 343a in its lower end, which blind bore slidably supports a pin 345. A disk-like pad 346 is secured to the lower end of pin 345 for engagement with the top of a stack of sliced food products for a purpose to be explained hereinbelow. Pin 345 includes a transversely extending through bore supporting a pin 347, the opposite ends of which pin extend beyond the outer surface of pin 345 and are received in axially extending slots 343b formed in the lower end of rod 343. The engagement of the opposite ends of pin 347 with the ends of slots 343b defines the stroke of movement of pin 345 in rod 343. A coil spring 348 is housed within the upper end of blind bore 343a, which spring has its lower end in engagement with the upper end of pin 345 thereby to urge the latter to its lowermost limit within the blind bore of rod 343. It will be understood that bar 338, rod 343, pin 345 and pad 346 move together as a unit (until the pad contacts a stack of products) for vertical reciprocable movement relative to the other components of the product carrying assembly, such movement being controlled by roller 342 rolling along cam track 283.

Referring now to FIGS. 1a and 18a, a product feed conveyor, generally designated 350 is suitably mounted on the far side of the package forming machine and arranged so that it has an upper horizontal run traveling in the opposite direction as the base web of package forming material and with a speed equal to the speed of the latter. Feed conveyor 350 delivers products for being picked up by the product loading assemblies for loading or depositing on the formed package bases.

Feed conveyor 350 includes parallel, laterally spaced, longitudinally extending upper frame members 351 and 352, which members are mounted on suitable supporting members 353 and 354 extending from the far side of the package forming apparatus. It will be understood that the feed conveyor includes a pair of chains trained over sprocket wheels 356 rotatably mounted at opposite ends of the framework of the feed conveyor. The chains support a plurality of spaced, rectangular plates 357. A platform 358 is supported on each conveyor plate 357.

Referring now to FIGS. 18a and 18b, platform 358, which may be formed from a single plate, includes a raised base portion 359 supported in parallel, spaced relation from plate 357 by a pair of legs 360 having their ends bent and secured to plate 357 by fasteners 361. Platform base portion 359, which is generally rectangular in form, includes a recess 363 in each of its sides. Base portion 359 includes integral, upstanding ears 364 at two of its sides, which ears serve as guides for locating a stack of sliced products (indicated by phantom line 365 in FIG. 18b) on platform base portion 359. It will be apparent that marginal portions of the undersurface of the lowermost slice of a stack of products having an outline represented by phantom line 365 will overlie recesses 363 and will therefore be exposed.

FIG. 20a illustrates, in diagrammatic form, the shape of the portions of cam tracks 283, 284 and 285 which extend along the linear path of travel of the product loading assemblies as they move along the near side of the package forming apparatus. In like manner, FIG. 20b illustrates, in diagrammatic form, the shape of the portions of these cam tracks which extend along the linear path of travel of the product loading assemblies on the far side of the apparatus, i.e. over feed conveyor 350. The connecting portions of the cam tracks which are not illustrated in FIGS. 20a and 20b consist of suitable supporting structure defining cam tracks extending in parallel planes and having the cross sectional shape illustrated in FIG. 18.

The operation of the mechanism forming the Package Loading Zone of the apparatus is as follows:

A cycle of operation of each of product loading assemblies 270 commences when cam rollers 342, 312, 329 are received in respective cam track portions 283a, 284a and 285a, respectively (FIG. 20b). When the cam rollers of one of the product loading assemblies are in these portions of the cam tracks, the sub-assembly including T-member 310, rods 306, 307, housing 314, is in its uppermost position with respect to casting 290. Rod 343 and pad 346 are in their uppermost position, and cam 326 is in its lowermost position with respect to housing 314 for holding the claws in their spread or open configuration. As the various cam rollers enter cam track portions 283b, 284b and 285b, the associated package delivery assembly is brought into overlying relation with one of the platforms of the feed conveyor in timed relation with movement of the latter.

As the rollers of a loading assembly are urged downwardly by cam track portions 283b, 284b and 285b, all vertically movable components of the product loading assembly are moved downwardly in unison relative to the casting of the assembly. When the rollers are cammed to their lowermost positions upon entering cam track portions 283c, 284c and 285c, claws 284 of the associated product loading assembly will be disposed at the edges of a stack of the products with the claws 324a being disposed outwardly and just beneath the lowermost slice in a stack of products supported on the corresponding platform 358 of the feed conveyor.

It should be mentioned at this time that the stacks of food products are manually placed on the platforms with the edges of the stacks abutting the guides of the platforms which are formed by integral ears 364. Of course, it will be realized that automatic means could be provided for loading the stacks of products onto the platforms of the feed conveyor.

Now continuing, as cam rollers 342 and 312 travel along cam track portions 283c and 284c, respectively, housing 314 and pad 346 remain at a constant elevation. During this time, cam roller 329 travels along cam track portion 285c which is of serpentine form. This portion of the cam track acts to reciprocate cam roller 329 a number of times with each successive stroke being slightly less than the preceding stroke. This movement of cam roller 329 imparts corresponding movement to cam 326 thereby to close and open the claws 324 a number of times. The various parts of the claws and cam 326 are so arranged with respect to the configuration of cam portion 285c, that the claws are first allowed to move inwardly with claw finger portions 324a passing beneath marginal portions of the undersurface of the lowermost slice in a stack of products until the inner surfaces of the vertical planar portions of the claws engage the edges of the slices in a stack of products. The claws are then simultaneously cammed outwardly, although not as far outwardly as they were when first lowered around a stack of products, and then back into engagement with the edges of the slices. This cycle of operation of the claws is repeated one or more times with the claws being cammed outwardly a slightly shorter distance each time.

This inward and outward movement of the claws brought about by cam roller 329 traveling along cam track roller 285c acts to square-up or vertically align the stacks of sliced products on the platforms of loading conveyor 350. This stacking feature is of special importance when the stacks of products are manually placed on the platforms as the personnel involved in such a loading operation will not always place the stacks of products on the platforms in perfect vertical aligned form.

As the cam rollers of a loading assembly enter cam track portions 283d, 284d and 285d and pass along the same, all vertically movable components of the product loading assembly move upwardly in unison with the claws in gripping engagement with a stack of sliced products. It will be understood that when the claws are in gripping engagement with a stack of sliced products, the inner faces of the vertical portions of the claws are pressed against the edges of the slices and the inwardly extending claw fingers 324a engage marginal portions of the undersurface of the lowermost slice in the stack of products. It should be noted that recesses 363 (FIG. 18b) in loading platforms 358 permit fingers 324a of the claws to come into lifting engagement with the marginal portions of the lowermost slice of a stack supported on one of the platforms.

Now cam rollers 342, 312 and 329 travel along respective cam track portions 283e, 284e and 285e, the various vertically movable components of the product loading assemblies travel at a constant elevation with the stacks of products being gripped by the claws thereby to carry the stacks from the loading conveyor 350 to the advancing web of base material. When the various cam rollers of a loading assembly reach the end of cam track portions 283e through 285e, a stack of food products being gripped by the product loading assemblies is brought into overlying relation with one of the bases in the base web of package forming material and moved downstream in timed relation with the base web, i.e. as a product loading assembly is brought to the position where its cam rollers are at the end of cam track portions 283e through 285e, the stack of products carried by the assembly is directly vertically aligned over one of the bases and moved downstream at the same velocity as the web of base material.

When the cam rollers of a product loading assembly enter cam track portions 283f, 284f and 285f and are cammed downwardly by the same, the various vertically movable components of the product loading assembly are moved downwardly in unison until the undersurfaces of the claw fingers 324a engage the rim of a package base thereby to press the latter firmly against a supporting lower die plate (the lower die plates will be referred to in detail hereinabelow).

In FIG. 20a it will be noted that cam track portion 283f continues downwardly a short distance after cam track portions 284f and 285f level off and join with respective cam track portions 284g and 285g. This engagement forces cam roller 342 downwardly with respect to cam roller 312, thereby to urge rod 343 downwardly for bringing pad 346 into engagement with the upper surface of the top slice of a stack of products. Spring 348 provides for yielding engagement of the pad with the stack of products.

As cam rollers 342 and 312 continue along respective cam track portions 283g and 284g, cam roller 329 is cammed downwardly by cam track portion 285h. It should be pointed out that this downwardly camming of roller 329 does not occur until pad 346 is brought into contact with the stack of products. This downward movement of cam roller 329 forces cam member 326 downwardly thereby to spread the claws for releasing a stack of products on one of the formed bases. Spring biased pad 346 acts to hold the stack of products on the formed base during retraction or expanding of the claws.

When cam rollers 342, 312 and 329 enter respective cam track portions 283h, 284h and 285i and are cammed upwardly by the same, all vertically reciprocable components of the package loading assembly are cammed upwardly in unison. This action lifts the expanded or spread claws and pad 346 away from the stack of products that have been deposited or loaded on one of the advancing formed bases. The various cam rollers of the package loading assembly then enter cam track portions 283a through 285a as the empty product loading assemblies move around toward feed conveyor 350 for picking up stacks of products to be deposited on the advancing bases. It will be apparent that the package loading mechanism forming a part of the apparatus of this invention serves successively to deliver stacks of products to the advancing bases in a continuous and automatic manner.

*Package forming zone V*

Referring now particularly to FIGS. 2a and 16, the Package Forming Zone of the apparatus will be seen to include an endless series of upper die plate assemblies each generally designated 370. As will become apparent herein, the upper die plate assemblies are adapted to advance the upper film of package forming material, form spaced product receiving depressions in the upper film, and then bring the film into overlying relation with the base web or sheet with the products being received in the depressions in the upper film. The mounting of the upper die plate assemblies is substantially the same as the mounting of the upper die assemblies disclosed and claimed in co-pending Eberman et al. application, Ser. No. 299,000, filed July 31, 1963, now United States Patent 3,290,858.

It is believed sufficient for purposes of understanding the present invention to state that die assemblies 370 are secured together in an articulated manner and each include suitable rollers, e.g. rollers 371 and 372 illustrated in FIG. 22, which engage parallel, laterally spaced, vertically disposed guide tracks 373 and 374 of "race track" form. The guide tracks guide the upper die plate assemblies in an endless path having a lower horizontal run in which the upper die assemblies are brought into mating or package forming relation with the lower die plate assemblies. For a more complete description of the mounting of the upper die plate assemblies, reference should be had to the aforementioned Eberman et al. application.

It will be understood that all upper die plate assemblies 370 are of identical construction. One upper die plate assembly is illustrated in FIGS. 22 through 27.

The upper die assembly will be seen primarily to include a valve block 376 and a cavity plate 377. Cavity plate 377 includes a continuous, marginal, planar face 377a surrounding a cavity 378. The shape of the cavity may best be seen from reference to FIG. 16. Cavity plate 377 includes a pocket 379 opening into one side wall of cavity 378. The cavity plate includes a central stepped bore 381 receiving the flanged end of the fitting 382 having one end thereof extending into a bore 383 in the valve block and secured therein by means of a fastener 384 which is received in a bore in the valve block. Fastener 384 and fitting 382 serve to mount the cavity plate to the valve block. Rotation of the cavity plate about fitting 382 is prevented by a pin 385 received in registering bores in the cavity plate and valve block.

Cavity plate includes a cylindrical recess 386 in the face thereof adjacent the valve block, which recess tightly receives a cylindrical extension 376a of the valve block. This cylindrical extension includes a further, reduced-in-diameter extension 376b which engages the base of recess 386 thereby to define between the latter and extension 376a an annular chamber 388. This chamber is sealed from atmosphere by means of an O-ring 389 received in a suitable annular recess in cylindrical extension 376a.

As noted in FIG. 22, cavity plate 377 includes an inclined blind bore 390 communicating at one of its ends with annular chamber 388. The other end of bore 390 communicates with one end of a small diameter passageway 391, which passageway opens into pocket 379 at an arcuate groove 392 formed in the surface of the pocket. As noted in FIG. 27, cavity plate 377 includes four equally spaced, generally radially extending blind bores 393 similar to bore 390 and which open at their upper ends to annular chamber 388. Bores 393 extend over the rounded corners of cavity 378 and communicate with small diameter passageways 394 which open into the cavity at the corners thereof.

Now referring to FIGS. 22 and 23, valve block 376 will be seen to include an inclined bore 396 having a coaxial reduced-in-diameter extension 396a opening into a blind bore 397. It will be understood that bore 397 is closed at one end thereof and opens at its other end at one end of valve block 376, i.e. the left end of the valve block as viewed in FIG. 22. A sleeve 398 is secured in bore 396, which sleeve slidably supports a valve stem 399 having a valve face 399a adapted for sealing engagement with the annular shoulder defined by the juncture of bores 396 and 396a. A spring 400 (diagrammatically illustrated) encircles the lower end of valve stem 399 and has one end thereof engaging valve head 399a and the other end thereof abutting the inner end of sleeve 398 thereby to urge the valve in sealing engagement with the annular shoulder in the bore. Valve stem 399 includes a notch 399b in which is received one end of a valve actuator 401, which actuator rotatably supports a cam roller 402 at its other end. Actuator 401 is pivotally mounted intermediate its ends to a support 403; this support is received in a recess 404 in the valve block 376 and secured therein by suitable means. Bore 396 communicates with a passageway 405 extending parallel with bore 397, which passageway communicates with another passageway 406 opening at the undersurface of valve block 376.

A sleeve 408 is suitably secured to the under-surface of valve block 376, which sleeve includes a through central passageway 409 communicating at one end thereof with passageway 406. Passageway 409 includes an increased-in-diameter portion 409a supporting an O-ring 410 which forms a seal between the adjacent ends of passageways 406 and 409. Passageway 409 includes an increased-in-diameter portion 409b at its other end in which is mounted a cylindrical sealing member 411, which member sealingly engages the upper surface of one of the lower die plates around the opening of a passageway therein as will be explained hereinbelow.

It should be apparent that downward movement of cam roller 402 opens valve 399 thereby to communicate bore 397 with passageways 405, 406 and 409.

Now referring to FIGS. 22 and 24, valve block 376 has another inclined bore 414 having a reduced-in-diameter portion 414a in communication with bore 397. Bore 414 is identical with bore 396 and has a valve assembly mounted therein identical to the valve assembly disclosed in FIG. 23 and just described above. The valve assembly mounted in bore 414 includes an actuator 416 pivotally mounted on a support 417 and supporting a cam roller 418 (FIG. 22). Bore 414 communicates with a vertical passageway 419, which passageway opens at its lower end into annular chamber 388. It should be apparent that when cam roller 418 is cammed downwardly, annular chamber 388 is placed in communication with bore 397 in the valve block.

Now referring to FIGS. 22 and 25, valve block 376 will be seen to include an inclined bore 421 having a reduced-in-diameter portion 421a communicating with the upper end of a passageway 422 which opens at its lower end into annular chamber 388. Bore 421 also communicates with a vertical passageway 423 opening to atmosphere in the upper surface of the valve block. It will be understood that a valve assembly identical to that illustrated in FIG. 23 is mounted in bore 421. This valve assembly includes an actuator 425 pivotally mounted on a support 426 and carrying a cam roller 427 (FIG. 22). It will be apparent that upon downward movement of cam roller 427, annular chamber 388 will be placed in communication with the atmosphere through passageway 422, bore 421 and passageway 423.

FIG. 26 illustrates a block 429 which is secured to the left end of the valve block as viewed in FIG. 22. This block includes a through bore 430 which opens into an inclined elongated recess 431 formed in the inner face of block 429. The end of recess 431 remote from bore 430 registers with the open end of bore 397. Bore 430 is threaded for threading engagement with a fitting 432 on one end of a vacuum hose 433 extending to a rotary vacuum manifold 434 (FIG. 2a). In other words, vacuum hose 433 is in communication with bore 397 via bore 430 and by the chamber formed by recess 431 and the end surface of the valve block to which block 429 is secured. Vacuum manifold 434 may be of any suitable type for communicating a source of vacuum with all of the vacuum hoses as the upper die plates travel in their endless path.

Upper die assembly 370 includes mounting means at its opposite ends which are generally designated 435 and 436 (FIG. 22). These mounting means are substantially the same as the mounting means disclosed and claimed in the aforementioned Eberman et al. application, and therefore will not be described herein. It should be pointed out for the purpose of ready understanding of the present invention, that each mounting means of the upper die plate assemblies includes a pair of dowel pins for being received in respective bores in the lower die plate thereby to permit the lower die plates to drive the upper die plates in the manner disclosed in the Eberman et al. application. The dowel pin associated with mounting means 435 is designated 437 and is illustrated in FIG. 22; the dowel pin associated with mounting means 436 is illustrated in FIG. 16 and indicated by numeral 438.

Referring now to FIGS. 2a, 16 and 28 through 30, the apparatus of this invention will be seen to include an endless series of lower die plate assemblies each being generally designated 440. Each lower die plate assembly will be seen to include a casting 441 having integral depending lug portions 442 and 443. One lug portion is shown in elevation and one lug portion is shown in section in FIG. 28 which is a view looking downstream of the apparatus along the upper horizontal run of the lower die plate assemblies. Each lug portion includes a horizontal bore supporting a pin 444 rotatably supporting a roller 445. Rollers 445 are each received in endless guideways 446 which are of "race track" form as indicated in FIG. 2a. It will be understood that the guideways guide the lower die plates for movement in an endless path having an upper horizontal run. The inner ends of pins 444 rotatably support bushings 448, each of which bushings includes central bore 449 receiving one end of a pin 450 forming a part of a drive chain 451. It will be understood that chain 451 is trained around a pair of sprocket wheels 452 and 453 (FIG. 2a) located one at each of the associated ends of guideway 446. These sprocket wheels are supported on respective shafts 454 and 455 suitably supported from the supporting structure of the machine. Drive shaft 454 includes a drive sprocket 457 around which is trained a chain 458 which is driven by a drive wheel (not shown) associated with gear box 459, which gear box is driven from main drive shaft 30 of the package forming apparatus.

Returning to FIG. 28, each bushing includes an annular recess 461 mounting a block 462 having oppositely facing recesses 462a and 462b. Each casting 441 includes a pair of integral, transversely spaced bifurcated portions 466 (FIG. 28a). Each bifurcated portion 466 includes parallel, spaced guides 466a and 466b which are received in respective recesses 462a and 462b in the adjacent lower die plate assembly. In other words, each lower die plate assembly is supported by its rollers 445 and by the engagement of its guides in the recesses of the adjacent lower die plate assembly. Bushings 448 pivot to provide an articulated connection between the lower die plates thereby to permit the latter to travel in a curved or arcuate path as they pass from their upper horizontal run to their lower horizontal run and vice versa. It will be understood that main drive motor 280 (FIG. 2a) drives drive chain 451, which chain is connected with all of the lower die plate assemblies thereby to drive the latter in their endless path.

Each lower die plate assembly 440 includes a generally rectangular lower die plate 468 secured to the associated casting 441 by suitable means. Lower die plate 468 includes integral extensions 468a and 468b at its opposite ends including respective bores 469 and 470. Each of these bores includes an enlarged diameter portion (the enlarged portion of bore 470 is illustrated in FIG. 28 and designated 470a) mounting respective sleeves 471 and 472. The upper end of each sleeve is tapered for guiding a dowel pin mounted in one of the upper die plate assemblies. In other words, sleeves 471 and 472 receive respective dowel pins 437 and 438 of an associated upper die plate assembly thereby to allow the lower die plate assemblies to drive the upper die plate assemblies in a manner disclosed and claimed in the aforementioned Eberman et al. application.

Die plate 468 includes an upper planar face 468c having a continuous groove 474 formed therein. Groove 474 is generally rectangular in shape with rounded corners as seen in FIG. 30, and it has a continuous seal member 475 fitted therein. As noted in FIG. 28 which shows a cross section of the seal member, the same has a flexible lip 475a. This lip is adapted to engage the undersurface of the base web thereby to form a seal with the latter.

A plate 477 is secured to the planar face of the lower die plate, as by means of a pair of fasteners 478. As noted in FIG. 30, plate 477 is generally rectangular in form with rounded corners. This plate is mounted on the lower die plate in symmetrical relation with both a transverse and longitudinal center line of the latter. It will be noted that groove 474 and seal member 475 fitted therein, which define the outline of a completed package (FIG. 31), are offset slightly to the left of the plate 477 as is indicated in FIG. 30. As will become apparent herein, this offset relation results from the provision of an area on each package for receiving a label. It should be mentioned at this time that plate 477 is received within one of the formed bases in the base web of material thereby to support the same and the product thereon during the various phases of operation in forming the completed packages.

Looking to FIG. 28, lower die plate 468 includes a passageway opening 480 at planar face 468c beneath a marginal portion of plate 477. The planar face 468c of the lower die plate includes a transversely extending recess 468d which opens at its inner end into passageway 480 and which has its outer end extending to recess 474. As will be mentioned again herein, recess 468d communicates passageway 480 with one of the small openings 135 formed in the base web of packaging material. Passageway 480 communicates at its lower end with a blind bore 481 which is sealed adjacent its outer end by means of plug 482. A further passageway 483 opens at its lower end into passageway 481 and opens at its other end at planar surface 468c of the lower die plate.

Referring now to FIG. 2a, the Package Forming Zone will be seen to include suitable supports 485 and 486 mounting an upper cam track 487, which cam track extends beneath the upper horizontal run of the upper die plates in parallel relation therewith. Cam track 487, which is arranged for engaging cam roller 418 as the upper die plates move along their upper horizontal run, is illustrated, largely in diagrammatic form, in FIG. 16a. As noted in this figure, cam track 487 includes a horizontal portion 487a, an inclined cam rise portion 487b and an upper horizontal portion 487c. Cam track 487 includes a vertical bore 487d in which a screw 487e is threadingly engaged. The screw is adjusted in its bore in cam track 487 so that the upper end of the screw projects slightly above cam portion 487a.

Supports 485 and 486 (FIG. 2a) also mount cam tracks 490, 491 and 492. These three cam tracks extend in parallel spaced relation with each other and in parallel relation with the lower horizontal run of the upper die plates in vertical spaced relation above the same. Cam tracks 490, 491 and 492, which engage cam rollers 427, 418 and 402, respectively, during movement of the upper die plates along their lower horizontal run, are illustrated, largely in diagrammatic form, in FIGS. 16b, 16c and 16d.

Referring to FIGS. 16b through 16d, cam track 490 includes an upper horizontal surface 490a, a downwardly inclined surface 490b and a lower horizontal surface 490c. Cam track 491 includes a lower horizontal surface 491a, a cam rise 491b, and an upper horizontal surface 491c. Cam track 492 includes a lower horizontal surface 492a, a cam rise 492b, and an upper horizontal surface 492c.

As noted in FIGS. 2a and 2b, the apparatus of this invention includes suitable supporting means mounting an endless conveyor which is generally horizontally disposed in overlying relation with the base web of package forming material. This conveyor, generally designated 495, includes an endless belt 496 trained on rollers including an end roller 497 (FIG. 2a) which is disposed over the upper horizontal run of the upper die plates transversely of their direction of movement. A continuous web or film of package forming material, which film forms the upper film of the completed packages, is supported on the upper run of conveyor 495 and is trained around roller 497 and then around an idler roller 498 which presses the film into contact with planar surfaces 468c of the upper die plates as the latter move along their upper horizontal run. Conveyor 495 is preferably powered for advancing the upper film to the upper die plates.

The operation of the upper and lower die plate assemblies comprising the packaging zone of the apparatus of this invention will now be described:

Referring now primarily to FIG. 32, a continuous upper web or film of package forming material, such as supercooled polyvinylidene chloride film, is brought from suitable supercooling means onto the upper run of conveyor 495. This upper film designated 500, is then brought into substantial coextensive contact with planar marginal surfaces of the upper die plate assemblies as they travel along their upper horizontal run. (The upper die plate assemblies travel in a clockwise direction as seen in FIG. 2a.) As noted in FIG. 32, the upper film has a width generally the same as the width of cavity plate 377. Marginal portions of the upper film are frictionally held in contact with side marginal portions of the planar surfaces of the upper die plates by means of a pair of belts 501 and 502 which are trained around a series of pulley wheels 503 and a series of pulley wheels 504, respectively. These pulley wheels are rotatably mounted in spaced relation along a pair of bars 507 and 508, which bars are mounted from a suitable supporting structure.

After an upper die plate has the upper film applied thereto as just described, it advances along its upper horizontal run with the associated cam roller 418 in rolling engagement with cam surface 487a. This engagement between cam roller 418 and surface 487a does not bring about opening of the associated valve in the upper die plate assembly. When cam roller 418 engages screw 478e supported by cam track 487 and is lifted by the same, the valve associated with roller 418 is momentarily opened for causing a sudden partial evacuation of cavity 378 thereby partially to draw upper film 500 thereinto as indicated in FIG. 32. As the roller 418 passes over screw 487e the associated valve closes thereby to hold the film in cavity 378 in a partially drawn shape. This feature of initially drawing the upper film partially into the cavities acts to aid in securing or anchoring the upper film to the upper die plates thereby to eliminate longitudinal slipping of the upper film relative to the die plates when the upper film is fully drawn into the cavities.

As noted in FIG. 16a, as an upper die plate having the upper film partially drawn into the cavity therein continues along its upper horizontal run, cam roller 418 is engaged by cam rise 487b and then rolls along 487c thereby to open fully the valve associated with cam roller 418 (FIG. 33). As cam roller 418 rolls along cam surface 487c, the upper film is fully drawn into the cavity as indicated in FIG. 33 thereby to form a product receiving depression in the upper films, the film margins, still being clamped under belts 501 and 502, prevent lateral slippage of the film 500 into the die cavities. Referring back to FIGS. 22, 24 and 27, the flow of air during this evacuation of the cavity is via ports 394, bores 393 (also passageway 91 and bore 390), annular chamber 388, bores 419, 414a and 397, recess 431, fitting 432 and vacuum hose 433. As an upper die plate assembly having the upper film fully drawn into the cavity therein continues in its endless path so that the associated cam roller 418 rolls off the upstream end of cam track 487, the valve associated with roller 418 springs to the closed position thereby securely to hold the film in the cavity.

The upper die plates continue in their endless path from their upper horizontal run to their lower horizontal run, and the cavities lined with the upper film as just described come into overlying relation with the lower die plates and receive the products on the latter. As disclosed in the aforementioned Eberman et al. application, during the lower horizontal run of the upper die plate assemblies, these assemblies actually rest on the lower die plate assemblies and are carried along with the latter. The driving engagement of the upper die plate assemblies by the lower die plate assemblies is brought about by the reception of pins 437 and 438 in respective bores 469 and 470 of the associated lower die plate assembly.

FIG. 35 diagrammatically illustrates this relationship of the upper and lower die plate asemblies. It will be noted from this figure that the confronting, marginal planar surfaces of the upper and lower die plates press the upper and lower films together along a continuous area surrounding each of the cavities thereby to form sealed, product enclosing spaces between the upper and lower films.

After the upper and lower die plate assemblies come together in the manner just described and travel a short distance, cam rollers 418 and 402 come into simultaneous engagement with cam surfaces 491a and 492a, respectively. This causes opening of the valve associated with cam roller 418 for securely holding the upper film in the cavity as explained above. Simultaneously, the valve assembly associated with roller 402 is opened for evacuating the product enclosing space between the upper and lower films via opening 135 in the base web of package forming material, recess 468d, passageways 480, 481, 583, 409 (It will be noted from FIG. 34 that passageways 483 and 409 are in registry with each other with their adjacent ends sealed together by means of sealing sleeve 411.) 406, 405, bores 396, 396a, 397, recess 431, fitting 432, and vacuum hose 433. It should be noted that at this time seal lip 475a forms a continuous seal between the underside of the base web and the lower die plate thereby to close recess 468d from atmosphere.

It should be apparent that the product enclosing space between the upper and lower films is evacuated as cam rollers 418 and 403 roll along respective cam track surfaces 491a and 492a. It should also be noted that the opening of passageway 483 is not covered by the base web as the latter is offset to the left of the die plates (looking downstream); of course the web could extend over the opening of this passageway and be provided with an opening to permit communication of passageways 483, 409.

Referring now to FIG. 35, as the upper and lower die assemblies continue downstream in confronting relation, cam roller 418 is allowed to spring upwardly after it passes cam rise 491b thereby allowing the associated valve in the upper die plate assembly to spring to the closed position. Therefore, the upper film is no longer held into intimate contact with the surfaces of the cavity in the upper die plate. As the product enclosing space between the upper and lower films continues to be evacuated since cam roller 402 remains in rolling contact with cam surface 492a, the upper film releases somewhat from intimate contact with the die cavity.

After the upper and lower die plate assemblies travel a short distance downstream in the configuration diagrammatically illustrated in FIG. 35, cam roller 427 is cammed downwardly by engagement with cam surface 490b and then rolls along cam surface 490c (FIG. 36). This causes opening of the valve assembly associated with cam roller 427 thereby to open the cavity to atmosphere via the various passageways and bores communicating with annular chamber 388, passageway 422, bores 421a, 421 and bore 423 (FIG. 25). Since the product enclosing space between the upper and lower films continues to be evacuated by reason of the engagement of cam roller 402 with cam track surface 492a, the upper film is drawn into intimate contact with the stack of products and the upper surface of the lower film by the air rushing into the cavity from atmosphere. FIG. 36 indicates the configuration of the upper film as it commences to come into intimate contact with the stack and the lower film, and FIG. 37 shows the upper film after it is fully drawn into intimate contact with the stack and the lower film or base and cam roller 402 has just left cam track 492b. It will be noted that as the upper film comes into intimate contact with the lower film or sheet, opening 135 in the latter is sealed or closed. At this time the upper film is pressed into contact with an endless strip of adhesive thereby to form an effective seal between the upper and lower films.

It should be pointed out that as a portion of the upper film is held in contact with pocket 379 by reason of the evacuation through passageway 391, bore 390, etc., this portion of the upper film which overlies opening 135 in the lower film, is held away from the lower film around opening 135 during evacuation of the spaces between the films. Depending on the type of packaging film used to form the upper film, it may be desired to form one or more raised protuberances in the base web adjacent each of the openings 135 therein for preventing premature sealing of openings 135 during evacuation of the product enclosing spaces between the films. These protuberances can be readily formed in Base Forming Zone I by providing appropriate recesses in the cavities in the upper die plates.

After the upper and lower die plate assemblies continue to advance downstream in the configuration diagrammatically illustrated in FIG. 37, cam rollers 427, 418 and 402 roll from the downstream end of respective cam tracks 490, 491 and 492. Cam roller 427, being the last to close, assures that no residual vacuum remains in the die cavity to prevent separation of the upper and lower die plates. After the upper and lower die plate assemblies continue to travel for a short distance, the upper die plate assemblies are lifted by reason of their supporting cam tracks and then continue in their endless path for again receiving the upper film. The lower die plate assemblies with completed packages formed thereon continue horizontally downstream.

*Package labeling zone VI*

The sealed together upper and lower films containing the completed packages are then advanced to the labeling zone which includes suitable labeling mechanism for applying a label to the flat marginal area of the upper film having the greater area. The completed packages are offset near one edge of the valve to provide a suitable flat area on the upper film for the reception of a label 509 (FIGS. 22e and 31). The labeling mechanism may be of the type disclosed and claimed in Orloff Patent 2,952,376 for successively applying labels to advancing packages in a continuous and automatic manner.

*Package trimming zone VII*

The package forming apparatus includes unique mechanism for successively trimming the completed packages from the advancing sealed together films in an automatic and continuous manner. Such mechanism is disclosed and claimed in copending Jensen et al. application Ser. No. 651,070, filed Mar. 27, 1967, a division of this application. The trimming mechanism is driven by means including a clutch which is associated with sensing means. The sensing means detects an unfilled package and actuates the clutch for disengaging the trimmer thereby to prevent the latter from trimming the films around the unfilled package. The drive and clutch of the trimmer, illustrated in FIGS. 38, 39, 39a, 40, 41, 41a, 42 and 43, will now be described.

As best seen in FIG. 38, main drive shaft 30 has the downstream end thereof connected to the input shaft 510 of a gear box 512 by means of a flanged coupling 513. Gear box 512 includes suitable means gearing shaft 510 with a cross shaft 514 (FIG. 39) having opposite ends thereof mounted in journals 515 and 516. These journals are suitably mounted on respective supports 517 and 518 forming part of the supporting structure of the package forming machine. It will be understood that upon operation of the package forming machine, cross shaft 514 is rotated at a constant velocity.

A cam disk 520 is mounted on cross shaft 514 adjacent the near side of the gear box 512. It will be understood that cam disk 520, which includes a through central bore 520a (FIG. 42) for receiving shaft 514, is suitably fixed or keyed to the latter for rotation with the cross shaft. Cam disk 520 includes a continous cam track 520b in the near side thereof, which cam track is eccentric with respect to the axis of rotation of the cam disk.

A disk 522 is also secured to cross shaft 514 adjacent the end thereof mounted in journal 515. It will be understood that disk 522 is secured to the cross shaft for rotation with the latter. Disk 522 includes an integral cylindrical hub 522a (FIG. 43) extending from one side thereof, which hub is rotatably received within a bore 524a of a sprocket wheel 524 for rotatably supporting the latter. Disk 522 further includes a through bore 522b (FIG. 43) extending parallel and in offset relation with the axis of rotation of the disk.

Sprocket wheel 524 includes a through axial bore 524b, preferably of the same diameter as the diameter of bore 522b in disk 522, and spaced from the center of shaft 514 the same distance that bore 522b is spaced from the central axis of the shaft. A cylindrical spacer 525 (FIG. 42) is slidably received within bore 524b, which spacer has a length less than the thickness of sprocket wheel 524. The function and operation of the spacer will be explained hereinbelow. Sprocket wheel 524 is engaged with a double chain 526 for driving the latter in a manner to be explained herein.

A disk 528 including an integral, central, axially extending hub 529 includes a suitable central bore in which shaft 514 is rotatably received. In other words, disk 528 and hub 529 are mounted on shaft 514 for rotation relative to the latter. Disk 528 is mounted adjacent the near side of sprocket wheel 524, and includes a central circular recess 528a in the near side thereof in which a washer 530 is received. This washer abuts the far side of the sprocket wheel thereby to serve as a spacer to permit relative sliding movement between the adjacent faces of sprocket wheel 524 and disk 528. Cam disk 528 includes an axially extending through bore 528b, preferably of the same diameter as bore 524b in the sprocket wheel, and spaced from the central axis of shaft 524 the same radial distance as the spacing of bores 522b and 524b.

A pin 531 extends radially from the periphery of disk 528. Another pin 532 extends axially from the far face of disk 528, which pin pivotally engages one end of a link 533.

A rocker arm 535 has an integral hub 535a at one end thereof rotatably supported on a shaft 536 (FIG. 40). The opposite ends of shaft 436 are journaled in a pair of journal members 537, 538 suitably mounted on the supporting structure of the package forming machine. It will be understood that rocker arm 535 is mounted to swing about an axis defined by the longitudinal central axis of shaft 536. The other end of rocker arm 535 mounts a pin 540 which is pivotally received in a bore in the end of link 533 remote from the end thereof pivotally engaged with pin 532 on disk 528. Rocker arm 535 rotatably supports a cam follower 541 intermediate the ends thereof, which cam follower is received in cam track 520b of cam disk 520. Rocker arm 535 extends beneath a collar 542 which is mounted on shaft 514 and acts as a spacer between cam disk 520 and hub 529 associated with disk 528. It should be understood that the arrangement of cam track 520b is such that upon rotation of cam disk 520, arm 535 is rocked in a vertical plane thereby to oscillate cam disk 528 through an arc. In the embodiment of the clutch shown for purposes of illustration, disk 528 is oscillated through an arc of approximately 62°.

As best seen in FIGS. 44 and 45, a pin 544 is shiftably mounted in a sleeve 545 secured in bore 522b in disk 522. Sleeve 545 is secured in bore 522b by means of a pair of fasteners 546 which extend through suitable bores in the sleeve and the disk. Sleeve 545 includes a slot 545a (FIGS. 42 and 45) in the wall thereof for receiving one end of a pin 547 slidably mounted in a bore in cam disk 522. A spring 548 is received in this bore and held therein by means of a fastener 549. Spring 548 urges pin 547 radially inwardly of sleeve 545.

Pin 544 includes a cavity defining a pair of recesses 544a and 544b separated by a raised or peaked surface. A short pin 551 is alternately received in these recesses and yieldably held therein by spring biased pin 547. It should be apparent that pin 544 is adapted to be shifted to either of two positions wherein pin 551 is received in either of recesses 544a or 544b.

As noted, pin 544 is bifurcated at one end thereof for rotatably mounting a roller 552. The other end of the pin is of frusto-conical shape adapting it for ready entry into bore 524b of sprocket wheel 524.

A pin 554 is shiftably mounted in bore 528b of cam disk 528. This pin is identical in construction and in mounting with pin 544 just described; therefore, the construction and mounting of pin 554 will not be described in detail. It should be sufficient to state that pin 554 (FIG. 42) is shiftably mounted in a sleeve 555 mounted in bore 528b, and that pin 554 mounts a roller 556 at one end thereof.

The supporting structure of the package trimming apparatus includes a horizontally extending plate 558 (FIGS. 40, 41 and 44) mounting an inverted, U-shaped block 559. Block 559 includes vertically extending recesses in its side walls which are in registry with vertical openings provided in plate 558. One recess designated 560 is illustrated in FIG. 44, and the registering opening in plate 558 is designated 561. Plates 562 and 563 are mounted to the opposite side walls of block 559 by respective yieldable fastening means 564 and 565 thereby to close the vertical recesses in the block and form vertical guideways for supporting a pair of rods 567 and 568. It will be understood that rods 567 and 568 are mounted for free vertical reciprocal movement in the guideways in the block 559 in the registering bores in support plate 558.

A cam block 570 is attached to the lower end of rod 567 by a fastener 571. Cam block 570 includes a planar face 570a (FIG. 41a) which slidably engages a depending extension 562a of plate 562. This slidable engagement between face 570a and plate extension 562a prevents rotation of the cam block about the axis of rod 567. Cam block 570 also includes inclined faces 570b. The function and operation of the cam block will be explained hereinbelow. Rod 567 includes a recess 567b in its upper end which receives a pin mounted in one end of a cross bar 572, which cross bar is pivotally mounted intermediate its ends from a support member 573 (FIGS. 39 and 41) supported on plate 558.

A cam block 575 (FIG. 44) identical in shape with cam block 570 and opposite hand with respect thereto, is secured to the lower end of rod 568. Rod 568 includes a recess 568a in its upper end, which recess receives a pin mounted on the other end of cross bar 572.

It should be apparent that pivoting of cross arm 572 causes simultaneous movement of rods 567, 568 in opposite directions. As noted in FIG. 39, cross bar 572 includes an upwardly extending, integral extension having a cavity or recess pivotally receiving one end of a right angle arm 576. Arm 576 is pivotally mounted at its corner or right angle portion from the upper end of block 573. The other end of arm 576 is pivotally mounted to the lower end of a rod 577; this rod has a reduced-in-diameter portion 577a extending between the arms of an H-shaped strap 578a (FIGS. 38 and 40) which is connected at its upper end to a solenoid 578. A spring 577b encircles rod portion 577a with one of its ends engaging the bight portion of the strap and with its other end engaging a collar 577c secured to the upper end of rod portion 577b. A coil spring 579 has the lower end thereof secured to the end of cross arm 572 pivotally connected with rod 567 (FIG. 41) and the upper end thereof connected with a block 580 forming a part of the supporting structure of the package forming apparatus. It should be apparent that spring 579 acts to urge cross arm 572 in the position illustrated in FIGS. 39 and 41 thereby to urge cam block 575 to its lower position and cam block 570 to its upper position.

A block 559 has a spring plate 580 (FIGS. 39a and 44) the lower end of which includes a depending extension 580a supporting a small pin 581 adapted to lie in the path of movement of cam block 575 thereby to prevent movement of the same. Plate 580 is adapted to be deflected for permitting movement of cam block 575 by being engaged by pin 531 carried by oscillating cam disk 528.

Cam block 570 is arranged relative to disk 522 so that when cam block 570 is in its lowermost position and pin 544 is in the position illustrated in FIGS. 44 and 45, inclined face 570b engages roller 552 carried by the pin upon rotation of disk 522 thereby to shift pin 544 so the frusto-conical or tapered end thereof enters bore 524b in sprocket wheel 524 thereby shifting spacer 525 for forcing the tapered end of pin 554 from the bore in sprocket wheel 524. Cam block 575 is arranged relative to disk 528 so that when cam block 575 is in its lowermost position, one of its inclined faces engages roller 556 of pin 554 thereby to shift the latter in bore 528b of disk 528 for entry of the tapered end of pin 554 into bore 524b of the sprocket wheel. This shifting movement of pin 554 shifts spacer 525 for forcing pin 544 from bore 524b of the sprocket wheel. If for some reason the various bores in disks 522, 528 and sprocket wheel 524 are not in alignment to permit shifting of the pins by one of the cam blocks, the lowered cam block is allowed to deflect by the associated yieldable fastening means 564 or 565 thereby to prevent damage to the clutch.

Photoelectric sensing means for actuating the clutch are provided adjacent the advancing sealed together films just in advance of the package trimmer which comprises Package Trimming Zone VII. The photoelectric sensing means includes a light source 582 and a photoelectric cell 583 (shown schematically in FIG. 1a). Light source 582 projects a horizontal beam of light transversely of the films just over the upper surface of the upper film. When this beam of light is not blocked by a filled package, it strikes photoelectric cell 583 (FIG. 48) for activating the same. This photoelectric cell is electrically connected with solenoid 578 for actuating the latter upon activation of the cell. The means connecting photoelectric cell 583 with solenoid 578 includes suitable time delay means (not shown) to prevent the solenoid from being actuated when the photoelectric cell is struck by the beam of light passing through the spaces between adjacent packages formed between the advancing films.

The operation of the clutch associated with the package trimmer is as follows:

As long as filled packages are successively formed and the beam of light striking the photoelectric cell 583 is successively broken, solenoid 578 remains energized in which case rod 577 (FIG. 39) is then in its uppermost position thereby holding cam block 570 (FIG. 44) in its lowermost position and cam block 575 in its uppermost position. When the cam blocks are in these positions, the tapered end of pin 544 in disk 522 is received within bore 524a of sprocket wheel 524; in other words, pin 544 locks disk 522 and sprocket wheel 524 together.

During the operation of the machine, shaft 514 is rotated at a constant velocity (by the drive means described above) in a counterclockwise direction as viewed in FIGS. 38 and 40. As mentioned above, disks 520 and 522 are connected with cross shaft 514 for rotating with the latter. Accordingly, when pin 544 is in the position just described, sprocket 524 is constantly rotated for driving chain 526. This chain serves to drive the trimmer (to be explained in detail hereinbelow) for successively trimming packages from the sealed together films in a continuous and automatic manner.

Now assume that an unfilled package passes from Package Forming Zone V. This might occur by the failure of the loading personnel to place a stack of products on one of the loading platforms 358 of feed conveyor 350. When this unfilled package passes between the photoelectric sensing means consisting of light source 582 and photoelectric cell 583, the beam of light will not be broken and this will activate the photoelectric cell for de-energizing solenoid 578. When the solenoid is de-energized, rod 577 is thereby mechanically unlocked by the solenoid for allowing spring 579 to shift the cam blocks.

As explained above, during rotation of shaft 514 at a constant velocity, disk 528 is oscillated by reason of cam roller 541 traveling in cam track 520b of cam disk 520. The arrangement and design of the various parts which bring about oscillation of disk 528 are such that the latter oscillates through an arc of approximately 62° with pin 531 traveling through an arc of approximately 31° in each direction from a vertical plane extending through the axis of rotation of shaft 514. The arrangement of the various parts which oscillate disk 528 are such that the latter is rotated in a counterclockwise direction (FIGS. 38 and 40) with a velocity equal to the angular velocity of shaft 514, disks 520 and 522, and with bore 528b in alignment with bores 524b, 522b.

Each time disk 528 reaches its extreme clockwise position (again referring to FIGS. 38 and 40), pin 531 on the periphery of disk 528 strikes spring plate 580 thereby to deflect the latter and move pin 581 (FIG. 39a) from the vertical path of travel of cam block 575. When the cam block 575 is in its uppermost position, pin 581 is disposed beneath the cam block thereby to prevent the latter from being lowered when spring plate 580 is not deflected by pin 531. As will become apparent herein, this feature prevents shifting of cam blocks 570, 575, and therefore pins 544 and 554 at times when disks 522, 528 and sprocket wheel 524 are not traveling together at the same angular velocity with their axially extending, radially offset bores in alignment.

Now continuing, when spring plate 580 is deflected as described, cam blocks 570 and 575 are allowed to be shifted to the position illustrated in FIGS. 39 and 44 by spring 579. Accordingly, when cam disk 528 reverses direction and commences to rotate in a counterclockwise direction (with respect to FIGS. 38 and 40) roller 556 on pin 554 is engaged by the inclined face of cam block 575 for shifting pin 554 so that its tapered portion enters bore 524b of the sprocket wheel. It will be recalled that when disk 528 rotates in its counterclockwise direction, it rotates at the same velocity as disk 522 and sprocket wheel 524 with bore 528b in alignment with the corresponding bores in disk 522 and sprocket 524. As the tapered end of pin 554 enters the bore in the sprocket wheel, spacer 525 therein is slid along bore 524b for forcing pin 544 from the bore in the sprocket wheel. Pin 544 is allowed to be shifted as cam block 570 is in its raised position. Shifting of pins 544, 554 and spacer 525 provides for connecting sprocket wheel 524 with disk 528 and simultaneously disconnecting the sprocket wheel from disk 522. Therefore, sprocket wheel 524 now oscillates with disk 528.

This oscillating movement of the sprocket wheel provides corresponding oscillation to chain 526. As will be apparent from the following description of the trimming operation, this oscillation of chain 526 cycles the trimming mechanism in such a manner that the same does not perform a trimming operation. Accordingly, the unfilled package which activated the photoelectric sensing means is not trimmed from the advancing sealed together films and is therefore carried to a windup drum (to be explained below) rather than being deposited with the filled packages.

Sprocket wheel 524 will continue to oscillate with disk 528, until the beam of light emanating from light source 582 is again broken by a filled package, at which time photoelectric cell 583 will be activated for energizing solenoid 578 thereby to lift strap 578a for compressing spring 577b. Then, when plate 580 is deflected by pin 531 for allowing movement of the cam blocks, spring 577b will force rod 577 upward to shift cam block 570 to its lowermost position and cam block 575 to its uppermost position. As roller 552 on pin 544 is engaged by one of the inclined faces 570b of cam block 570 during counterclockwise rotation of cam disk 522, the pins are shifted for engaging sprocket wheel 524 with disk 522 and simultaneously disconnecting the sprocket wheel from oscillating disk 528. Sprocket wheel 524 will then be rotated at a contsant velocity for driving the package trimmer and will continue to do so until the photoelectric sensing means is again actuated by an unfilled package.

Referring now to FIGS. 2a and 46 through 50, the package trimmer will be seen to include a cross shaft 585 (FIG. 46) journaled in hubs 586 and 587 mounted from respective plates 588 and 589 forming a part of the supporting structure of the package forming apparatus. A sprocket wheel 590 is keyed to shaft 585 adjacent hub 586; chain 526 is trained around the teeth of this sprocket wheel. In other words, chain 526 rotates or oscillates sprocket wheel 590, as the case may be, thereby to impart corresponding movement to cross shaft 585.

An annular member 592 is received on one end of the shaft 585 and secured, as by a number of threaded fasteners, to sprocket wheel 590. Annular member 592 includes an integral, radially extending arm 592a mounting a pin 593 which is pivotally engaged with the lower end of an arm 594.

An annular member 596 identical and opposite hand with annular member 592 is fastened to a disk 597 which is keyed to cross shaft 585. Annular member 596 includes an integral, radially extending arm 596a mounting a pin 596b which is pivotally engaged with the lower end of an arm 598. It should be understood that rotation of cross shaft 585 brings about rotation of arms 592a, 596a thereby to provide oscillating movement to respective arms 594, 598.

An eccentric cam disk 600 includes an eccentric bore receiving cross shaft 585. A hub 601 adjacent one face of the cam disk and secured thereto by a number of fasteners is keyed to cross shaft 585. It will be understood that rotation of cross shaft 585 brings about corresponding rotation of the cam disk. Cam disk 600 includes an annular cam track 600a which has its center eccentric with the longitudinal central axis of shaft 585. This cam track receives a cam roller 603 rotatably mounted on the lower end of rocker arm 604.

Rocker arm 604 is supported intermediate its ends on a shaft 604a having opposite ends thereof journaled in hubs 604b and 604c mounted to respective supporting members 588 and 589. It will be understood that arm 604 is mounted for rocking in a vertical plane about an axis defined by the central axis of shaft 604a. Rocking movement is imparted to rocker arm 604 by cam roller 603 riding in eccentric cam track 600a.

The package trimmer includes a generally rectangular base plate 605 having pairs of rollers 606 and 607 at opposite sides thereof, which rollers roll along respective tracks 608 and 609. These tracks, which are suitably mounted on the supporting structure of the apparatus, extend longitudinally of the direction of movement of the advancing sealed together films. The base plate includes additional rollers 610 and 611 at its under marginal portions, which rollers engage the inner faces of confronting tracks 608 and 609 thereby laterally to guide base plate 605. The base plate has a block 613 fastened to the underside thereof, which block includes a bore rotatably mounting a pin 614 pivotally engaging the upper end of rocker arm 604. It should be apparent that rocking movement of arm 604 provides horizontal reciprocal movement of base plate 605. The various parts which provide this reciprocal movement to the base member are designed so that the base member moves in its downstream stroke at a velocity equal to the velocity of the advancing sealed together films of package forming material.

As best noted in FIGS. 48 and 49, base 605 has a horizontally disposed die plate 615 secured thereto. This die plate has a peripheral shape which is generally rectangular with rounded corners; the shape of this die plate defines the peripheral shape of a completed package (FIGS. 21f and 31). A stripper plate 616 is mounted on base plate 605 for vertical reciprocal movement relative thereto. The stripper plate includes a number of depending guide pins 617 received in bores in base plate 605. Springs 618 are received in these bores in the base plate, which springs engage the lower ends of pins 617 thereby to urge the stripper plate upwardly. A number of fasteners 617a pass through openings in marginal portions of the stripper plate, and include reduced-in-diameter, lower threaded ends threadingly engaged in blind bores in plate 605. The heads of fasteners 617a contact the upper surface of the stripper plate thereby to limit upward movement of the same. It will be apparent that the stripper plate is yieldingly mounted for downward movement and that springs 618 act to urge the stripper plate to its uppermost position.

The stripper plate includes a central opening corresponding in peripheral shape to the periphery of die plate 615. When stripper plate 616 is in its uppermost position, the horizontally disposed, planar, marginal portions thereof are spaced slightly above the top surface of die plate 615. As noted in FIG. 48, stripper plate 616 includes a downstream, marginal recessed surface 616a which extends laterally of the direction of film movement for the full width of die plate 615. When stripper plate 616 is in its uppermost position, recessed surface 616a of the stripper plate is flush with the upper surface of die plate 615.

Base plate 605 supports a pair of standards 619, 620 disposed laterally of the direction of film movement. Standards 619 and 620 are slidably received within vertically extending journals 621 and 622, respectively. These journals are mounted within respective vertically extending bores in an upper plate 623. It will be understood that journals 621 and 622 are secured to plate 623 for vertical reciprocal movement with the latter. In other words, plate 623 is mounted for vertical reciprocal movement relative to base plate 605. Opposite ends of plate 623 support horizontally extending pins 624, 625 which are pivotally received in the upper ends of respective arms 694 and 598. It should be apparent that oscillation of arms 594 and 598 in the manner described above brings about vertical reciprocal movement of plate 623 relative to base plate 605.

A block 625 is secured to the underside of plate 623 as by a number of fasteners 626 extending through registering vertical bores in plate 623 and block 625 and engaged with nuts 627 (FIG. 48). A horizontally disposed die ring 628 is secured to the underside of block 625 by suitable fastening means, such as a fitting 628a. Die ring 628 includes an upper cavity 630 opening into a lower cavity 631; it will be observed that cavity 630 is offset transversely of the die ring toward the far side of the apparatus. Cavity 631 has a continuous vertical wall which is generally rectangular in shape but with rounded corners; the shape of the vertical wall of cavity 631 corresponds with the peripheral shape of die plate 615 and is dimensioned just slightly larger than the latter so that die plate 615 may be received within cavity 631. As will be explained herein, the shearing action between the vertical wall of cavity 631 and the edge of die plate 615 severs the sealed together films for trimming a completed package from the same. During a trimming operation, upper cavity 630 receives the portion of the package which contains the product. It will be realized that cavity 631 is supported directly over die plate 615 with the continuous vertical wall of cavity 631 in direct vertical alignment with the continuous vertical edge of die plate 615.

Die ring 628 includes a downwardly facing, horizontally disposed, continuous planar surface 632, which surface is adapted to engage the portion of the upper film which is disposed over stripper plate 616. A plurality of vertically disposed, spaced stripper pins 635 are arranged around the perimeter of cavity 631 just inwardly of the continuous vertical wall defining the same.

FIG. 49 illustrates the mounting of one stripper pin which is typical of the mounting of all the stripper pins.

Stripper pin 635 is slidably mounted in a vertical bore in die ring 628, which bore registers with another larger diameter vertical blind bore in block 625. Pin 635 includes a head 635a which engages the upper surface of ring 628 for limiting downward movement of the pin. A spring 636 is retained in the blind bore in block 625 and engages the upper end of stripper pin 635 for yieldably urging the same to a lowermost position wherein the lower end of the stripper pin is disposed slightly beneath die ring surface 632. Spring 636 allows the stripper pin to be forced upwardly wherein the lower end of the latter is spaced above die ring surface 632.

Die ring 628 preferably includes a vertically extending punch pin 639 extending downwardly into the portion of cavity 631 which receives the flat marginal portion of the package having the label applied thereto. During the trimming operation, punch 639 acts to punch a hole through the label and the flat marginal portion of the package thereby to adapt the package to be suspended from a pin on a display rack, for example.

As noted in FIG. 46, a vacuum cylinder 643 has one end thereof pivotally secured to a plate forming part of the supporting structure of the package forming apparatus. Cylinder 643 includes a piston rod 643a pivotally secured to a block 643b fastened to plate 623. Suitable vacuum lines (not shown) extend to the cylinder from vacuum control means (not shown). The control means actuate cylinder 643 for constantly urging piston rod 643a upwardly thereby to provide a counterbalancing effect to the vertically reciprocal members of the trimmer; this construction brings about smooth operation of the trimming mechanism.

It should be pointed out at this time that inclined rollers 641 and 642 illustrated in FIGS. 47 and 48 are hold-down and guide rollers which engage lateral marginal portions of the completed package bases thereby laterally to guide the sealed together films as they approach the package trimmer.

The operation of the package trimmer is as follows:

As mentioned above, as long as filled packages pass between the sensing means consisting of light source 582 and photoelectric cell 583 (FIG. 1a), drive chain 526 is driven in a uniform manner thereby to rotate cross shaft 585 at a constant velocity. Rotation of shaft 585 causes simultaneous reciprocation of base plate 605 (and the components supported thereon) and vertical reciprocation of plate 623 (and the various parts secured thereto). As mentioned above, base 605 moves in its downstream stroke at a velocity which is equal to the velocity of the advancing webs. The arrangement of the various parts which vertically reciprocate plate 623 is such that the latter is moved downwardly during the downstream stroke of the base of the package trimmer. The trimmer of course operates in timed relation with the advancing webs so that die plate 615 and cavity 631 in the die ring 628 are disposed in respective under and over relation with a filled package to be severed from the sealed together advancing films.

As die plate 615, which will be disposed directly beneath a filled package to be severed, moves downstream with the advancing package, plate 623 is simultaneously brought downwardly for performing the trimming operation. During the downward and forward movement of die ring 628, planar surface 632 first contacts the portion of the upper film which is disposed over stripper plate 616. During continued downward and forward movement of die ring 628, stripper plate 616 is forced downwardly thereby causing severing of the sealed together films by the action of die plate 615 entering cavity 631. As mentioned above, the severing action is brought about by the shearing action of the vertical edges of die plate 615 passing in close spaced relation with the continuous vertical wall of cavity 631. During this entry of die plate 615 into cavity 631, stripper pins 635 are simultaneously forced upwardly against their respective springs 636. When die ring 628 reaches its lowermost position, stripper plate 616 is lowered almost to its lowermost position and the product containing portion of the package is received in upper cavity 630 in die ring 628.

As base 605 approaches the downstream limit of its horizontal stroke, die ring 628 commences to be lifted away from die plate 605. During return or upstream movement of base 605, die ring 628 is lifted to its uppermost position.

After die ring 628 has performed a trimming operation and is lifted away from die plate 615, stripper plate 616 is allowed to move upwardly under the influence of the springs associated with the same, thereby to lift the sealed together films around the package that has just been severed. During the initial upward movement of die ring 628, the severed package itself is held against die plate 615 by the action of stripper pins 635. After die ring 628 has lifted for completely uncovering or exposing a severed package, the severed or trimmed package will be momentarily supported on die plate 615 and the adjacent marginal portions of the sealed together films (which have now been severed from the package) will be supported on the upper surface of stripper plate 616 with the latter in its uppermost position. As the sealed together films continue to be advanced downstream of the apparatus (by means of a windup drum to be referred to hereinbelow) the trailing edge 644a (FIG. 21f) of the opening 644 formed in the sealed together films by severing a package therefrom engages the trailing vertical wall of the severed package thereby to slide the same downstream from die plate 615. Recess 616a of the stripper plate, which is flush with die plate 615 when stripper plate 616 is in its uppermost position, allows the completed package to be slid downstream from die plate 615. Accordingly, during upstream movement of base 605 preparatory to another trimming operation, the package just severed is carried or slid downstream by the advancing films.

During the trimming operation, punch 639 in cavity 631 forms a small opening 645 (FIGS. 21f and 31) in the flat marginal portion of the package which supports label 509. As mentioned above, this opening adapts the package to be suspended from a hook on a display rack or the like, for example.

It should be apparent that as long as drive chain 526 is driven in a uniform manner, the trimming mechanism will be operated for successively trimming or severing completed packages from the advancing films in a continuous and automatic manner. Should photoelectric cell 583 (FIGS. 1a and 48) be activated by an unfilled package approaching the trimmer, the clutch forming a part of the package trimmer drive will be actuated for bringing about oscillating movement of drive chain 526. This oscillating movement of the drive chain causes horizontal reciprocation of base 605 and simultaneous vertical reciprocation of plate 623 through strokes which are substantially less than their full strokes; accordingly, die ring 628 is not brought into contact with the advancing films and the unfilled package is not trimmed from the former. As soon as a filled package intercepts the light beam being directed on photoelectric cell 583, the clutch is actuated again to drive chain 526 in a continuous manner thereby to operate the trimming mechanism for trimming filled packages in a continuous and automatic manner.

*Windup and delivery zone VIII*

The Windup and Delivery Zone includes a windup drum 648 (FIG. 2a) suitably mounted for rotation about a horizontal axis. The windup drum is disposed over the sealed together films and includes laterally spaced pairs of pins or prongs 649 which are circumferentially spaced around the drum. These pins engage openings 133 and 134 formed in the base web in Punching Zone II. The pins are preferably pointed at their ends for piercing the upper film which is of course sealed to the lower web or film over openings 133 and 134. Drum 648 is driven, preferably from a power take-off from gear box 512, in timed relation with movement of the films. Windup drum 648 acts to provide downstream movement of the sealed together films after they leave Package Forming Zone V.

The windup drum picks up the sealed together films, which are in ladder-like form since the spaced, completed packages have been severed therefrom, and advances the same around a roller 650. During this lifting or winding up of the films by windup drum 648, the completed packages are no longer engaged by the trailing edges in the associated openings in the films and are preferably advanced downstream by suitable conveyor, generally designated 652. This conveyor carries the completed, filled packages to a station wherein personnel pack the packages in large cartons or boxes, for example. Only completed filled packages will be advanced by conveyor 652, as unfilled packages are not trimmed from the films and are therefore taken up by windup drum 648.

After the ladder-like films pass around roller 650, they may be wound and collected on a windup drum (not shown). After a suitable amount of the films have been collected on the windup drum, they may be removed and the upper film and base film peeled from each other for re-processing and subsequent re-use. In lieu of the windup drum just described, the ladder-like films may be pulled around a suitably driven, horizontally disposed roller 653 and then passed downwardly through a chopper generally designated 655 (FIG. 2a). The chopper includes a chopping blade 656 pivotally connected to the marginal portion of a wheel 657 for horizontal reciprocal movement. Wheel 657 is rotated by a suitable motor 658. Chopping blade 656 chops the films into small pieces as they pass downwardly through a chute 659. The chopped pieces of film are directed downwardly as scrap through a chute 660 where they are preferably collected in a scrap container (not shown).

Referring to FIG. 31, which illustrates a completed package formed by the package forming apparatus of this invention, preferably a notch 661 is formed in the edge of the base material which is adjacent the flat marginal portion of the package supporting the label. Notch 661 may be formed in the base web by providing punch 132 in Punching Zone II with a suitable punch for successively forming spaced, generally rectangular, longitudinally extending openings in the base web adjacent respective formed bases in the former. Accordingly, when the completed packages are formed, both the upper film and the label will overlie notch 661 in the base web or film. This notch serves as a tearing notch to facilitate separation of the upper film from the base film when it is desired to open the package.

The embodiment of the invention shown for purposes of illustration, is adapted for packaging stacks of rectangular slices, such as slices of meat. However, it will be understood that the invention is not to be limited to packaging such a product. The machine can be adapted for packaging other products, either in stacked form or otherwise. By way of example, the machine can be readily adapted for packaging stacks of circular slices of products. The same package bases can be used in packaging such slices. It is only necessary to replace the upper die plates with die plates having cylindrical cavities and to adapt feed conveyor platforms 358 with suitable guides for supporting stacks of circular shaped slices. It will be apparent that the machine may be modified even in other ways, within the scope and spirit of the appended claims, for packaging even other forms of types of products.

As mentioned above, the present invention also includes a new and improved method for continuously forming packages. This method includes the sequence of essential manipulative steps performed by the package forming apparatus disclosed herein, i.e. the steps performed in Base Forming Zone I, Punching Zone II, Product Loading Zone IV and Package Forming Zone V. The step of applying adhesive (as in Adhesive Applying Zone III) is not essential when using an upper film having properties similar to the properties of polyvinylidene chloride film since, as explained above, such material is capable of forming an adequate seal with a base film or web having properties similar to the properties of polyvinyl chloride.

We claim:

1. In a machine for continuously forming packages consisting of substantially coextensive upper and lower film secured together at their margins in package forming relation wherein the lower film is formed of thermoplastic material, and wherein said machine includes structure for advancing a continuous web of said lower film the improvement comprising in series, base forming means including upper and lower die platens moving in timed relation with the lower film and engageable with the same in respective over and under relation for successively vacuum forming separate package bases spaced longitudinally of the lower film and raised above the plane of the latter, package delivery means for successively depositing products on said bases as they are advanced, a package forming station including an endless series of lower die plates having a horizontal run portion for carrying said lower film and an endless series of upper die plates for advancing a continuous web of said upper film into overlying relation with the lower film, which upper die plates each include a cavity and vacuum means for drawing a vacuum to form substantially corresponding pockets in the upper film while it advances with the upper die plates and before it is disposed in overlying relation with the lower film, said upper die plates traveling in timed relation with the lower film so that said pockets receive the products on the lower film, said upper and lower die plates being adapted to seal said films together around the perimeters of said bases and vacuum press said upper film into conformity with the products to form separate sealed packages, and means for successively severing said films around the perimeters of said bases to detach the packages from the films.

2. The improvement according to claim 1 further defined by said base forming means further including heating means disposed adjacent the face of the lower film which becomes the underside of a completed package, the lower die platens each including an opening corresponding in peripheral shape to the peripheral shape of said bases, and said upper die plates including cavities registering with said openings and vacuum forming means for drawing the heated portion of the lower film into the cavities.

3. A machine for continuously forming packages consisting of substantially coextensive upper and lower films secured together at their margins in package forming relation wherein the lower film is formed of thermoplastic material, wherein said machine includes structure for advancing a continuous web of said lower film the improvement comprising in series, base forming means including upper and lower die platens moving in timed relation with the lower film and engageable with the same in respective over and under relation for successively vacuum forming separate package bases spaced longitudinally of the lower film and raised above the plane of the latter, means for successively forming an opening in said lower film adjacent and outward of the perimeter of each of said bases formed therein, means for successively applying an adhesive strip on the lower film around the perimeters of said bases, package delivery means for successively depositing products on said bases as they are advanced, a packaging station including an endless series of lower die plates having a horizontal run portion for carrying said lower film and an endless series of upper die plates for advancing a continuous web of said upper film into overlying relation with the lower film, which upper die plates each include a cavity and vacuum means for drawing a vacuum to form substantially corresponding pockets in the upper film while it advances with the upper die plates and before it is disposed in overlying relation with the lower die plates, said upper die plates traveling in timed relation with the lower film so that said pockets receive the products on the lower film, said upper and lower die plates having respective marginal portions closely confronting each other during a portion of their travel for pressing said films together around the perimeters of said bases thereby forming product enclosing spaces, said lower die plates each having a port for registry with one of said openings in the lower film, said upper die plates being associated with vacuum means and said upper and lower die plates being provided with passageways for vacuum pressing the upper film into conformity with the products and into intimate contact with the adhesive strips by evacuating said pockets through said ports after said upper and lower films have been pressed together, and means for servering said films around the perimeters of said bases to detach the completed packages from the films.

4. A method for forming a package of the type including substantially coextensive upper and lower films secured together at their margins in product enclosing relation wherein the lower film is formed of thermoplastic material, said method including the steps of: advancing a continuous web of thermoplastic film, successively forming raised package bases in the lower film in spaced relation longitudinally of the latter, forming an opening in the lower film adjacent and outward of the perimeter of each of said bases, depositing products on the raised bases, advancing a continuous web of upper film and vacuum forming pockets therein in spaced relation longitudinally of the upper film, bringing the upper film into overlying relation with the lower film with the products being received in said pockets, pressing said upper and lower films together around the perimeters of said bases in product enclosing relation, successively vacuum pressing the upper film into conformity with the products by evacuating the spaces between said films through said openings and at substantially the same time sealing the upper film to the perimeters of said bases thereby to close the openings in the lower film, and severing the sealed together films for separating the completed packages from the films.

5. In a machine for continuously forming packages consisting of a shaped base of thermoplastic sheet material and a substantially coextensive film secured to the bases in package forming relation, apparatus for forming the package bases comprising, an endless series of lower die platen assemblies having a horizontal run for receiving a continuous web of thermoplastic sheet material, said lower die platen assemblies each including a die platen having an opening generally corresponding to the shape of said base and surrounded by a planar marginal surface which receives the undersurface of said web for supporting the same, an endless series of upper die platen assemblies having a horizontal run, said upper die platen assemblies each including a die platen having a cavity surrounded by a planar marginal surface, means for advancing said upper and lower platen assemblies in timed relation and camming means for successively bringing the marginal surfaces of said upper and lower die platens together in clamping relation with the upper surface and undersurface, respectively, of said web as the latter is moved along the horizontal run of the die platen assemblies, said lower platens having their adjacent sides in overlapping relation so that only the underside of said web within said openings is exposed when the upper and lower die platens are in clamping relation, heating means disposed beneath at least a portion of the horizontal run of said lower platen assemblies for heating the exposed areas of said web, vacuum means associated with each of said upper die platen assemblies for drawing the heated areas of said web into said cavities thereby to form the bases successively as said web is advanced.

6. The apparatus according to claim 5 wherein each upper die platen assembly includes first means yieldably mounting its upper die platen for vertical movement relative thereto, which first means are in turn mounted for vertical reciprocal movement on a support member which travels in a horizontal linear path during the horizontal run of the upper die platen assemblies, a roller carried by said first means of each upper die platen assembly and a cam track extending along the horizontal run of the upper die platen assemblies for receiving said rollers during movement of the upper die platen assemblies along their horizontal run, said upper die platen assemblies each including first valve means opened upon movement of said first means toward the associated die platen for drawing a vacuum in the cavity in the latter and closed upon movement of the first means away from the associated die platen, second normally closed valve means opened upon movement of the first means away from the associated die platen for venting the cavity in the latter to atmosphere, said cam track being configured for successively lowering said first means to bring the upper and lower die platens in clamping relation, lowering said first means further to open said first valve means thereby to draw a vacuum in said cavities, raising said first means to close said first valve means, raising said first means further to open said second valve means thereby to vent said cavities, and then raising said first means still further to separate the upper and lower die platens.

7. In a continuous package forming machine, an apparatus for successively depositing adhesive in endless patterns on a sheet as the latter is continuously advanced, said apparatus comprising, means for advancing a continuous web of package forming sheet material along a horizontal run, a frame mounted for reciprocal movement longitudinally of the direction of web movement and having a portion thereof extending over the web, first means for reciprocating said frame so that its speed in one direction is equal to the speed of the advancing web, adhesive applying roller means supported from said portion of the frame for vertical reciprocal movement relative thereto and for movement in an endless path of which a substantial portion is in a horizontal plane, which adhesive applying roller means includes at least one roller normally mounted above the web and for peripheral engagement with the web, second means acting in timed relation with said first means for moving the roller along said path during movement of the frame in said one direction, and cam means forcing the roller downwardly during its movement along said path thereby to apply adhesive in an endless pattern on said web.

8. In a continuous package forming machine, an apparatus for applying an endless strip of adhesive to a web of package forming material comprising, means including a member rotatable in a horizontal plane and having an end horizontally spaced from the axis of rotation of the member, means swingably supporting a vertical rod from said end for swinging movement about a spaced vertical axis, which rod supports an adhesive applying roller at its lower end and a first guide roller at its upper end, a horizontal arm supporting a second guide roller at one of its ends and having its other end fixed to the rod, said means including a first endless guide track in the form of a rectangle with rounded corners and having said first guide roller received therein thereby to guide said rod in a path corresponding to said first guide track, said means including a second endless guide track in the form of a rectangle with rounded, outwardly offset corners, which second guide track has said second guide roller received therein thereby to cause said rod to pivot about its vertical axis as it traverses a corner of its endless path.

9. In a continuous package forming machine, an apparatus for applying an endless strip of adhesive to a web of package forming material comprising, means supporting at least one adhesive applying roller for movement in an endless path from a starting to a stopping position and for simultaneously vertically reciprocating the roller thereby to lower the same into peripheral contact with the web during a portion of the path of travel of the roller and to lift the roller above the web during the remaining portion of the path of travel of the roller, an adhesive transfer roller mounted with its periphery in close proximity with the periphery of said adhesive applying roller when the latter is in its starting position, and means for rotating the transfer roller and coating the periphery of the same with adhesive.

10. In a continuous package forming machine, an apparatus for successively depositing adhesive in endless patterns on a sheet as the latter is continuously advanced, said apparatus comprising, means for advancing a continuous web of package forming sheet material along a horizontal run, a frame mounted for reciprocal movement longitudinally of the direction of web movement and having a portion thereof extending over the web, means for reciprocating said frame so that its speed in one direction is equal to the speed of the advancing web, means including at least one adhesive applying roller supported from said portion of the frame for vertical reciprocal movement and for movement in an endless path, cam means moving the roller downward from a loading position into peripheral contact with the web during movement of the frame in said one direction, means for driving the roller along said path for applying adhesive on the periphery of the roller to the web, and an adhesive transfer roller mounted for rotation about its own axis and adapted to transfer adhesive from its periphery to the periphery of the adhesive applying roller when the latter is in its loading position.

11. In a continuous package forming machine, an apparatus for sucessively depositing adhesive in endless patterns on a sheet as the latter is continuously advanced, said apparatus comprising, means for advancing a continuous web of package forming sheet material along a horizontal run, a frame mounted for reciprocal movement longitudinally of the direction of web movement and having a portion thereof extending over the web, means for reciprocating said frame so that its speed in one direction is equal to the speed of the advancing web, adhesive applying means including a head structure supported from said portion of the frame, a horizontally extending bar supported from said head structure for rotation about a vertical axis equidistant the ends thereof and for vertical reciprocal movement, a roller assembly pivotally mounted at each end of the bar and including an adhesive applying roller supported for peripheral engagement with said web, said roller assemblies each including guide means and said head structure including an endless guide track receiving the guide means thereby to guide said adhesive applying rollers in an endless path, said adhesive applying rollers normally being disposed at loading positions over opposite marginal areas of the web, means for rotating said bar to move said rollers in unison along said path so that each adhesive applying roller travels from one loading position to the opposite loading position, means for forcing said bar downwardly during its rotation to bring said adhesive applying rollers into peripheral contact with said web, and an adhesive transfer roller for each of said adhesive applying rollers, each transfer roller being mounted for rotation about its own axis so that its periphery is in close proximity with the periphery of the associated adhesive applying roller when the latter is in its loading position, and means for applying adhesive to the peripheries of the transfer rollers.

12. The apparatus according to claim 11 wherein said adhesive applying rollers are free wheeling and wherein said adhesive transfer rollers are driven for rotation about their own axes, and wherein said adhesive supplying means includes an adhesive containing tank located adjacent each adhesive transfer roller and having a marginal portion of the latter received therein.

13. In a continuous package forming machine, the construction comprising, means for advancing a continuous web of package forming sheet material along a horizontal run and other means for successively depositing products on said web in spaced relation longitudinally of the latter, an adhesive applying assembly mounted above said web and power means for periodically reciprocating the assembly so that the latter moves in one direction at a velocity equal to the velocity of the web, which adhesive applying assembly includes a member rotatable about a vertical axis and including at least one adhesive applying roller adapted for peripheral contact with the web and normally supported so that its periphery is spaced above the surface of the web, cam means associated with said member for urging the same downwardly as it is rotated thereby to bring said roller into peripheral contact with the web and to roll the same along the surface of the web, a first rotatable arm connected at one of its ends to said member by means so that as said arm is rotated through 360° said member is rotated for applying an endless strip of adhesive on said web, a second arm rotatable about one of its ends in a plane adjacent and parallel to the plane of rotation of the first arm, which arms rotate about a common axis, means constantly oscillating said second arm through an arc of slightly more than 360°, a pawl pivotally mounted on the other end of said first arm and spring biased to an extended position, a finger on the other end of the second arm for engagement with said pawl when the latter is in its extended position, said pawl being adapted and arranged so that when it is engaged by the finger moving in one rotary direction the finger passes over the pawl by deflecting the latter against its spring and when the pawl is engaged by the finger moving in the other rotary direction the pawl acts to connect the first arm with the second arm for rotation in unison, movable means supported adjacent said first arm and adapted in a first position to engage said pawl and thereby prevent the same from assuming its extended position and adapted in a second position to permit the pawl to assume its extended position, sensing means arranged and adapted for detecting a certain condition of products delivered to said web by said other means, which sensing means is associated with said movable means so that when the former is activated the latter is moved to said first position, said first and second arms being angularly disposed relative to each other and arranged with respect to movement of said adhesive applying assembly so that said roller contacts the web only when the assembly is moving at said velocity.

14. The improvement according to claim 13 wherein said movable means includes a solenoid and wherein said sensing means includes a photoelectric means.

15. In a continuous package forming machine, the construction comprising, means for advancing a continuous web of package forming sheet material along a horizontal run and other means for successively depositing products on said web in spaced relation longitudinally of the latter, an adhesive applying assembly mounted above said web and power means for periodically reciprocating the assembly so that the latter moves in one direction at a velocity equal to the velocity of the web, which adhesive applying assembly includes a member rotatable about a vertical axis and including at least one adhesive applying roller adapted for peripheral contact with the web and normally supported so that its periphery is spaced above the surface of the web, cam means associated with said member for urging the same downwardly as it is rotated thereby to bring the roller into peripheral contact with the web and to roll the same along the surface of the web so that as said member is rotated from a start position to a stop position an endless strip of adhesive is applied to the web, an adhesive transfer roller mounted with its periphery closely adjacent the periphery of said adhesive applying roller when said member is in said start position thereby to supply adhesive to the adhesive applying roller, a first rotatable arm connected at one of its ends to said member by means so that as said arm is rotated through 360° said member is rotated from said start position to said stop position, a second arm rotatable about one of its ends in a plane adjacent and parallel to the plane of rotation of the first arm, which arms rotate about a common axis, means constantly oscillating said second arm through an arc of slightly more than 360°, a pawl pivotally mounted on the other end of said first arm and spring biased to an extended position, a finger on the other end of said second arm for engagement with said pawl when the latter is in its extended position, said pawl being adapted and arranged so that when it is engaged by the finger moving in one rotary direction the finger passes over the pawl by deflecting the latter against the spring and when the pawl is engaged by the finger moving in the other rotary direction the pawl acts to connect the first arm with the second arm for rotation in unison, movable means supported adjacent said first arm and adapted in a first position to engage said pawl and thereby prevent the same from assuming its extended position and adapted in a second position to permit the pawl to assume its extended position, sensing means mounted for detecting a certain condition of products delivered to said web by said other means, which sensing means is associated with said movable means so that when the former is activated the latter is moved to said first position thereby to disconnect said first arm from said second arm, said movable means being angularly positioned relative to said first arm so that when the former is moved to said first position the latter is in an angular position such that said member is located in advance of its start position, brake means associated with said member to prevent free rotation of the latter, said first and second arms being angularly disposed relative to each other and arranged with respect to movement of said adhesive applying assembly so that said roller contacts the web only when the assembly is moving at said velocity.

16. The improvement according to claim 15 wherein said adhesive applying roller is mounted for free rotation about its central axis and wherein said adhesive transfer roller is rotated about its central axis by motor means, an adhesive tank supported adjacent the adhesive transfer roller and having a slot in one of its side walls with a peripheral portion of the adhesive transfer roller received in the slot for picking up adhesive in said tank.

17. In a machine for continuously forming packages of the type including upper and lower sheets sealed together in package forming relation, which machine includes a supporting structure, separate endless series of upper and lower die plate means mounted on said structure for movement in timed relation for advancing upper and lower continuous sheets of package forming material at the same velocity through a packaging zone with the upper sheet in overlying relation with the lower sheet, each upper die plate means including a cavity and vacuum forming means for drawing the upper sheet thereinto before it reaches the packaging zone thereby successively to form depressions in the upper sheet, means in advance of said zone for depositing products on the lower sheet in spaced relation longitudinally of the latter for being successively received in the depressions in the upper sheet, the improvement which comprises, means for forming a small opening in the lower sheet adjacent each of the products deposited thereon, each lower die plate means including a planar face supporting the lower sheet and being laterally dimensioned relative to the margins of the lower sheet so that at least one side marginal area of the face is not covered by the former, each lower die plate means including a passageway having one end opening in said face in registry with one of the openings in the lower sheet and having the other end opening in said marginal area of the face, each upper die plate means having a planar marginal face surrounding the associated cavity and a passageway opening at one end thereof in said marginal face for registry with said other end of the passageway in the associated lower die plate means and opening at the other end thereof into the associated vacuum forming means, the marginal faces of the upper die plate means and the planar faces of the lower die plate means being arranged for coming into close confronting relation during their passage through said zone for pressing the upper and lower sheets together around the products thereby to enclose the latter between the sheets, means for successively actuating the vacuum forming means of the upper die plate means during their movement through said zone for evacuating through the openings in the lower sheet the enclosed spaces between the upper and lower sheets, each upper die plate means including valve means operable for venting the associated cavity to atmosphere, and means for successively operating said valve means after evacuation of said enclosed spaces thereby to press the upper film into conformity with the products.

18. The improvement according to claim 17 further defined by each upper die plate assembly including valve means and actuating means therefor for successively drawing vacuums in the cavities after the upper film has been applied to the upper die plate assemblies, said actuating means consisting of a cam track arranged first momentarily to actuate the valve means for partially drawing the upper film into the cavity, and then to actuate the valve means for fully drawing the upper film into the cavity.

References Cited
UNITED STATES PATENTS

| | | | |
|---|---|---|---|
| 2,935,828 | 5/1960 | Mahaffy et al. | 53—112 |
| 3,129,545 | 4/1964 | Sloan et al. | 53—112 |
| 3,247,643 | 4/1966 | Bartelt | 53—112 |

TRAVIS S. MCGEHEE, *Primary Examiner.*